US010544238B2

(12) United States Patent
Storey et al.

(10) Patent No.: US 10,544,238 B2
(45) Date of Patent: Jan. 28, 2020

(54) METHODS OF PREPARING FUNCTIONALIZED POLYOLEFINS

(71) Applicants: Chevron Oronite Company LLC, San Ramon, CA (US); The University of Southern Mississippi, Hattiesburg, MS (US)

(72) Inventors: Robson F. Storey, Hattiesburg, MS (US); Subramanyam Ummadisetty, Longview, TX (US); Christopher Garrett Campbell, Hattiesburg, MS (US); Casey D. Stokes, Belle Chasse, LA (US); Young Chang, San Jose, CA (US)

(73) Assignees: Chevron Oronite Company LLC, San Ramon, CA (US); The University of Southern Mississippi, Hattiesburg, MS (US)

( * ) Notice: Subject to any disclaimer, the term of this patent is extended or adjusted under 35 U.S.C. 154(b) by 425 days.

(21) Appl. No.: 15/281,906

(22) Filed: Sep. 30, 2016

(65) Prior Publication Data
US 2017/0096502 A1   Apr. 6, 2017

Related U.S. Application Data

(60) Provisional application No. 62/236,028, filed on Oct. 1, 2015.

(51) Int. Cl.
| C08F 8/00 | (2006.01) |
| C08F 8/18 | (2006.01) |
| C08F 8/30 | (2006.01) |
| C08F 8/20 | (2006.01) |
| C08F 8/50 | (2006.01) |
| C08F 10/10 | (2006.01) |

(52) U.S. Cl.
CPC ............ *C08F 8/20* (2013.01); *C08F 8/00* (2013.01); *C08F 8/18* (2013.01); *C08F 8/50* (2013.01); *C08F 8/30* (2013.01); *C08F 10/10* (2013.01)

(58) Field of Classification Search
CPC ...... C08F 8/00; C08F 8/02; C08F 8/18; C08F 8/30; C08F 8/50; C08C 19/00; C08C 19/12; C08C 19/22; C08C 19/25; C08C 19/28
See application file for complete search history.

(56) References Cited

U.S. PATENT DOCUMENTS

| 3,293,323 A | 12/1966 | Gardner et al. |
| 3,600,451 A * | 8/1971 | Rowe .................. C07C 2/68 585/11 |
| 3,721,660 A | 3/1973 | Olechowski |
| 3,923,759 A | 12/1975 | Kennedy et al. |
| 4,946,899 A | 8/1990 | Kennedy et al. |
| 5,484,857 A | 1/1996 | Weider et al. |
| 5,717,027 A | 2/1998 | Weider et al. |
| 6,969,744 B2 | 11/2005 | Stokes et al. |
| 7,420,019 B2 | 9/2008 | Stokes et al. |
| 7,501,476 B2 | 3/2009 | Stokes et al. |
| 7,576,161 B2 | 8/2009 | Stokes et al. |
| 7,705,090 B2 | 4/2010 | Stokes et al. |
| 7,709,580 B2 | 5/2010 | Stokes et al. |
| 8,013,073 B2 | 9/2011 | Stokes et al. |
| 8,063,154 B2 | 11/2011 | Storey et al. |
| 8,133,954 B2 | 3/2012 | Stokes |
| 8,344,073 B2 | 1/2013 | Storey et al. |
| 8,383,736 B2 | 2/2013 | Stokes et al. |
| 8,383,760 B2 | 2/2013 | Stokes |
| 8,394,897 B2 | 3/2013 | Stokes |
| 8,394,898 B2 | 3/2013 | Storey et al. |
| 8,492,491 B2 | 7/2013 | Stokes et al. |
| 8,552,122 B2 | 10/2013 | Storey et al. |
| 8,592,527 B2 | 11/2013 | Storey et al. |

FOREIGN PATENT DOCUMENTS

| DE | 1020635 B | 12/1957 |
| WO | 1994/014739 A1 | 7/1994 |
| WO | 2014/090672 A1 | 6/2014 |

OTHER PUBLICATIONS

Bergbreiter et al., "Synthesis of aryl-substituted polyisobutylenes as precursors for ligands for greener, phase-selectively soluble catalysts," Pure Appl. Chem. 2009, 81, 1981-1990.

Beresnev and Yunusov, "Preparation of Functional Oligoisobutylenes by the Ozonolysis of Butyl Rubber in the Presence of Hexamethylenediamine and their Properties," J. Appl. Chem. USSR 64:2531-2534 (1991).

Chasmawala and Chung, "Telechelic polyisobutylene: a facile synthesis via the cross-metathesis reaction and trialkylborane-containing olefins," Macromolecules 28:1333-1339 (1995).

Ebdon and Rimmer, "A one-pot method for the preparation of latices of telechelic oligomers, by ozonolysis of latices of polymers containing main-chain unsaturation," J. Polym. Sci. A Polym. Chem. 35:3255-3262 (1997).

Ebdon et al., "Degradative routes to telechelic oligomers and macromonomers," J. Macromol. Sci. Part A 32:603-611 (1995).

Kaszas et al., "Carbocationic copolymerization in the presence of electron pair donors. 2. Copolymerization of sobutylene and isoprene or 2, 4-dimethyl-1, 3-pentadiene with titanium tetrachloride-based initiating systems yielding in situ electron pair donors," Macromolecules 25:1775-1779 (1992).

Macias and Rubio, "Preparación y reticulación de poliisobutilenos de bajo peso molecular con grupos terminales reactivos," Revista de Plasticos Modernos 35:604-611, 623 (1978). (English Abstract provided).

(Continued)

*Primary Examiner* — Roberto Rabago
(74) *Attorney, Agent, or Firm* — Jones Day

(57) ABSTRACT

Provided herein are methods for preparing a functionalized polyolefin from an unsaturated polyolefin containing one or more non-aromatic main-chain double bonds and for reducing the size and/or polydispersity index (i.e., increasing the homogeneity) of the unsaturated polyolefin.

19 Claims, 8 Drawing Sheets

(56) References Cited

OTHER PUBLICATIONS

Morgan et al., "End-quenching of TiCl4-catalyzed quasiliving polyisobutylene with alkoxybenzenes for direct chain end functionalization," Macromolecules 43:8724-8740 (2010).

Morgan et al., "Kinetics and mechanism of end-quenching of quasiliving polyisobutylene with sterically hindered bases," Macromolecules 44:2438-2443 (2011).

Rehner, "Structure of copolymers of isobutylene and isoprene," Ind. Eng. Chem 36:46-51 (1944).

Reyx and Campistron, "Controlled degradation in tailor-made macromolecules elaboration. Controlled chain-cleavages of polydienes by oxidation and by metathesis," Macromol. Mater. Eng. 247:197-211 (1997).

Simison et al., "End-quenching of quasiliving carbocationic isobutylene polymerization with hindered bases: Quantitative formation of exo-olefin-terminated polyisobutylene," Macromolecules 39:2481-2487 (2006).

Tasdelen et al., "Telechelic polymers by living and controlled/living polymerization methods," Progress Polymer Sci. 36:455-567 (2011).

Ummadisetty et al., "Quantitative synthesis of exo-olefin-terminated polyisobutylene: Ether quenching and evaluation of various quenching methods," Macromolecules 46:2049-2059 (2013).

Morgan et al., "Sulfonium ion adducts from quasiliving polyisobutylene and mono- or disulfides," Macromolecules 42:2344-2352 (2009).

Ummadisetty et al., "Synthesis of exo-olefin terminated polyisobutylene by sulfide/base quenching of living polyisobutylene," Macromolecules 44:7901-7910 (2011).

Schlaad et al., "Kinetic study on the capping reaction of living polyisobutylene with 1,1-diphenylethylene. 1. Effect of temperature and comparison to the model compound 2-chloro-2,4,4-trimethylpentane," Macromolecules 31:8058-8062 (1998).

De et al., "Relative reactivity of C4 olefins toward the polyisobutylene cation," Macromolecules 39:6861-6870 (2006).

Ivan et al., "Living carbocationic polymerization. XXX. One-pot synthesis of allyl-terminated linear and tri-arm star polyisobutylenes, and epoxy- and hydroxy-telechelics therefrom," J. Polym. Sci., Part A: Polym. Chem. 28:89-104 (1990).

Nielsen et al., "Synthesis of isobutenyl-telechelic polyisobutylene by functionalization with isobutenyltrimethylsilane," Polymer 38:2529-2534 (1997).

Roth and Mayr, "A novel method for the determination of propagation rate constants: Carbocationic oligomerization of isobutylene," Macromolecules 29:6104-6109 (1996).

Hadjikyriacou et al., "Cationic macromolecular design and synthesis using furan derivatives," Macromolecules 32:6393-6399 (1999).

Martinez-Castro et al., "Primary halide-terminated polyisobutylene: End-quenching of quasiliving carbocationic polymerization with N-(ω-haloalkyl)pyrrole," Macromolecules 42:4963-4971 (2009).

Morgan et al., "Primary hydroxy-terminated polyisobutylene via end-quenching with a protected N-(ω-hydroxyalkyl) pyrrole," Macromolecules 43:1329-1340 (2010).

Morgan et al., "End-quenching of quasi-living isobutylene polymerizations with alkoxybenzene compounds," Macromolecules 42:6844-6847 (2009).

Kemp et al., "Structural Confirmation of Exo-Olefin-Coupled Polyisobutylene via Model Compound Synthesis and Characterization," J. Macromol. Sci. Part A: Pure Appl. Chem. 45:137-143 (2008).

* cited by examiner

METHODS OF PREPARING FUNCTIONALIZED POLYOLEFINS

1. CROSS REFERENCE TO RELATED APPLICATION

This application claims the benefit of U.S. Provisional Application No. 62/236,028, filed Oct. 1, 2015; the disclosure of which is incorporated herein by reference in its entirety.

2. FIELD

Provided herein are methods for preparing a functionalized polyolefin from an unsaturated polyolefin containing one or more non-aromatic main-chain double bonds and for reducing the size and/or polydispersity index (i.e., increasing the homogeneity) of the unsaturated polyolefin.

3. BACKGROUND

One method for preparing a difunctional telechelic prepolymer is uni-directional polymerization of an olefin from a monofunctional initiator that already carries a desired functional group, followed by coupling the growing chain ends. Thus, the uni-directional polymerization method requires a monofunctional initiator that also carries a desired functionality plus a suitable coupling agent to join the growing chain ends pairwise. A variation of this method is uni-directional polymerization of an olefin from a monofunctional initiator that already carries a desired functional group, followed either by in-situ quenching or post-polymerization modification. In many cases, especially for isobutylene, both the initiator, and the coupling agent, quenching agent, or post-polymerization functionalization chemistry are limitations to commercialization.

Another method for preparing a difunctional telechelic prepolymer is bi-directional polymerization of an olefin from a difunctional initiator, followed by functionalization of the growing chain ends, either by in-situ quenching or post-polymerization modification. Thus, the bi-directional polymerization method requires a difunctional initiator plus suitable functionalization chemistry to convert the growing chain ends to the desired functionality. In many cases, especially for isobutylene, the availability of a suitable difunctional initiator is a commercial limitation.

One additional method for preparing a difunctional telechelic prepolymer is constructive degradation. See, e.g., Ebdon et al. *Macromol. Rep.* 1995, A32, 603-611. When a high molecular weight copolymer of an olefin containing a small percentage of comonomer units is subjected to a cleavage reaction, for example, two new end groups with a desired functionality are created.

One example of constructive degradation is ozonolysis of main-chain double bonds that are introduced into a polymer by copolymerization of a diene or monosubstituted acetylene. See, e.g., Ebdon and Rimmer, *J. Polym. Sci., Part A: Polym. Chem.* 1997, 35, 3255-3262; Reyx and Campistron, *Die Angew. Makromol. Chem.* 1997, 247, 197-211. For example, the ozonolysis of butyl rubber yields a mixture of methyl ketone, aldehyde, and/or carboxylic acid end groups. See, e.g., Macias and Rubio, *Revista de Plasticos Modernos* 1978, 35, 604-611, 623; Beresnev and Yunusov, *J. Appl. Chem. USSR* 1991, 64, 2704-2707; U.S. Pat. Nos. 5,484,857 and 5,717,027. Those functional groups can be reduced to hydroxyl using $LiAlH_4$. See, e.g., Macias and Rubio, *Revista de Plasticos Modernos* 1978, 35, 604-611, 623. Amine end groups can be obtained when butyl rubber is ozonolyzed in the presence of hexamethylenediamine. See, e.g., Beresnev and Yunusov, *J. Appl. Chem. USSR* 1991, 64, 2704-2707.

Another example of constructive degradation is metathesis degradation of polymers containing main-chain double bonds. For example, the metathesis reaction of poly(isobutylene-co-butadiene) (96.4/3.6, mol/mol) with 1,10-di(9-borabicyclononane)-5-decene yielded polyisobutylene oligomers carrying 9-borabicyclononane (9-BBN) end groups, which can then be oxidized to yield primary hydroxyl end groups. See, e.g., Chasmawala and Chung, *Macromolecules* 1995, 28, 1333-1339.

Suitable copolymers for constructive degradation are readily prepared from a monofunctional initiator and a suitable comonomer. The selection of monofunctional initiator is not critical, for example, simple compounds such as water or HCl are suitable initiators for isobutylene. Also, suitable comonomers such as isoprene are commercially available.

Functionalized polymers are useful intermediates in the preparation of high-performance polymer products. For example, polymers containing functional end groups are useful in the production of fuel or lube oil additives, network polymers, star-branched polymers, and block copolymers. Polymers containing primary aliphatic hydroxyl end groups are useful in polyurethane polymer synthesis. Polymers containing primary aliphatic halogen end groups are useful synthetic intermediates because the halogen group(s) can readily be converted into another group via nucleophilic substitution. Polymers containing phenol end groups are useful in the synthesis of fuel and lubricating oil additives because, for example, they are readily reacted with formaldehyde and a polyamine to generate ashless dispersants. Thus, there is a need for methods for preparing functionalized polymers.

4. SUMMARY

Provided herein is a method for preparing a functionalized polyolefin from an unsaturated polyolefin containing one or more non-aromatic main-chain double bonds, comprising contacting the unsaturated polyolefin with an optionally substituted aromatic compound in the presence of a Lewis acid and protic acid to form the functionalized polyolefin.

Also provided herein is a method for preparing a functionalized polyolefin from an unsaturated polyolefin containing one or more non-aromatic main-chain double bonds, comprising the steps of:

(a) at least one selected from: contacting the unsaturated polyolefin with a Lewis acid to form a carbocationic polyolefin, contacting the unsaturated polyolefin with a Lewis acid to form a mixture, contacting an optionally substituted aromatic compound with a Lewis acid to form a mixture, contacting the unsaturated polyolefin with an optionally substituted aromatic compound to form a mixture, and contacting the unsaturated polyolefin with a Lewis acid and protic acid to form a mixture; and (b) at least one selected from: contacting the carbocationic polyolefin with an optionally substituted aromatic compound in the presence of a protic acid to form the functionalized polyolefin, contacting the mixture with an optionally substituted aromatic compound in the presence of a protic acid to form the functionalized polyolefin, contacting the mixture with the unsaturated polyolefin in the presence of a protic acid to form the functionalized polyolefin, contacting the mixture with a Lewis acid and protic acid to form the functionalized polyolefin, and contacting the mixture with an optionally substituted aromatic compound to form the functionalized polyolefin.

In certain embodiments, the functionalized polyolefin formed has a weight average molecular weight smaller than that of the unsaturated polyolefin. In certain embodiments, the functionalized polyolefin formed has a number average molecular weight smaller than that of the unsaturated polyolefin.

Provided herein is a method for reducing the size (e.g., the weight average molecular weight or number average molecular weight) of an unsaturated polyolefin containing one or more non-aromatic main-chain double bonds, comprising contacting the unsaturated polyolefin with an optionally substituted aromatic compound in the presence of a Lewis acid and protic acid.

Provided herein is a method for reducing the size of an unsaturated polyolefin containing one or more non-aromatic main-chain double bonds, comprising the steps of:

(a) at least one selected from: contacting the unsaturated polyolefin with a Lewis acid to form a carbocationic polyolefin, contacting the unsaturated polyolefin with a Lewis acid to form a mixture, contacting an optionally substituted aromatic compound with a Lewis acid to form a mixture, contacting the unsaturated polyolefin with an optionally substituted aromatic compound to form a mixture, contacting the unsaturated polyolefin with an optionally substituted aromatic compound to form a mixture, and contacting the unsaturated polyolefin with a Lewis acid and protic acid to form a mixture; and (b) at least one selected from: contacting the carbocationic polyolefin with an optionally substituted aromatic compound in the presence of a protic acid, contacting the mixture with an optionally substituted aromatic compound in the presence of a protic acid, contacting the mixture with the unsaturated polyolefin in the presence of a protic acid, contacting the mixture with a Lewis acid and protic acid, and contacting the mixture with an optionally substituted aromatic compound.

Provided herein is a method for reducing the polydispersity index (i.e., increasing the homogeneity) of an unsaturated polyolefin containing one or more non-aromatic main-chain double bonds, comprising contacting the unsaturated polyolefin with an optionally substituted aromatic compound in the presence of a Lewis acid and protic acid.

Provided herein is a method for reducing the polydispersity index of an unsaturated polyolefin containing one or more non-aromatic main-chain double bonds, comprising the steps of:

(a) at least one selected from: contacting the unsaturated polyolefin with a Lewis acid to form a carbocationic polyolefin, contacting the unsaturated polyolefin with a Lewis acid to form a mixture, contacting an optionally substituted aromatic compound with a Lewis acid to form a mixture, contacting the unsaturated polyolefin with an optionally substituted aromatic compound to form a mixture, and contacting the unsaturated polyolefin with a Lewis acid and protic acid to form a mixture; and (b) at least one selected from contacting the carbocationic polyolefin with an optionally substituted aromatic compound in the presence of a protic acid, contacting the mixture with an optionally substituted aromatic compound in the presence of a protic acid, contacting the mixture with the unsaturated polyolefin in the presence of a protic acid, contacting the mixture with a Lewis acid and protic acid, and contacting the mixture with an optionally substituted aromatic compound.

In one embodiment, the unsaturated polyolefin is a homopolyolefin containing one or more non-aromatic main-chain double bonds. In another embodiment, the unsaturated polyolefin is a coupled polyolefin containing one or more non-aromatic main-chain double bonds. In another embodiment, the unsaturated polyolefin is a homopolyolefin that comprises a coupled polyolefin containing one or more non-aromatic main-chain double bonds. In still another embodiment, the unsaturated polyolefin is a polyolefin copolymer containing one or more non-aromatic main-chain double bonds.

Provided herein is a method for preparing a functionalized polyolefin, comprising contacting a coupled polyolefin containing one or more non-aromatic main-chain double bonds with an optionally substituted aromatic compound in the presence of a Lewis acid and protic acid to form the functionalized polyolefin.

Provided herein is a method for preparing a functionalized polyolefin, comprising the steps of:

(a) at least one selected from: contacting a coupled polyolefin containing one or more non-aromatic main-chain double bonds with a Lewis acid to form a carbocationic coupled polyolefin, contacting a coupled polyolefin containing one or more non-aromatic main-chain double bonds with a Lewis acid to form a mixture, contacting an optionally substituted aromatic compound with a Lewis acid to form a mixture, contacting a coupled polyolefin containing one or more non-aromatic main-chain double bonds with an optionally substituted aromatic compound to form a mixture, and contacting a coupled polyolefin containing one or more non-aromatic main-chain double bonds with a Lewis acid and protic acid to form a mixture; and (b) at least one selected from: contacting the carbocationic coupled polyolefin with an optionally substituted aromatic compound in the presence of a protic acid to form the functionalized polyolefin, contacting the mixture with an optionally substituted aromatic compound in the presence of a protic acid to form the functionalized polyolefin, contacting the mixture with a coupled polyolefin containing one or more non-aromatic main-chain double bonds in the presence of a protic acid to form the functionalized polyolefin, contacting the mixture with a Lewis acid and protic acid to form the functionalized polyolefin, and contacting the mixture with an optionally substituted aromatic compound to form the functionalized polyolefin.

In certain embodiments, the functionalized polyolefin formed has a weight average molecular weight smaller than that of the coupled polyolefin. In certain embodiments, the functionalized polyolefin formed has a number average molecular weight smaller than that of the coupled polyolefin.

Provided herein is a method for preparing a functionalized polyolefin, comprising contacting a polyolefin that comprises a coupled polyolefin containing one or more non-aromatic main-chain double bonds with an optionally substituted aromatic compound in the presence of a Lewis acid and protic acid to form the functionalized polyolefin.

Provided herein is a method for preparing a functionalized polyolefin, comprising the steps of:

(a) at least one selected from: contacting a polyolefin that comprises a coupled polyolefin containing one or more non-aromatic main-chain double bonds with a Lewis acid to form a carbocationic coupled polyolefin, contacting a polyolefin that comprises a coupled polyolefin containing one or more non-aromatic main-chain double bonds with a Lewis acid to form a mixture, contacting an optionally substituted aromatic compound with a Lewis acid to form a mixture, contacting an optionally substituted aromatic compound with a Lewis acid to form a mixture, contacting a polyolefin that comprises a coupled polyolefin containing one or more non-aromatic main-chain double bonds with an optionally substituted aromatic compound to form a mixture, and contacting a polyolefin that comprises a coupled polyolefin containing one or more non-aromatic main-chain double bonds with a Lewis acid and protic acid to form a mixture; and (b) at least one selected from: contacting the carbocationic coupled polyolefin with an optionally substituted aromatic compound in the presence of a protic acid to form the functionalized polyolefin, contacting the mixture with an optionally substituted aromatic compound in the presence of a protic acid to form the functionalized polyolefin, contacting the mixture with a polyolefin that comprises a coupled polyolefin containing one or more non-aromatic main-chain double bonds in the presence of a protic acid to form the functionalized polyolefin, contacting the mixture with a Lewis acid and protic acid to form the functionalized polyolefin, and contacting the mixture with an optionally substituted aromatic compound to form the functionalized polyolefin.

In certain embodiments, the functionalized polyolefin formed has a weight average molecular weight smaller than that of the polyolefin that comprises a coupled polyolefin. In certain embodiments, the functionalized polyolefin formed has a number average molecular weight smaller than that of the polyolefin that comprises a coupled polyolefin.

Provided herein is a method for reducing the size (e.g., the weight average molecular weight or number average molecular weight) of a polyolefin, comprising contacting the polyolefin with an optionally substituted aromatic compound in the presence of a Lewis acid and protic acid.

Provided herein is a method for reducing the size of a polyolefin that comprises a coupled polyolefin containing one or more non-aromatic main-chain double bonds, comprising contacting the polyolefin that comprises a coupled polyolefin with an optionally substituted aromatic compound in the presence of a Lewis acid and protic acid.

Provided herein is a method for reducing the size of a polyolefin that comprises a coupled polyolefin containing one or more non-aromatic main-chain double bonds, comprising the steps of:

(a) at least one selected from: contacting the polyolefin that comprises a coupled polyolefin with a Lewis acid to form a carbocationic coupled polyolefin, contacting the polyolefin that comprises a coupled polyolefin with a Lewis acid to form a mixture, contacting an optionally substituted aromatic compound with a Lewis acid to form a mixture, contacting the polyolefin that comprises a coupled polyolefin with an optionally substituted aromatic compound to form a mixture, and contacting the polyolefin that comprises a coupled polyolefin with a Lewis acid and protic acid to form a mixture; and (b) at least one selected from: contacting the carbocationic coupled polyolefin with an optionally substituted aromatic compound in the presence of a protic acid, contacting the mixture with an optionally substituted aromatic compound in the presence of a protic acid, contacting the mixture with the polyolefin that comprises a coupled polyolefin in the presence of a protic acid, contacting the mixture with a Lewis acid and protic acid, and contacting the mixture with an optionally substituted aromatic compound.

Provided herein is a method for reducing the polydispersity index (i.e., increasing the homogeneity) of a polyolefin, comprising contacting the polyolefin with an optionally substituted aromatic compound in the presence of a Lewis acid and protic acid.

Provided herein is a method for reducing the polydispersity index of a polyolefin that comprises a coupled polyolefin containing one or more non-aromatic main-chain double bonds, comprising contacting the polyolefin that comprises a coupled polyolefin with an optionally substituted aromatic compound in the presence of a Lewis acid and a protic acid.

Provided herein is a method for reducing the polydispersity index of a polyolefin that comprises a coupled polyolefin containing one or more non-aromatic main-chain double bonds, comprising the steps of:

(a) at least one selected from: contacting the polyolefin that comprises a coupled polyolefin with a Lewis acid to form a carbocationic coupled polyolefin, contacting the polyolefin that comprises a coupled polyolefin with a Lewis acid to form a mixture, contacting an optionally substituted aromatic compound with a Lewis acid to form a mixture, contacting the polyolefin that comprises a coupled polyolefin with an optionally substituted aromatic compound to form a mixture, and contacting the polyolefin that comprises a coupled polyolefin with a Lewis acid and protic acid to form a mixture; and (b) at least one selected from: contacting the carbocationic coupled polyolefin with an optionally substituted aromatic compound in the presence of a protic acid, contacting the mixture with an optionally substituted aromatic compound in the presence of a protic acid, contacting the mixture with the polyolefin that comprises a coupled polyolefin in the presence of a protic acid, contacting the mixture with a Lewis acid and protic acid, and contacting the mixture with an optionally substituted aromatic compound.

Provided herein is a method for reducing the content of a coupled polyolefin in a polyolefin, comprising contacting the polyolefin with an optionally substituted aromatic compound in the presence of a Lewis acid and protic acid.

Provided herein is a method for reducing the content of a coupled polyolefin in a polyolefin that comprises a coupled polyolefin, comprising contacting the polyolefin that comprises a coupled polyolefin with an optionally substituted aromatic compound in the presence of a Lewis acid and protic acid.

Provided herein is a method for reducing the content of a coupled polyolefin in a polyolefin that comprises a coupled polyolefin, comprising the steps of:

(a) at least one selected from: contacting the polyolefin that comprises a coupled polyolefin with a Lewis acid to form a carbocationic coupled polyolefin, contacting the polyolefin that comprises a coupled polyolefin with a Lewis acid to form a mixture, contacting an optionally substituted aromatic compound with a Lewis acid to form a mixture, contacting the polyolefin that comprises a coupled polyolefin with an optionally substituted aromatic compound to form a mixture, and contacting the polyolefin that comprises a coupled polyolefin with a Lewis acid and protic acid to form a mixture; and (b) at least one selected from: contacting the carbocationic coupled polyolefin with an optionally substituted aromatic compound in the presence of a protic acid, contacting the mixture with an optionally substituted aromatic compound in the presence of a protic acid, contacting the mixture with the polyolefin that comprises a coupled polyolefin in the presence of a protic acid, contacting the mixture with a Lewis acid and protic acid, and contacting the mixture with an optionally substituted aromatic compound.

Provided herein is a method for preparing a functionalized polyolefin from a polyolefin copolymer containing one or more non-aromatic main-chain double bonds, comprising contacting the polyolefin copolymer with an optionally substituted aromatic compound in the presence of a Lewis acid and protic acid to form the functionalized polyolefin.

Provided herein is a method for preparing a functionalized polyolefin from a polyolefin copolymer containing one or more non-aromatic main-chain double bonds, comprising the steps of:

(a) at least one selected from: contacting the polyolefin copolymer with a Lewis acid to form a carbocationic polyolefin copolymer, contacting the polyolefin copolymer with a Lewis acid to form a mixture, contacting an optionally substituted aromatic compound with a Lewis acid to form a mixture, contacting the polyolefin copolymer with an optionally substituted aromatic compound to form a mixture, and contacting the polyolefin copolymer with a Lewis acid and protic acid to form a mixture; and (b) at least one selected from: contacting the carbocationic polyolefin copolymer with an optionally substituted aromatic compound in the presence of a protic acid to form the functionalized polyolefin, contacting the mixture with an optionally substituted aromatic compound in the presence of a protic acid to form the functionalized polyolefin, contacting the mixture with the polyolefin copolymer in the presence of a protic acid to form the functionalized polyolefin, contacting the mixture with a Lewis acid and protic acid to form the functionalized polyolefin, and contacting the mixture with an optionally substituted aromatic compound to form the functionalized polyolefin.

In certain embodiments, the functionalized polyolefin has a weight average molecular weight smaller than that of the polyolefin copolymer. In certain embodiments, the functionalized polyolefin has a number average molecular weight smaller than that of the polyolefin copolymer.

Provided herein is a method for preparing a telechelic polyolefin from a polyolefin copolymer containing two or more non-aromatic main-chain double bonds, comprising contacting the polyolefin copolymer with an optionally substituted aromatic compound in the presence of a Lewis acid and protic acid to form the telechelic polyolefin.

Provided herein is a method for preparing a telechelic polyolefin from a polyolefin copolymer containing two or more non-aromatic main-chain double bonds, comprising the steps of:

(a) at least one selected from: contacting the polyolefin copolymer with a Lewis acid to form a carbocationic polyolefin copolymer, contacting the polyolefin copolymer with a Lewis acid to form a mixture, contacting an optionally substituted aromatic compound with a Lewis acid to form a mixture, contacting the polyolefin copolymer with an optionally substituted aromatic compound to form a mixture, and contacting the polyolefin copolymer with a Lewis acid and protic acid to form a mixture; and (b) at least one selected from: contacting the carbocationic polyolefin copolymer with an optionally substituted aromatic compound in the presence of a protic acid to form the telechelic polyolefin, contacting the mixture with an optionally substituted aromatic compound in the presence of a protic acid to form the telechelic polyolefin, contacting the mixture with the polyolefin copolymer in the presence of a protic acid to form the telechelic polyolefin, contacting the mixture with a Lewis acid and protic acid to form the telechelic polyolefin, and contacting the mixture with an optionally substituted aromatic compound to form the telechelic polyolefin.

In certain embodiments, the telechelic polyolefin has a weight average molecular weight smaller than that of the polyolefin copolymer. In certain embodiments, the telechelic polyolefin has a number average molecular weight smaller than that of the polyolefin copolymer.

Provided herein is a method for reducing the size (e.g., the weight average molecular weight the number average molecular weight) of a polyolefin copolymer containing one or more non-aromatic main-chain double bonds, comprising contacting the polyolefin copolymer with an optionally substituted aromatic compound in the presence of a Lewis acid and protic acid.

Provided herein is a method for reducing the size of a polyolefin copolymer containing one or more non-aromatic main-chain double bonds, comprising the steps of:

(a) at least one selected from: contacting the polyolefin copolymer with a Lewis acid to form a carbocationic polyolefin copolymer, contacting the polyolefin copolymer with a Lewis acid to form a mixture, contacting an optionally substituted aromatic compound with a Lewis acid to form a mixture, contacting the polyolefin copolymer with an optionally substituted aromatic compound to form a mixture, and contacting the polyolefin copolymer with a Lewis acid and protic acid to form a mixture; and (b) at least one selected from: contacting the carbocationic polyolefin copolymer with an optionally substituted aromatic compound in the presence of a protic acid, contacting the mixture with an optionally substituted aromatic compound in the presence of a protic acid, contacting the mixture with the polyolefin copolymer in the presence of a protic acid, contacting the mixture with a Lewis acid and protic acid, and contacting the mixture with an optionally substituted aromatic compound.

Provided herein is a method for reducing the polydispersity index (i.e., increasing the homogeneity) of a polyolefin copolymer containing one or more non-aromatic main-chain double bonds, comprising contacting the polyolefin copolymer with an optionally substituted aromatic compound in the presence of a Lewis acid and protic acid.

Provided herein is a method for reducing the polydispersity index of a polyolefin copolymer containing one or more non-aromatic main-chain double bonds, comprising the steps of:

(a) at least one selected from: contacting the polyolefin copolymer with a Lewis acid to form a carbocationic polyolefin copolymer, contacting the polyolefin copolymer with a Lewis acid to form a mixture, contacting an optionally substituted aromatic compound with a Lewis acid to form a mixture, contacting the polyolefin copolymer with an optionally substituted aromatic compound to form a mixture, and contacting the polyolefin copolymer with a Lewis acid and protic acid to form a mixture; and (b) at least one selected from: contacting the carbocationic polyolefin copolymer with an optionally substituted aromatic compound in the presence of a protic acid, contacting the mixture with an optionally substituted aromatic compound in the presence of a protic acid, contacting the mixture with the polyolefin copolymer in the presence of a protic acid, contacting the mixture with a Lewis acid and protic acid, and contacting the mixture with an optionally substituted aromatic compound.

5. BRIEF DESCRIPTION OF THE DRAWINGS

6. DETAILED DESCRIPTION 4.1 Definitions

Figure 1:
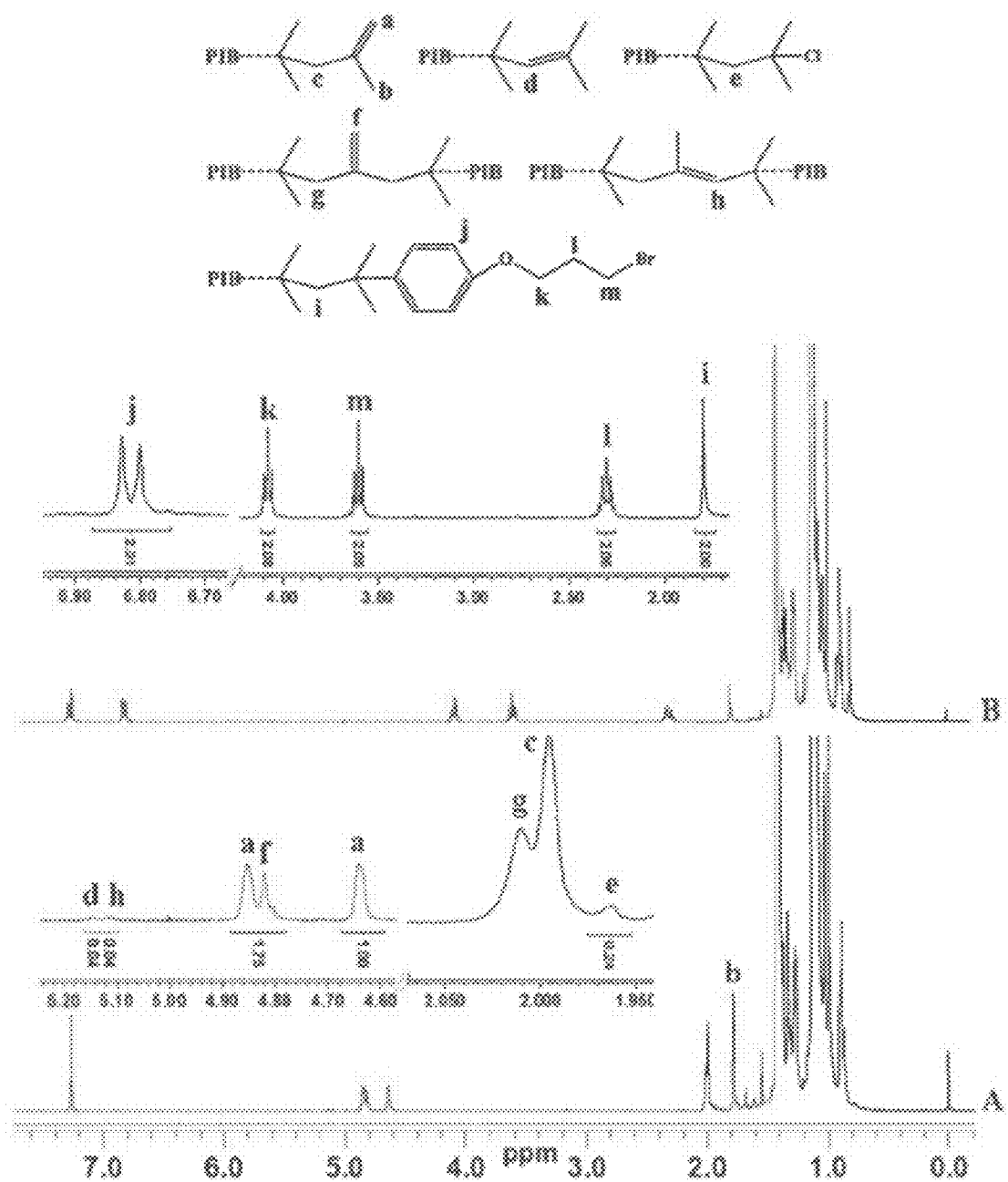
FIG. 1 shows $^1$H NMR spectra of PIB1 (A), a homopolyisobutylene that comprises a coupled homopolyisobutylene, and 4-(3-bromopropoxy)phenyl-terminated homopolyisobutylene (B) prepared from PIB1, respectively.

To facilitate understanding of the disclosure set forth herein, a number of terms are defined below.

Generally, the nomenclature used herein and the laboratory procedures in organic chemistry, polymer chemistry, and petroleum chemistry described herein are those well known and commonly employed in the art. Unless defined otherwise, all technical and scientific terms used herein generally have the same meaning as commonly understood by one of ordinary skill in the art to which this disclosure belongs.

The term "hydrocarbon" refers to a linear, branched, or cyclic compound that contains carbon and hydrogen. In certain embodiments, the hydrocarbon is optionally substituted with one or more substituents Q as defined herein. In certain embodiments, the hydrocarbon is unsubstituted. In certain embodiments, the hydrocarbon is an alkane or arene.

The term "halogenated hydrocarbon" refers to a hydrocarbon that contains one or more halo groups.

The term "alkane" refers to a linear or branched saturated hydrocarbon. In certain embodiments, the alkane is optionally substituted, in one embodiment, with one or more substituents Q as defined herein. In certain embodiments, the alkane is unsubstituted. The term "alkane" also encompasses both linear and branched alkane, unless otherwise specified. In certain embodiments, the alkane is a linear saturated hydrocarbon having from 1 to 20 ($C_{1-20}$), from 1 to 15 ($C_{1-15}$), from 1 to 10 ($C_{1-10}$), from 1 to 6 ($C_{1-6}$), or from 1 to 3 ($C_{1-3}$) carbon atoms, or a branched saturated hydrocarbon having from 4 to 20 ($C_{4-20}$), from 4 to 15 ($C_{4-15}$), from 4 to 10 ($C_{4-10}$), or from 4 to 6 ($C_{4-6}$) carbon atoms. As used herein, linear $C_{1-6}$ and branched $C_{4-6}$ alkanes are also referred to as "lower alkanes." Examples of alkanes include, but are not limited to, methane, ethane, propane (including all isomeric forms), n-propane, butane (including all isomeric forms), n-butane, isobutane, sec-butane, t-butane, pentane (including all isomeric forms), and hexane (including all isomeric forms). For example, $C_{1-6}$ alkane refers to a linear saturated hydrocarbon having from 1 to 6 carbon atoms or a branched saturated hydrocarbon having from 3 to 6 carbon atoms.

The term "halogenated alkane" refers to an alkane that contains one or more halo groups.

The terms "aromatics" and "an aromatic compound" are used herein interchangeably to refer to a monocyclic or multicyclic compound that contains at least one aromatic ring. In certain embodiments, the aromatic compound is optionally substituted, in one embodiment, with one or more substituents Q as defined herein. In one embodiment, the aromatic compound is an optionally substituted arene. In another embodiment, the aromatic compound is an optionally substituted heteroarene.

The term "arene" refers to a monocyclic or multicyclic hydrocarbon compound that contains at least one aromatic hydrocarbon ring. In certain embodiments, the arene has from 6 to 20 ($C_{6-20}$), from 6 to 15 ($C_{6-15}$), or from 6 to 10 ($C_{6-10}$) ring carbon atoms. Examples of arenes include, but are not limited to, benzene, naphthalene, fluorene, azulene, anthracene, phenanthrene, pyrene, biphenyl, and terphenyl. The term "arene" also refers to bicyclic or tricyclic hydrocarbon rings, where one of the rings is aromatic and the other hydrocarbon rings may be saturated, partially unsaturated, or aromatic, for example, dihydronaphthalene, indene, indane, or tetrahydronaphthalene. In certain embodiments, the arene is optionally substituted, in one embodiment, with one or more substituents Q as defined herein.

The term "heteroarene" refers to a monocyclic or multicyclic compound that contains at least one aromatic ring, wherein at least one aromatic ring contains one or more heteroatoms independently selected from O, S, N, and P in the ring. Each ring of a heteroarene can contain one or two O atoms, one or two S atoms, one to four N atoms, and/or one or two P atoms, provided that the total number of heteroatoms in each ring is four or less and each ring contains at least one carbon atom. In certain embodiments, the heteroarene has from 5 to 20, from 5 to 15, or from 5 to 10 ring atoms. Examples of monocyclic heteroarenes include, but are not limited to, furan, imidazole, isothiazole, isoxazole, oxadiazole, oxazole, pyrazine, pyrazole, pyridazine, pyridine, pyrimidine, pyrrole, thiadiazole, thiazole, thiophene (also known as thiofuran or thiene), tetrazole, triazine, and triazole. Examples of bicyclic heteroarenes include, but are not limited to, benzofuran, benzimidazole, benzisoxazole, benzopyran, benzothiadiazole, benzothiazole, benzothiophene, benzotriazole, benzoxazole, furopyridine, imidazopyridine, imidazothiazole, indolizine, indole, indazole, isobenzofuran, isobenzothiophene, isoindole, isoquinoline, isothiazole, naphthyridine, oxazolopyridine, phthalazine, pteridine, purine, pyridopyridine, pyrrolopyridine, quinoline, quinoxaline, quinazoline, thiadiazolopyrimide, and thienopyridine. Examples of tricyclic heteroarenes include, but are not limited to, acridine, benzindole, carbazole, dibenzofuran, perimidine, phenanthroline, phenanthridine, phenarsazine, phenazine, phenothiazine, phenoxazine, and xanthene. In certain embodiments, the heteroaene is optionally substituted, in one embodiment, with one or more substituents Q as defined herein.

The term "alkyl" refers to a linear or branched saturated monovalent hydrocarbon radical. In certain embodiments, the alkyl is optionally substituted, in one embodiment, with one or more substituents Q as defined herein. The term "alkyl" also encompasses both linear and branched alkyl, unless otherwise specified. In certain embodiments, the alkyl is a linear saturated monovalent hydrocarbon radical having from 1 to 20 ($C_{1-20}$), from 1 to 15 ($C_{1-15}$), from 1 to 10

($C_{1-10}$), from 1 to 6 ($C_{1-6}$), or from 1 to 3 ($C_{1-3}$) carbon atoms, or a branched saturated monovalent hydrocarbon radical having from 3 to 20 ($C_{3-20}$), from 3 to 15 ($C_{3-15}$), from 3 to 10 ($C_{3-10}$), or from 3 to 6 ($C_{3-6}$) carbon atoms. As used herein, linear $C_{1-6}$ and branched $C_{3-6}$ alkyl groups are also referred to as "lower alkyl." Examples of alkyl groups include, but are not limited to, methyl, ethyl, propyl (including all isomeric forms), n-propyl, isopropyl, butyl (including all isomeric forms), n-butyl, isobutyl, sec-butyl, t-butyl, pentyl (including all isomeric forms), and hexyl (including all isomeric forms). For example, $C_{1-6}$ alkyl refers to a linear saturated monovalent hydrocarbon radical having from 1 to 6 carbon atoms or a branched saturated monovalent hydrocarbon radical having from 3 to 6 carbon atoms.

The term "alkenyl" refers to a linear or branched monovalent hydrocarbon radical, which contains one or more carbon-carbon double bond(s); in one embodiment, one, two, three, four, or five carbon-carbon double bond(s); in another embodiment, one carbon-carbon double bond. In certain embodiments, the alkenyl is optionally substituted, in one embodiment, with one or more substituents Q as defined herein. The term "alkenyl" also embraces radicals having "cis" and "trans" configurations, or alternatively, "Z" and "E" configurations, as appreciated by those of ordinary skill in the art. As used herein, the term "alkenyl" encompasses both linear and branched alkenyl, unless otherwise specified. For example, $C_{2-6}$ alkenyl refers to a linear unsaturated monovalent hydrocarbon radical having from 2 to 6 carbon atoms or a branched unsaturated monovalent hydrocarbon radical having from 3 to 6 carbon atoms. In certain embodiments, the alkenyl is a linear monovalent hydrocarbon radical having from 2 to 20 ($C_{2-20}$), from 2 to 15 ($C_{2-15}$), from 2 to 10 ($C_{2-10}$), from 2 to 6 ($C_{2-6}$), or from 2 to 3 ($C_{2-3}$) carbon atoms, or a branched monovalent hydrocarbon radical having from 3 to 20 ($C_{3-20}$), from 3 to 15 ($C_{3-15}$), from 3 to 10 ($C_{3-10}$), or from 3 to 6 ($C_{3-6}$) carbon atoms. Examples of alkenyl groups include, but are not limited to, ethenyl, propen-1-yl, propen-2-yl, allyl, butenyl, and 4-methylbutenyl.

The term "alkynyl" refers to a linear or branched monovalent hydrocarbon radical, which contains one or more carbon-carbon triple bond(s); in one embodiment, one, two, three, four, or five carbon-carbon triple bond(s); in another embodiment, one carbon-carbon triple bond. In certain embodiments, the alkynyl is optionally substituted, in one embodiment, with one or more substituents Q as defined herein. The term "alkynyl" also encompasses both linear and branched alkynyl, unless otherwise specified. The term "akylnyl" does not encompass a group containing a carbon-carbon double bond. In certain embodiments, the alkynyl is a linear monovalent hydrocarbon radical having from 2 to 20 ($C_{2-20}$), from 2 to 15 ($C_{2-15}$), from 2 to 10 ($C_{2-10}$), from 2 to 6 ($C_{2-6}$), or from 2 to 3 ($C_{2-3}$) carbon atoms, or a branched monovalent hydrocarbon radical having from 4 to 20 ($C_{4-20}$), from 4 to 15 ($C_{4-15}$), from 4 to 10 ($C_{4-10}$), or from 4 to 6 ($C_{4-6}$) carbon atoms. Examples of alkynyl groups include, but are not limited to, ethynyl (—C≡CH) and propargyl (—CH$_2$C≡CH). For example, $C_{2-6}$ alkynyl refers to a linear unsaturated monovalent hydrocarbon radical of 2 to 6 carbon atoms or a branched unsaturated monovalent hydrocarbon radical of 4 to 6 carbon atoms.

The term "cycloalkyl" refers to a cyclic saturated and/or non-aromatic unsaturated, bridged and/or non-bridged monovalent hydrocarbon radical. In certain embodiments, the cycloalkyl is optionally substituted, in one embodiment, with one or more substituents Q as defined herein. In certain embodiments, the cycloalkyl has from 3 to 20 ($C_{3-20}$), from 3 to 15 ($C_{3-15}$), from 3 to 10 ($C_{3-10}$), or from 3 to 7 ($C_{3-7}$) carbon atoms. Examples of cycloalkyl groups include, but are not limited to, cyclopropyl, cyclobutyl, cyclobutenyl, cyclopentyl, cyclopentenyl, cyclohexyl, cyclohexenyl, cycloheptyl, cycloheptenyl, bicyclo[2.1.1]hexyl, bicyclo[2.2.1]heptyl, decalinyl, and adamantyl.

The term "aryl" refers to a monocyclic monovalent aromatic hydrocarbon group and/or multicyclic monovalent aromatic hydrocarbon group that contain at least one aromatic hydrocarbon ring. In certain embodiments, the aryl has from 6 to 20 ($C_{6-20}$), from 6 to 15 ($C_{6-15}$), or from 6 to 10 ($C_{6-10}$) ring carbon atoms. Examples of aryl groups include, but are not limited to, phenyl, naphthyl, fluorenyl, azulenyl, anthryl, phenanthryl, pyrenyl, biphenylyl, and terphenylyl. The term "aryl" also refers to bicyclic or tricyclic carbon rings, where one of the rings is aromatic and the other carbon rings may be saturated, partially unsaturated, or aromatic, for example, dihydronaphthyl, indenyl, indanyl, or tetrahydronaphthyl (tetralinyl). In certain embodiments, the aryl is optionally substituted with one or more substituents Q as defined herein.

The term "aralkyl" or "arylalkyl" refers to a monovalent alkyl group substituted with one or more aryl groups. In certain embodiments, the aralkyl has from 7 to 30 ($C_{7-30}$), from 7 to 20 ($C_{7-20}$), or from 7 to 16 ($C_{7-16}$) carbon atoms. Examples of aralkyl groups include, but are not limited to, benzyl, 2-phenylethyl, and 3-phenylpropyl. In certain embodiments, the aralkyl is optionally substituted with one or more substituents Q as defined herein.

The term "heteroaryl" refers to a monovalent monocyclic aromatic group and/or monovalent polycyclic aromatic group that contain at least one aromatic ring, wherein at least one aromatic ring contains one or more heteroatoms independently selected from O, S, N, and P in the ring. The heteroaryl is bonded to the rest of a molecule through its aromatic ring. Each ring of the heteroaryl can contain one or two O atoms, one or two S atoms, one to four N atoms, and/or one or two P atoms, provided that the total number of heteroatoms in each ring is four or less and each ring contains at least one carbon atom. In certain embodiments, the heteroaryl has from 5 to 20, from 5 to 15, or from 5 to 10 ring atoms. Examples of monocyclic heteroaryl groups include, but are not limited to, furanyl, imidazolyl, isothiazolyl, isoxazolyl, oxadiazolyl, oxazolyl, pyrazinyl, pyrazolyl, pyridazinyl, pyridyl, pyrimidinyl, pyrrolyl, thiadiazolyl, thiazolyl, thiophenyl, tetrazolyl, triazinyl, and triazolyl. Examples of bicyclic heteroaryl groups include, but are not limited to, benzofuranyl, benzimidazolyl, benzisoxazolyl, benzopyranyl, benzothiadiazolyl, benzothiazolyl, benzothiophenyl, benzotriazolyl, benzoxazolyl, furopyridyl, imidazopyridinyl, imidazothiazolyl, indolizinyl, indolyl, indazolyl, isobenzofuranyl, isobenzothienyl, isoindolyl, isoquinolinyl, isothiazolyl, naphthyridinyl, oxazolopyridinyl, phthalazinyl, pteridinyl, purinyl, pyridopyridyl, pyrrolopyridyl, quinolinyl, quinoxalinyl, quinazolinyl, thiadiazolopyrimidyl, and thienopyridyl. Examples of tricyclic heteroaryl groups include, but are not limited to, acridinyl, benzindolyl, carbazolyl, dibenzofuranyl, perimidinyl, phenanthrolinyl, phenanthridinyl, phenarsazinyl, phenazinyl, phenothiazinyl, phenoxazinyl, and xanthenyl. In certain embodiments, the heteroaryl is optionally substituted with one or more substituents Q as defined herein.

The term "heterocyclyl" or "heterocyclic" refers to a monovalent monocyclic non-aromatic ring system and/or monovalent polycyclic ring system that contain at least one non-aromatic ring, wherein one or more of the non-aromatic ring atoms are heteroatoms independently selected from O, S, N, and P; and the remaining ring atoms are carbon atoms. In certain embodiments, the heterocyclyl or heterocyclic group has from 3 to 20, from 3 to 15, from 3 to 10, from 3 to 8, from 4 to 7, or from 5 to 6 ring atoms. The heterocyclyl is bonded to the rest of a molecule through its non-aromatic ring. In certain embodiments, the heterocyclyl is a monocyclic, bicyclic, tricyclic, or tetracyclic ring system, which may be spiro, fused, or bridged, and in which nitrogen or sulfur atoms may be optionally oxidized, nitrogen atoms may be optionally quaternized, and some rings may be partially or fully saturated, or aromatic. Examples of heterocyclic groups include, but are not limited to, azepinyl, benzodioxanyl, benzodioxolyl, benzofuranonyl, benzopyranonyl, benzopyranyl, benzotetrahydrofuranyl, benzotetrahydrothiophenyl, benzothiopyranyl, benzoxazinyl, β-carbolinyl, chromanyl, chromonyl, cinnolinyl, coumarinyl, decahydroisoquinolinyl, dihydrobenzisothiazinyl, dihydrobenzisoxazinyl, dihydrofuryl, dihydroisoindolyl, dihydropyranyl, dihydropyrazolyl, dihydropyrazinyl, dihydropyridinyl, dihydropyrimidinyl, dihydropyrrolyl, dioxolanyl, 1,4-dithianyl, furanonyl, imidazolidinyl, imidazolinyl, indolinyl, isobenzotetrahydrofuranyl, isobenzotetrahydrothiophenyl, isochromanyl, isocoumarinyl, isoindolinyl, isothiazolidinyl, isoxazolidinyl, morpholinyl, octahydroindolyl, octahydroisoindolyl, oxazolidinonyl, oxazolidinyl, oxiranyl, piperazinyl, piperidinyl, 4-piperidonyl, pyrazolidinyl, pyrazolinyl, pyrrolidinyl, pyrrolinyl, quinuclidinyl, tetrahydrofuryl, tetrahydroisoquinolinyl, tetrahydropyranyl, tetrahydrothiophenyl, thiamorpholinyl, thiazolidinyl, tetrahydroquinolinyl, and 1,3,5-trithianyl. In certain embodiments, the heterocyclyl is optionally substituted, in one embodiment, with one or more substituents Q as defined herein.

The term "halogen," "halide," or "halo" refers to fluorine, chlorine, bromine, and/or iodine.

The term "alkoxy" refers to —O-alkyl, —O-alkenyl, —O-alkynyl, —O-cycloalkyl, —O-aryl, —O-heteroaryl, and/or —O-heterocyclyl. In certain embodiments, the term "alkoxy" refers to —O-alkyl, —O-alkenyl, and/or —O-alkynyl. In certain embodiments, the term "alkoxy" refers to —O-alkyl.

The term "optionally substituted" is intended to mean that a chemical entity, group, or substituent, such as a hydrocarbon, alkane, aromatics, arene, and heteroarene, and an alkyl, alkenyl, alkynyl, cycloalkyl, aryl, aralkyl, heteroaryl, and heterocyclyl group, may be substituted with one or more, in one embodiment, one, two, or three, substituents Q, where each substituent Q is independently selected from, e.g., (a) oxo (=O), halo, cyano (—CN), and nitro (—NO$_2$); (b) C$_{1-6}$ alkyl, C$_{2-6}$ alkenyl, C$_{2-6}$ alkynyl, C$_{3-10}$ cycloalkyl, C$_{6-14}$ aryl, C$_{7-15}$ aralkyl, heteroaryl, and heterocyclyl, each of which is further optionally substituted with one or more, in one embodiment, one, two, three, four, or five, substituents Q$^a$; and (c) —C(O)R$^{1a}$, —C(O)OR$^{1a}$, —C(O)NR$^{1b}$R$^{1c}$, —C(=NR$^{1a}$)NR$^{1b}$R$^{1c}$, —OR$^{1a}$, —OC(O)R$^{1a}$, —OC(O)OR$^{1a}$, —OC(O)NR$^{1b}$R$^{1c}$, —OC(=NR$^{1a}$)NR$^{1b}$R$^{1c}$, —OS(O)R$^{1a}$, —OS(O)$_2$R$^{1a}$, —OS(O)NR$^{1b}$R$^{1c}$, —OS(O)$_2$NR$^{1b}$R$^{1c}$, —NR$^{1b}$R$^{1c}$, —NR$^{1a}$C(O)R$^{1d}$, —NR$^{1a}$C(O)OR$^{1d}$, —NR$^{1a}$C(O)NR$^{1b}$R$^{1c}$, —NR$^{1a}$C(=NR$^{1d}$)NR$^{1b}$R$^{1c}$, —NR$^{1a}$S(O)R$^{1d}$, —NR$^{1a}$S(O)$_2$R$^{1d}$, —NR$^{1a}$S(O)NR$^{1b}$R$^{1c}$, —NR$^{1a}$S(O)$_2$NR$^{1b}$R$^{1c}$, —P(O)R$^{1a}$R$^{1d}$, —P(O)(OR$^{1a}$)R$^{1d}$, —P(O)(OR$^{1a}$)(OR$^{1d}$), —SR$^{1a}$, —S(O)R$^{1a}$, —S(O)$_2$R$^{1a}$, —S(O)NR$^{1b}$R$^{1c}$, and —S(O)$_2$NR$^{1b}$R$^{1c}$, wherein each R$^{1a}$, R$^{1b}$, R$^{1c}$, and R$^{1d}$ is independently (i) hydrogen; (ii) C$_{1-6}$ alkyl, C$_{2-6}$ alkenyl, C$_{2-6}$ alkynyl, C$_{3-10}$ cycloalkyl, C$_{6-15}$ aryl, C$_{7-16}$ aralkyl, heteroaryl, or heterocyclyl, each of which is optionally substituted with one or more, in one embodiment, one, two, three, or four, substituents Q$^a$; or (iii) R$^{1b}$ and R$^{1c}$ together with the N atom to which they are attached form heteroaryl or heterocyclyl, optionally substituted with one or more, in one embodiment, one, two, three, or four, substituents Q$^a$. As used herein, all groups that can be substituted are "optionally substituted," unless otherwise specified.

In one embodiment, each substituent Q$^a$ is independently selected from the group consisting of (a) oxo, cyano, halo, and nitro; and (b) C$_{1-6}$ alkyl, C$_{2-6}$ alkenyl, C$_{2-6}$ alkynyl, C$_{3-10}$ cycloalkyl, C$_{6-15}$ aryl, C$_{7-16}$ aralkyl, heteroaryl, and heterocyclyl; and (c) —C(O)R$^{1e}$, —C(O)OR$^{1e}$, —C(O)NR$^{1f}$R$^{1g}$, —C(=NR$^{1e}$)NR$^{1f}$R$^{1g}$, —OR$^{1e}$, —OC(O)R$^{1e}$, —OC(O)OR$^{1e}$, —OC(O)NR$^{1f}$R$^{1g}$, —OC(=NR$^{1e}$)NR$^{1f}$R$^{1g}$, —OS(O)R$^{1e}$, —OS(O)$_2$R$^{1e}$, —OS(O)NR$^{1f}$R$^{1g}$, —OS(O)$_2$NR$^{1f}$R$^{1g}$, —NR$^{1f}$R$^{1g}$, —NR$^{1e}$C(O)R$^{1h}$, —NR$^{1e}$C(O)OR$^{1h}$, —NR$^{1e}$C(O)NR$^{1f}$R$^{1g}$, —NR$^{1e}$C(=NR$^{1h}$)NR$^{1f}$R$^{1g}$, —NR$^{1e}$S(O)R$^{1h}$, —NR$^{1e}$S(O)$_2$R$^{1h}$, —NR$^{1e}$S(O)NR$^{1f}$R$^{1g}$, —NR$^{1e}$S(O)$_2$NR$^{1f}$R$^{1g}$, —P(O)R$^{1e}$R$^{1h}$, —P(O)(OR$^{1e}$)R$^{1h}$, —P(O)(OR$^{1e}$)(OR$^{1h}$), —SR$^{1e}$, —S(O)R$^{1e}$, —S(O)$_2$R$^{1e}$, —S(O)NR$^{1f}$R$^{1g}$, and —S(O)$_2$NR$^{1f}$R$^{1g}$; wherein each R$^{1e}$, R$^{1f}$, R$^{1g}$, and R$^{1h}$ is independently (i) hydrogen, C$_{1-6}$ alkyl, C$_{2-6}$ alkenyl, C$_{2-6}$ alkynyl, C$_{3-10}$ cycloalkyl, C$_{6-15}$ aryl, C$_{7-16}$ aralkyl, heteroaryl, or heterocyclyl; or (ii) R$^{1f}$ and R$^{1g}$ together with the N atom to which they are attached form heteroaryl or heterocyclyl.

The terms "adding," "reacting," and "mixing" are used interchangeably to refer to contacting one reactant, reagent, solvent, catalyst, or reactive group with another reactant, reagent, solvent, catalyst, or reactive group. Unless otherwise specified, reactants, reagents, solvents, catalysts, and reactive groups can be added individually, simultaneously, or separately, and/or can be added in any order unless specified specifically. They can be added in the presence or absence of heat, and can optionally be added under an inert atmosphere (e.g., N$_2$ or Ar). In certain embodiments, the term "reacting" can also refer to in situ formation or intramolecular reaction where the reactive groups are in the same molecule.

The term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 1 or 2 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range. In certain embodiments, the term "about" or "approximately" means within 10%, 9%, 8%, 7%, 6%, 5%, 4%, 3%, 2%, 1%, 0.5%, or 0.05% of a given value or range.

The term "initiator" refers to a compound capable of providing one or more carbocations, in one embodiment, one, two, or three carbocations, to which a monomer (e.g., olefin or isobutylene) or a comonomer may add during a carbocationic polymerization.

The term "initiator residue" refers to a monovalent, divalent, or polyvalent moiety that is bonded to one, two, or more polymer groups. In certain embodiments, the initiator residue is derived from an initiator. In certain embodiments, the initiator residue is the portion of an initiator that remains after forming one, two, or more carbocations and reacting with a monomer or comonomer during a polymerization.

The term "monomer" refers to a compound that is capable of forming one of the two or more repetitive units of a polymer. In certain embodiments, the monomer is an olefin. In certain embodiments, the monomer is isobutene.

The term "comonomer" refers to a monomer that is capable of forming a copolymer with another monomer.

The term "polyolefin" refers to a polymer that comprises two or more monomeric units derived from an olefin. In certain embodiments, the polyolefin is polyethylene, polypropylene, polyisobutylene, or polystyrene. In certain embodiments, the polyolefin comprises an initiator residue. In certain embodiments, the polyolefin is a homopolyolefin. In certain embodiments, the polyolefin is a polyolefin copolymer.

The term "polyisobutylene" or "PIB" refers to a polymer comprising two or more monomeric isobutylene units. In certain embodiments, the polyisobutylene comprises an initiator residue. In certain embodiments, the polyisobutylene is a homopolyisobutylene. In certain embodiments, the polyisobutylene is a polyisobutylene copolymer.

The term "polyisobutylene group" refers to a divalent group of polyisobutylene.

The term "polyisobutyl" refers to a monovalent group of polyisobutylene.

The term "quasiliving polyolefin" or "living polyolefin" refers to a polyolefin that is formed under a quasiliving or living polymerization condition, under which the polymerization proceeds in the absence of a measurable irreversible chain-breaking event.

The term "homopolymer" refers to a polymer formed from a single type of monomer.

The term "homopolyolefin" refers to a homopolymer that comprises two or more monomeric units derived from an olefin.

The term "homopolyisobutylene" refers to a homopolymer comprising two or more monomeric isobutylene units.

The term "copolymer" refers to a polymer derived from two or more different species of monomers. In certain embodiments, the copolymer is derived from two different species of monomers.

The term "polyolefin copolymer" refers to a copolymer that comprises two or more monomeric units derived from an olefin. In certain embodiments, the polyolefin copolymer is a copolymer that comprises two or more monomeric units derived from ethylene, propylene, isobutylene, or styrene. In certain embodiments, the polyolefin copolymer comprises an initiator residue.

The term "number average molecular weight," "$M_n$," or "$\overline{M}_n$" of a polymer refers to a molecular weight (grams/mole) expressed as the total mass of the polymer divided by the total number of moles of the polymer according to the equation below:

$$\overline{M}_n = \frac{\sum W_i}{\sum N_i} \quad (1)$$

where $W_i$ is the weight of the fraction of the polymer possessing degree of polymerization of i, and $N_i$ is the number of moles of that fraction present in the polymer.

The term "weight average molecular weight," "$M_w$," or "$\overline{M}_w$" of a polymer refers to a molecular weight (grams/mole) calculated according to the equation below:

$$\overline{M}_w = \frac{\sum W_i M_i}{\sum W_i} \quad (2)$$

where $M_i$ is the molecular weight in grams/mole of the fraction of the polymer possessing degree of polymerization of i and $W_i$ is as defined herein.

The term "polydispersity index" or "PDI" refers to the ratio of the weight average molecular weight of a polymer to the number average molecular weight of the polymer.

The terms "carbenium ion" or "carbocation" refer to a positively charged carbon atom. In certain embodiments, the positively charged carbon atom has $sp^2$ hybridization and an empty p orbital.

The term "carbocation terminated polyolefin" refers to a polyolefin containing at least one carbocation end group. Examples include, but are not limited to, compounds of the formula:

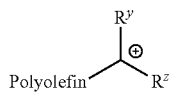

wherein $R^y$ and $R^z$ are each independently hydrogen, alkyl, or aryl; where the alkyl and aryl are optionally substituted, in one embodiment, with one or more substituents Q as defined herein. In certain embodiments, the carbocation terminated polyolefin has the structure of:

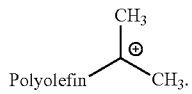

The term "carbocation terminated polyisobutylene" or "carbocation terminated PIB" refers to a polyisobutylene containing at least one carbocation end group. Examples include, but are not limited to, compounds of the formula:

The term "a coupled polyolefin" refers to the product of the addition of a carbocation terminated polyolefin to the terminal of another polyolefin. In certain embodiments, a coupled polyolefin has a number average molecular weight that is approximately twice that of the main and/or intended polyolefin product.

The term "a coupled polyisobutylene" refers to the product of the addition of a carbocation terminated polyisobutylene to the terminal of another polyisobutylene. In certain embodiments, a coupled polyisobutylene has a number average molecular weight that is approximately twice that of the main and/or intended polyisobutylene product.

The term "terminator" refers to a compound that deactivates a Lewis acid.

The term "number of chain ends" when referring to a polyolefin refers to the multiplication product of (i) the number of initiator residues within the polyolefin and (ii) the number average functionality of the initiator residues. In one embodiment, the number of chain ends of a polyolefin is determined experimentally, for example, using proton NMR.

The term "telechelic polymer" refers to a polymer having two or more terminal functional groups. See, Tasdelen et al., *Progress Polymer Sci.* 2011, 36, 455-567.

The term "main-chain" or "backbone chain" refers to a series of covalently bonded atoms that together create the continuous chain of a polymer.

The term "main-chain double bond" or "backbone chain double bond" refers to a carbon-carbon double bond that has at least one of its two double-bond carbons within the main chain or backbone of a polymer, but not at a terminus. In certain embodiments, the main-chain double bond is an exo-double bond. In certain embodiments, the main-chain double bond is an endo-double bond.

The term "exo-double bond" refers to a main-chain double bond that has only one of its two double-bond carbons within the main chain of a polymer.

The term "endo-double bond" refers to a main-chain double bond that has both of its two double bond carbons within the main chain of a polymer.

4.2 Methods

In one embodiment, provided herein is a method for preparing a functionalized polyolefin from an unsaturated polyolefin containing one or more non-aromatic main-chain double bonds, comprising contacting the unsaturated polyolefin with an optionally substituted aromatic compound in the presence of a Lewis acid and protic acid to form the functionalized polyolefin.

In another embodiment, provided herein is a method for preparing a functionalized polyolefin from an unsaturated polyolefin containing one or more non-aromatic main-chain double bonds, comprising the steps of:

(a) at least one selected from: contacting the unsaturated polyolefin with a Lewis acid to form a carbocationic polyolefin, contacting the unsaturated polyolefin with a Lewis acid to form a mixture, contacting an optionally substituted aromatic compound with a Lewis acid to form a mixture, contacting the unsaturated polyolefin with an optionally substituted aromatic compound to form a mixture, and contacting the unsaturated polyolefin with a Lewis acid and protic acid to form a mixture; and (b) at least one selected from: contacting the carbocationic polyolefin with an optionally substituted aromatic compound in the presence of a protic acid to form the functionalized polyolefin, contacting the mixture with an optionally substituted aromatic compound in the presence of a protic acid to form the functionalized polyolefin, contacting the mixture with the unsaturated polyolefin in the presence of a protic acid to form the functionalized polyolefin, contacting the mixture with a Lewis acid and protic acid to form the functionalized polyolefin, and contacting the mixture with an optionally substituted aromatic compound to form the functionalized polyolefin.

In certain embodiments, the functionalized polyolefin formed has a weight average molecular weight smaller than that of the unsaturated polyolefin. In certain embodiments, the functionalized polyolefin formed has a number average molecular weight smaller than that of the unsaturated polyolefin.

In certain embodiments, the functionalized polyolefin is formed via the reaction of one of the non-aromatic main-chain double bonds of the unsaturated polyolefin with the optionally substituted aromatic compound.

In yet another embodiment, provided herein is a method for reducing the size (e.g., the weight average molecular weight or number average molecular weight) of an unsaturated polyolefin containing one or more non-aromatic main-chain double bonds, comprising contacting the unsaturated polyolefin with an optionally substituted aromatic compound in the presence of a Lewis acid and protic acid.

In yet another embodiment, provided herein is a method for reducing the size of an unsaturated polyolefin containing one or more non-aromatic main-chain double bonds, comprising the steps of:

(a) at least one selected from: contacting the unsaturated polyolefin with a Lewis acid to form a carbocationic polyolefin, contacting the unsaturated polyolefin with a Lewis acid to form a mixture, contacting an optionally substituted aromatic compound with a Lewis acid to form a mixture, contacting the unsaturated polyolefin with an optionally substituted aromatic compound to form a mixture, and contacting the unsaturated polyolefin with a Lewis acid and protic acid to form a mixture; and (b) at least one selected from: contacting the carbocationic polyolefin with an optionally substituted aromatic compound in the presence of a protic acid, contacting the mixture with an optionally substituted aromatic compound in the presence of a protic acid, contacting the mixture with the unsaturated polyolefin in the presence of a protic acid, contacting the mixture with a Lewis acid and protic acid, and contacting the mixture with an optionally substituted aromatic compound.

In yet another embodiment, provided herein is a method for reducing the polydispersity index (i.e., increasing the homogeneity) of an unsaturated polyolefin containing one or more non-aromatic main-chain double bonds, comprising contacting the unsaturated polyolefin with an optionally substituted aromatic compound in the presence of a Lewis acid and protic acid.

In yet another embodiment, provided herein is a method for reducing the polydispersity index of an unsaturated polyolefin containing one or more non-aromatic main-chain double bonds, comprising the steps of:

(a) at least one selected from: contacting the unsaturated polyolefin with a Lewis acid to form a carbocationic polyolefin, contacting the unsaturated polyolefin with a Lewis acid to form a mixture, contacting an optionally substituted aromatic compound with a Lewis acid to form a mixture, contacting the unsaturated polyolefin with an optionally substituted aromatic compound to form a mixture, and contacting the unsaturated polyolefin with a Lewis acid and protic acid to form a mixture; and (b) at least one selected from: contacting the carbocationic polyolefin with an optionally substituted aromatic compound in the presence of a protic acid, contacting the mixture with an optionally substituted aromatic compound in the presence of a protic acid, contacting the mixture with the unsaturated polyolefin in the presence of a protic acid, contacting the mixture with a Lewis acid and protic acid, and contacting the mixture with an optionally substituted aromatic compound.

In certain embodiments, the unsaturated polyolefin is a coupled polyolefin. In certain embodiments, the unsaturated polyolefin is a coupled polyisobutylene. In certain embodiments, the unsaturated polyolefin is a coupled homopolyisobutylene. In certain embodiments, the unsaturated polyolefin is prepared under a quasiliving or living condition.

Examples of quasiliving or living polymerizations can be found, for example, in U.S. Pat. Nos. 6,969,744; 7,420,019; 7,576,161; 7,705,090; 7,709,580; 8,013,073; 8,063,154; and U.S. Pat. Nos. 8,133,954; 8,344,073; 8,383,736; 8,394,897; 8,394,898; 8,552,122; and 8,592,527; the disclosure of each of which is incorporated herein by reference in its entirety.

In certain embodiments, the unsaturated polyolefin has a weight average molecular weight ranging from about 1,000 to about 1,000,000, from about 1,000 to about 500,000, or from about 2,000 to about 250,000. In certain embodiments, the unsaturated polyolefin has a weight average molecular weight ranging from about 1,000 to about 1,000,000. In certain embodiments, the unsaturated polyolefin has a weight average molecular weight ranging from about 1,000 to about 500,000. In certain embodiments, the unsaturated polyolefin has a weight average molecular weight ranging from about 2,000 to about 250,000.

In certain embodiments, the unsaturated polyolefin has a number average molecular weight ranging from about 1,000 to about 1,000,000, from about 1,000 to about 500,000, or from about 2,000 to about 250,000. In certain embodiments, the unsaturated polyolefin has a number average molecular weight ranging from about 1,000 to about 1,000,000. In certain embodiments, the unsaturated polyolefin has a number average molecular weight ranging from about 1,000 to about 500,000. In certain embodiments, the unsaturated polyolefin has a number average molecular weight ranging from about 2,000 to about 250,000.

In certain embodiments, the unsaturated polyolefin has a polydispersity index of no greater than about 10, no greater than about 5, no greater than about 2.5, no greater than about 2, no greater than about 1.5, no greater than about 1.2, but no less than about 1.1.

In certain embodiments, the coupled polyolefin has 1, 2, 3, 4, or 5 non-aromatic main-chain double bonds.

In certain embodiments, the unsaturated polyolefin contains from about 1 to about 2,000, from about 1 to about 1,500, from about 1 to about 1,000, from about 1 to about 500, from about 1 to about 200, from about 1 to about 100, or from about 1 to about 50 non-aromatic main-chain double bonds. In certain embodiments, the unsaturated polyolefin contains from about 2 to about 1,500, from about 5 to about 1,000, from about 10 to about 500, from about 25 to about 500, from about 50 to about 500, or from about 100 to about 500 non-aromatic main-chain double bonds. In certain embodiments, the unsaturated polyolefin contains from about 1 to about 100, from about 1 to about 50, from about 1 to about 25, from about 1 to about 10, or from about 1 to about 5 non-aromatic main-chain double bonds. In certain embodiments, the unsaturated polyolefin contains 1, 2, 3, 4, or 5 non-aromatic main-chain double bonds.

In certain embodiments, the unsaturated polyolefin is a quasiliving or living unsaturated polyolefin.

In certain embodiments, the unsaturated polyolefin is an unsaturated homopolyolefin containing one or more non-aromatic main-chain double bonds. In certain embodiments, the unsaturated polyolefin is an unsaturated homopolyisobutylene containing one or more non-aromatic main-chain double bonds. In certain embodiments, the unsaturated polyolefin is an unsaturated polyolefin copolymer containing one or more non-aromatic main-chain double bonds.

In certain embodiments, the unsaturated polyolefin is a coupled polyolefin containing one or more non-aromatic main-chain double bonds.

In one embodiment, provided herein is a method for preparing a functionalized polyolefin, comprising contacting a coupled polyolefin with an optionally substituted aromatic compound in the presence of a Lewis acid and a protic acid to form the functionalized polyolefin.

In certain embodiments, the contacting step is performed in the presence of an excess amount of the Lewis acid relative to two times the number of non-aromatic main-chain double bonds of the polyolefin. In certain embodiments, the contacting step is performed in the presence of a stoichiometric or slight excess amount of the protic acid relative to two times the number of non-aromatic main-chain double bonds of the polyolefin. In certain embodiments, the contacting step is performed in the presence of an excess amount of the Lewis acid, and a stoichiometric or slight excess amount of the protic acid, relative to two times the number of non-aromatic main-chain double bonds of the polyolefin.

In certain embodiments, the polyolefin is a polyisobutylene. Thus, in one embodiment, the method provided herein is a method for preparing a functionalized polyisobutylene, comprising contacting a coupled polyisobutylene with an optionally substituted aromatic compound in the presence of a Lewis acid and a protic acid to form the functionalized polyisobutylene.

In another embodiment, the method provided herein is a method for preparing a functionalized polyisobutylene, comprising contacting a coupled polyisobutylene with an optionally substituted aromatic compound in the presence of a Lewis acid and a protic acid in a solvent to form the functionalized polyisobutylene.

In yet another embodiment, the method provided herein is a method for preparing a functionalized polyisobutylene, comprising contacting a coupled polyisobutylene with an optionally substituted aromatic compound in the presence of a Lewis acid and a protic acid in a mixture of an unsubstituted alkane and a halogenated alkane to form the functionalized polyisobutylene.

In another embodiment, provided herein is a method for preparing a functionalized polyolefin, comprising the steps of:

(a) contacting a coupled polyolefin with a Lewis acid to form a carbocationic coupled polyolefin; and (b) contacting the carbocationic coupled polyolefin with an optionally substituted aromatic compound in the presence of a protic acid to form the functionalized polyolefin.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In certain embodiments, the polyolefin is a polyisobutylene. Thus, in one embodiment, the method provided herein is a method for preparing a functionalized polyisobutylene, comprising the steps of:

(a) at least one selected from: contacting a coupled polyisobutylene with a Lewis acid to form a carbocationic coupled polyisobutylene, contacting a coupled polyisobutylene with a Lewis acid to form a carbocationic coupled polyisobutylene in a solvent, contacting a coupled polyisobutylene with a Lewis acid to form a carbocationic coupled polyisobutylene in a mixture of an unsubstituted alkane and a halogenated alkane, contacting a coupled polyisobutylene with a Lewis acid to form a reaction mixture, contacting a coupled polyisobutylene with a Lewis acid in a solvent to form a reaction mixture, contacting a coupled polyisobutylene with a Lewis acid in a mixture of an unsubstituted alkane and a halogenated alkane to form a reaction mixture, contacting an optionally substituted aromatic compound with a Lewis acid to form a reaction mixture, contacting an optionally substituted aromatic compound with a Lewis acid in a solvent to form a reaction mixture, contacting an optionally substituted aromatic compound with a Lewis acid in a mixture of an unsubstituted alkane and a halogenated alkane to form a reaction mixture, contacting a coupled polyisobutylene with an optionally substituted aromatic compound to form a mixture, contacting a coupled polyisobutylene with an optionally substituted aromatic compound in a solvent to form a mixture, contacting a coupled polyisobutylene with an optionally substituted aromatic compound in a mixture of an unsubstituted alkane and a halogenated alkane to form a reaction mixture, contacting a coupled polyisobutylene with a Lewis acid and protic acid to form a mixture, contacting a coupled polyisobutylene with a Lewis acid and protic acid in a solvent to form a mixture, contacting a coupled polyisobutylene with a Lewis acid and protic acid in a mixture of an unsubstituted alkane and a halogenated alkane to form a reaction mixture, contacting a polyisobutylene comprising a coupled polyisobutylene with a Lewis acid to form a carbocationic coupled polyisobutylene, contacting a polyisobutylene comprising a coupled polyisobutylene with a Lewis acid to form a carbocationic coupled polyisobutylene in a solvent, contacting a polyisobutylene comprising a coupled polyisobutylene with a Lewis acid to form a carbocationic coupled polyisobutylene in a mixture of an unsubstituted alkane and a halogenated alkane, contacting a polyisobutylene comprising a coupled polyisobutylene with a Lewis acid to form a reaction mixture, contacting a polyisobutylene comprising a coupled polyisobutylene with a Lewis acid in a solvent to form a reaction mixture, contacting a polyisobutylene comprising a coupled polyisobutylene with a Lewis acid in a mixture of an unsubstituted alkane and a halogenated alkane to form a reaction mixture, contacting a polyisobutylene comprising a coupled polyisobutylene with an optionally substituted aromatic compound to form a mixture, contacting a polyisobutylene comprising a coupled polyisobutylene with an optionally substituted aromatic compound in a solvent to form a mixture, contacting a polyisobutylene comprising a coupled polyisobutylene with an optionally substituted aromatic compound in a mixture of an unsubstituted alkane and a halogenated alkane to form a reaction mixture, contacting a polyisobutylene comprising a coupled polyisobutylene with a Lewis acid and protic acid to form a mixture, contacting a polyisobutylene comprising a coupled polyisobutylene with a Lewis acid and protic acid in a solvent to form a mixture, and contacting a polyisobutylene comprising a coupled polyisobutylene with a Lewis acid and protic acid in a mixture of an unsubstituted alkane and a halogenated alkane to form a reaction mixture; and (b) at least one selected from: contacting the carbocationic coupled polyisobutylene with an optionally substituted aromatic compound in the presence of a protic acid to form the functionalized polyisobutylene, contacting the reaction mixture with an optionally substituted aromatic compound in the presence of a protic acid to form the functionalized polyisobutylene, contacting the reaction mixture with a coupled polyisobutylene in the presence of a protic acid to form the functionalized polyisobutylene, contacting the mixture with a Lewis acid in the presence of a protic acid to form the functionalized polyisobutylene, contacting the mixture with an optionally substituted aromatic compound to form the functionalized polyisobutylene, contacting the reaction mixture with an optionally substituted aromatic compound in the presence of a protic acid to form the functionalized polyisobutylene, contacting the reaction mixture with a polyisobutylene comprising a coupled polyisobutylene in the presence of a protic acid to form the functionalized polyisobutylene, contacting the reaction mixture with a polyisobutylene comprising a coupled polyisobutylene in the presence of a protic acid to form the functionalized polyisobutylene, contacting the mixture with a Lewis acid and protic acid to form the functionalized polyisobutylene, and contacting the reaction mixture with an optionally substituted aromatic compound to form the functionalized polyisobutylene.

In yet another embodiment, provided herein is a method for preparing a functionalized polyolefin, comprising the steps of:

(a) contacting a coupled polyolefin with a Lewis acid to form a reaction mixture; and (b) contacting the reaction mixture with an optionally substituted aromatic compound in the presence of a protic acid to form the functionalized polyolefin.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In yet another embodiment, provided herein is a method for preparing a functionalized polyolefin, comprising the steps of:

(a) contacting an optionally substituted aromatic compound with a Lewis acid to form a reaction mixture; and (b) contacting the reaction mixture with a coupled polyolefin in the presence of a protic acid to form the functionalized polyolefin.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In yet another embodiment, provided herein is a method for preparing a functionalized polyolefin, comprising the steps of:

(a) contacting a coupled polyolefin with an optionally substituted aromatic compound to form a mixture; and (b) contacting the mixture with a Lewis acid and protic acid to form the functionalized polyolefin.

In certain embodiments, step (b) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (b) is performed in the presence of an excess amount of the Lewis acid, and a stoichiometric or slight excess amount of the protic acid, relative to two times the number of non-aromatic main-chain double bonds of the polyolefin.

In yet another embodiment, provided herein is a method for preparing a functionalized polyolefin, comprising the steps of:

(a) contacting a coupled polyolefin with a Lewis acid and protic acid to form a mixture; and (b) contacting the mixture with an optionally substituted aromatic compound to form the functionalized polyolefin.

In certain embodiments, step (a) is performed in the presence of an excess amount of the Lewis acid relative to two times the number of non-aromatic main-chain double bonds of the polyolefin. In certain embodiments, step (a) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and a stoichiometric or slight excess amount of the protic acid, relative to two times the number of non-aromatic main-chain double bonds of the polyolefin.

In yet another embodiment, provided herein is a method for preparing a functionalized polyolefin, comprising contacting a polyolefin that comprises a coupled polyolefin with an optionally substituted aromatic compound in the presence of a Lewis acid and a protic acid.

In certain embodiments, the contacting step is performed in the presence of an excess amount of the Lewis acid relative to two times the number of non-aromatic main-chain double bonds of the polyolefin. In certain embodiments, the contacting step is performed in the presence of a stoichiometric or slight excess amount of the protic acid relative to two times the number of non-aromatic main-chain double bonds of the polyolefin. In certain embodiments, the contacting step is performed in the presence of an excess amount of the Lewis acid, and a stoichiometric or slight excess amount of the protic acid, relative to two times the number of non-aromatic main-chain double bonds of the polyolefin.

In certain embodiments, the polyolefin is a polyisobutylene. Thus, in one embodiment, the method provided herein is a method for preparing a functionalized polyisobutylene, comprising contacting a polyisobutylene that comprises a coupled polyisobutylene with an optionally substituted aromatic compound in the presence of a Lewis acid and a protic acid.

In another embodiment, the method provided herein is a method for preparing a functionalized polyisobutylene, comprising contacting a polyisobutylene that comprises a coupled polyisobutylene with an optionally substituted aromatic compound in the presence of a Lewis acid and a protic acid in a solvent.

In yet another embodiment, the method provided herein is a method for preparing a functionalized polyisobutylene, comprising contacting a polyisobutylene that comprises a coupled polyisobutylene with an optionally substituted aromatic compound in the presence of a Lewis acid and a protic acid in a mixture of an unsubstituted alkane and a halogenated alkane.

In yet another embodiment, provided herein is a method for preparing a functionalized polyolefin, comprising the steps of:

(a) contacting a polyolefin comprising a coupled polyolefin with a Lewis acid to form a carbocationic coupled polyolefin; and (b) contacting the carbocationic coupled polyolefin with an optionally substituted aromatic compound in the presence of a protic acid to form the functionalized polyolefin.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In yet another embodiment, provided herein is a method for preparing a functionalized polyolefin, comprising the steps of:

(a) contacting a polyolefin comprising a coupled polyolefin with a Lewis acid to form a reaction mixture; and (b) contacting the reaction mixture with an optionally substituted aromatic compound in the presence of a protic acid to form the functionalized polyolefin.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In yet another embodiment, provided herein is a method for preparing a functionalized polyolefin, comprising the steps of:

(a) contacting an optionally substituted aromatic compound with a Lewis acid to form a reaction mixture; and (b) contacting the reaction mixture with a polyolefin comprising a coupled polyolefin in the presence of a protic acid to form the functionalized polyolefin.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In yet another embodiment, provided herein is a method for preparing a functionalized polyolefin, comprising the steps of:

(a) contacting a polyolefin comprising a coupled polyolefin with an optionally substituted aromatic compound to form a mixture; and (b) contacting the mixture with a Lewis acid and protic acid to form the functionalized polyolefin.

In certain embodiments, step (b) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (b) is performed in the presence of an excess amount of the Lewis acid, and a stoichiometric or slight excess amount of the protic acid, relative to two times the number of non-aromatic main-chain double bonds of the polyolefin.

In yet another embodiment, provided herein is a method for preparing a functionalized polyolefin, comprising the steps of:

(a) contacting a polyolefin comprising a coupled polyolefin with a Lewis acid and protic acid to form a mixture; and (b) contacting the mixture with an optionally substituted aromatic compound to form the functionalized polyolefin.

In certain embodiments, step (a) is performed in the presence of an excess amount of the Lewis acid relative to two times the number of non-aromatic main-chain double bonds of the polyolefin. In certain embodiments, step (a) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and a stoichiometric or slight excess amount of the protic acid, relative to two times the number of non-aromatic main-chain double bonds of the polyolefin.

In certain embodiments, the functionalized polyolefin formed (e.g., the functionalized polyisobutylene) has a weight average molecular weight smaller than that of the coupled polyolefin (e.g., the coupled polyisobutylene). In certain embodiments, the functionalized polyolefin formed (e.g., the functionalized polyisobutylene) has a number average molecular weight smaller than that of the coupled polyolefin (e.g., the coupled polyisobutylene).

In certain embodiments, the functionalized polyolefin is formed via the reaction of one of the non-aromatic main-chain double bonds of the coupled polyolefin with the optionally substituted aromatic compound.

In yet another embodiment, provided herein is a method for reducing the size (e.g., the weight average molecular weight or the number average molecular weight) of a polyolefin, comprising contacting the polyolefin with an optionally substituted aromatic compound in the presence of a Lewis acid and a protic acid.

In certain embodiments, the contacting step is performed in the presence of an excess amount of the Lewis acid relative to two times the number of non-aromatic main-chain double bonds of the polyolefin. In certain embodiments, the contacting step is performed in the presence of a stoichiometric or slight excess amount of the protic acid relative to two times the number of non-aromatic main-chain double bonds of the polyolefin. In certain embodiments, the contacting step is performed in the presence of an excess amount of the Lewis acid, and a stoichiometric or slight excess amount of the protic acid, relative to two times the number of non-aromatic main-chain double bonds of the polyolefin.

In certain embodiments, the polyolefin is a polyisobutylene. Thus, in one embodiment, the method provided herein is a method for reducing the size of a polyisobutylene, comprising contacting the polyisobutylene with an optionally substituted aromatic compound in the presence of a Lewis acid and a protic acid.

In another embodiment, the method provided herein is a method for reducing the size of a polyisobutylene, comprising contacting the polyisobutylene with an optionally substituted aromatic compound in the presence of a Lewis acid and a protic acid in a solvent.

In yet another embodiment, the method provided herein is a method for reducing the size of a polyisobutylene, comprising contacting the polyisobutylene with an optionally substituted aromatic compound in the presence of a Lewis acid and a protic acid in a mixture of an unsubstituted alkane and a halogenated alkane.

In yet another embodiment, provided herein is a method for reducing the size of a polyolefin that comprises a coupled polyolefin, comprising contacting the polyolefin that comprises a coupled polyolefin with an optionally substituted aromatic compound in the presence of a Lewis acid and a protic acid.

In certain embodiments, the contacting step is performed in the presence of an excess amount of the Lewis acid relative to two times the number of non-aromatic main-chain double bonds of the polyolefin. In certain embodiments, the contacting step is performed in the presence of a stoichiometric or slight excess amount of the protic acid relative to two times the number of non-aromatic main-chain double bonds of the polyolefin. In certain embodiments, the contacting step is performed in the presence of an excess amount of the Lewis acid, and a stoichiometric or slight excess amount of the protic acid relative to two times the number of non-aromatic main-chain double bonds of the polyolefin.

In certain embodiments, the polyolefin is a polyisobutylene. Thus, in one embodiment, the method provided herein is a method for reducing the size of a polyisobutylene that comprises a coupled polyisobutylene, comprising contacting the polyisobutylene that comprises a coupled polyisobutylene with an optionally substituted aromatic compound in the presence of a Lewis acid and a protic acid.

In another embodiment, the method provided herein is a method for reducing the size of a polyisobutylene that comprises a coupled polyisobutylene, comprising contacting the polyisobutylene that comprises a coupled polyisobutylene with an optionally substituted aromatic compound in the presence of a Lewis acid and a protic acid in a solvent.

In yet another embodiment, the method provided herein is a method for reducing the size of a polyisobutylene that comprises a coupled polyisobutylene, comprising contacting the polyisobutylene that comprises a coupled polyisobutylene with an optionally substituted aromatic compound in the presence of a Lewis acid and a protic acid in a mixture of an unsubstituted alkane and a halogenated alkane.

In yet another embodiment, provided herein is a method for reducing the size of a polyolefin that comprises a coupled polyolefin, comprising the steps of:

(a) contacting the polyolefin that comprises a coupled polyolefin with a Lewis acid to form a carbocationic coupled polyolefin; and (b) contacting the carbocationic coupled polyolefin with an optionally substituted aromatic compound in the presence of a protic acid.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In certain embodiments, the polyolefin is a polyisobutylene. Thus, in one embodiment, the method provided herein is a method for reducing the size of a polyisobutylene that comprises a coupled polyisobutylene. In one further embodiment, the method provided herein is a method for reducing the polydispersity index of a polyisobutylene that comprises a coupled polyisobutylene.

In one embodiment, provided herein is a method for reducing the content of a coupled polyisobutylene in a polyisobutylene that comprises a coupled polyisobutylene, which comprises the steps of:

(a) at least one selected from: contacting the polyisobutylene that comprises a coupled polyisobutylene with a Lewis acid to form a carbocationic coupled polyisobutylene, contacting the polyisobutylene that comprises a coupled polyisobutylene with a Lewis acid to form a carbocationic coupled polyisobutylene in a solvent, contacting the polyisobutylene that comprises a coupled polyisobutylene with a Lewis acid to form a carbocationic coupled polyisobutylene in a mixture of an unsubstituted alkane and a halogenated alkane, contacting the polyisobutylene that comprises a coupled polyisobutylene with a Lewis acid to form a reaction mixture, contacting the polyisobutylene that comprises a coupled polyisobutylene with a Lewis acid in a solvent to form a reaction mixture, contacting the polyisobutylene that comprises a coupled polyisobutylene with a Lewis acid in a mixture of an unsubstituted alkane and a halogenated alkane to form a reaction mixture, contacting an optionally substituted aromatic compound with a Lewis acid to form a reaction mixture, contacting an optionally substituted aromatic compound with a Lewis acid in a solvent to form a reaction mixture, contacting an optionally substituted aromatic compound with a Lewis acid in a mixture of an unsubstituted alkane and a halogenated alkane to form a reaction mixture, contacting the polyisobutylene that comprises a coupled polyisobutylene with an optionally substituted aromatic compound to form a mixture, contacting the polyisobutylene that comprises a coupled polyisobutylene with an optionally substituted aromatic compound in a solvent to form a mixture, contacting the polyisobutylene that comprises a coupled polyisobutylene with an optionally substituted aromatic compound in a mixture of an unsubstituted alkane and a halogenated alkane to form a reaction mixture, contacting the polyisobutylene that comprises a coupled polyisobutylene with a Lewis acid and protic acid to form a mixture, contacting the polyisobutylene that comprises a coupled polyisobutylene with a Lewis acid and protic acid in a solvent to form a mixture, and contacting the polyisobutylene that comprises a coupled polyisobutylene with a Lewis acid and protic acid in a mixture of an unsubstituted alkane and a halogenated alkane to form a reaction mixture; and (b) at least one selected from: contacting the coupled polyisobutylene with an optionally substituted aromatic compound in the presence of a protic acid, contacting the reaction mixture with an optionally substituted aromatic compound in the presence of a protic acid, contacting the reaction mixture with the polyisobutylene that comprises a coupled polyisobutylene in the presence of a protic acid, contacting the mixture with a Lewis acid and protic acid, contacting the mixture with an optionally substituted aromatic compound, and contacting the reaction mixture with an optionally substituted aromatic compound.

In yet another embodiment, provided herein is a method for reducing the size of a polyolefin that comprises a coupled polyolefin, comprising the steps of:

(a) contacting the polyisobutylene that comprises a coupled polyolefin with a Lewis acid to form a reaction mixture; and (b) contacting the reaction mixture with an optionally substituted aromatic compound in the presence of a protic acid.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In yet another embodiment, provided herein is a method for reducing the size of a polyolefin that comprises a coupled polyolefin, comprising the steps of:

(a) contacting an optionally substituted aromatic compound with a Lewis acid to form a reaction mixture; and (b) contacting the reaction mixture with the polyolefin that comprises a coupled polyolefin in the presence of a protic acid.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In yet another embodiment, provided herein is a method for reducing the size of a polyolefin that comprises a coupled polyolefin, comprising the steps of:

(a) contacting the polyolefin that comprises a coupled polyolefin with an optionally substituted aromatic compound to form a mixture; and (b) contacting the mixture with a Lewis acid in the presence of a protic acid.

In certain embodiments, step (b) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (b) is performed in the presence of an excess amount of the Lewis acid, and a stoichiometric or slight excess amount of the protic acid, relative to two times the number of non-aromatic main-chain double bonds of the polyolefin.

In yet another embodiment, provided herein is a method for reducing the size of a polyolefin that comprises a coupled polyolefin, comprising the steps of:

(a) contacting the polyolefin that comprises a coupled polyolefin with a Lewis acid and protic acid to form a mixture; and (b) contacting the mixture with an optionally substituted aromatic compound.

In certain embodiments, step (a) is performed in the presence of an excess amount of the Lewis acid relative to two times the number of non-aromatic main-chain double bonds of the polyolefin. In certain embodiments, step (a) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and a stoichiometric or slight excess amount of the protic acid, relative to two times the number of non-aromatic main-chain double bonds of the polyolefin.

In yet another embodiment, provided herein is a method for reducing the polydispersity index (i.e., increasing the homogeneity) of a polyolefin, comprising contacting the polyolefin with an optionally substituted aromatic compound in the presence of a Lewis acid and a protic acid.

In certain embodiments, the contacting step is performed in the presence of an excess amount of the Lewis acid relative to two times the number of non-aromatic main-chain double bonds of the polyolefin. In certain embodiments, the contacting step is performed in the presence of a stoichiometric or slight excess amount of the protic acid relative to two times the number of non-aromatic main-chain double bonds of the polyolefin. In certain embodiments, the contacting step is performed in the presence of an excess amount of the Lewis acid, and a stoichiometric or slight excess amount of the protic acid, relative to two times the number of non-aromatic main-chain double bonds of the polyolefin.

In certain embodiments, the polyolefin is a polyisobutylene. Thus, in one embodiment, the method provided herein is a method for reducing the polydispersity index of a polyisobutylene, comprising contacting the polyisobutylene with an optionally substituted aromatic compound in the presence of a Lewis acid and a protic acid.

In another embodiment, the method provided herein is a method for reducing the polydispersity index of a polyisobutylene, comprising contacting the polyisobutylene with an optionally substituted aromatic compound in the presence of a Lewis acid and a protic acid in a solvent.

In yet another embodiment, the method provided herein is a method for reducing the polydispersity index of a polyisobutylene, comprising contacting the polyisobutylene with an optionally substituted aromatic compound in the presence of a Lewis acid and a protic acid in a mixture of an unsubstituted alkane and a halogenated alkane.

In yet another embodiment, provided herein is a method for reducing the polydispersity index of a polyolefin that comprises a coupled polyolefin, comprising contacting the polyolefin that comprises a coupled polyolefin with an optionally substituted aromatic compound in the presence of a Lewis acid and a protic acid.

In certain embodiments, the contacting step is performed in the presence of an excess amount of the Lewis acid relative to two times the number of non-aromatic main-chain double bonds of the polyolefin. In certain embodiments, the contacting step is performed in the presence of a stoichiometric or slight excess amount of the protic acid relative to two times the number of non-aromatic main-chain double bonds of the polyolefin. In certain embodiments, the contacting step is performed in the presence of an excess amount of the Lewis acid, and a stoichiometric or slight excess amount of the protic acid, relative to two times the number of non-aromatic main-chain double bonds of the polyolefin.

In certain embodiments, the polyolefin is a polyisobutylene. Thus, in one embodiment, the method provided herein is a method for reducing the polydispersity index of a polyisobutylene that comprises a coupled polyisobutylene, comprising contacting the polyisobutylene that comprises a coupled polyisobutylene with an optionally substituted aromatic compound in the presence of a Lewis acid and a protic acid.

In another embodiment, the method provided herein is a method for reducing the polydispersity index of a polyisobutylene that comprises a coupled polyisobutylene, comprising contacting the polyisobutylene that comprises a coupled polyisobutylene with an optionally substituted aromatic compound in the presence of a Lewis acid and a protic acid in a solvent.

In yet another embodiment, the method provided herein is a method for reducing the polydispersity index of a polyisobutylene that comprises a coupled polyisobutylene, comprising contacting the polyisobutylene that comprises a coupled polyisobutylene with an optionally substituted aromatic compound in the presence of a Lewis acid and a protic acid in a mixture of an unsubstituted alkane and a halogenated alkane.

In yet another embodiment, provided herein is a method for reducing the polydispersity index of a polyolefin that comprises a coupled polyolefin, comprising the steps of:

(a) contacting the polyolefin that comprises a coupled polyolefin with a Lewis acid to form a carbocationic coupled polyolefin; and (b) contacting the carbocationic coupled polyolefin with an optionally substituted aromatic compound in the presence of a protic acid.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In yet another embodiment, provided herein is a method for reducing the polydispersity index of a polyolefin that comprises a coupled polyolefin, comprising the steps of:

(a) contacting the polyisobutylene that comprises a coupled polyolefin with a Lewis acid to form a reaction mixture; and (b) contacting the reaction mixture with an optionally substituted aromatic compound in the presence of a protic acid.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In yet another embodiment, provided herein is a method for reducing the polydispersity index of a polyolefin that comprises a coupled polyolefin, comprising the steps of:

(a) contacting the polyolefin that comprises a coupled polyolefin with an optionally substituted aromatic compound to form a mixture; and (b) contacting the mixture with a Lewis acid in the presence of a protic acid.

In certain embodiments, step (b) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (b) is performed in the presence of an excess amount of the Lewis acid, and a stoichiometric or slight excess amount of the protic acid, relative to two times the number of non-aromatic main-chain double bonds of the polyolefin.

In yet another embodiment, provided herein is a method for reducing the polydispersity index of a polyolefin that comprises a coupled polyolefin, comprising the steps of:

(a) contacting the polyolefin that comprises a coupled polyolefin with a Lewis acid and protic acid to form a mixture; and (b) contacting the mixture with an optionally substituted aromatic compound.

In certain embodiments, step (a) is performed in the presence of an excess amount of the Lewis acid relative to two times the number of non-aromatic main-chain double bonds of the polyolefin. In certain embodiments, step (a) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and a stoichiometric or slight excess amount of the protic acid, relative to two times the number of non-aromatic main-chain double bonds of the polyolefin.

In yet another embodiment, provided herein is a method for reducing the content of a coupled polyolefin in a polyolefin, comprising contacting the polyolefin with an optionally substituted aromatic compound in the presence of a Lewis acid and a protic acid.

In certain embodiments, the contacting step is performed in the presence of an excess amount of the Lewis acid relative to two times the number of non-aromatic main-chain double bonds of the polyolefin. In certain embodiments, the contacting step is performed in the presence of a stoichiometric or slight excess amount of the protic acid relative to two times the number of non-aromatic main-chain double bonds of the polyolefin. In certain embodiments, the contacting step is performed in the presence of an excess amount of the Lewis acid, and a stoichiometric or slight excess amount of the protic acid, relative to two times the number of non-aromatic main-chain double bonds of the polyolefin.

In certain embodiments, the polyolefin is a polyisobutylene. Thus, in one embodiment, the method provided herein is a method for reducing the content of a coupled polyisobutylene in a polyisobutylene, comprising contacting the polyisobutylene with an optionally substituted aromatic compound in the presence of a Lewis acid and a protic acid.

In another embodiment, the method provided herein is a method for reducing the content of a coupled polyisobutylene in a polyisobutylene, comprising contacting the polyisobutylene with an optionally substituted aromatic compound in the presence of a Lewis acid and a protic acid in a solvent.

In yet another embodiment, the method provided herein is a method for reducing the content of a coupled polyisobutylene in a polyisobutylene, comprising contacting the polyisobutylene with an optionally substituted aromatic compound in the presence of a Lewis acid and a protic acid in a mixture of an unsubstituted alkane and a halogenated alkane.

In yet another embodiment, provided herein is a method for reducing the content of a coupled polyolefin in a polyolefin that comprises a coupled polyolefin, comprising contacting the polyolefin that comprises a coupled polyolefin with an optionally substituted aromatic compound in the presence of a Lewis acid and a protic acid.

In certain embodiments, the contacting step is performed in the presence of an excess amount of the Lewis acid relative to two times the number of non-aromatic main-chain double bonds of the polyolefin. In certain embodiments, the contacting step is performed in the presence of a stoichiometric or slight excess amount of the protic acid relative to two times the number of non-aromatic main-chain double bonds of the polyolefin. In certain embodiments, the contacting step is performed in the presence of an excess amount of the Lewis acid, and a stoichiometric or slight excess amount of the protic acid, relative to two times the number of non-aromatic main-chain double bonds of the polyolefin.

In certain embodiments, the polyolefin is a polyisobutylene. Thus, in one embodiment, the method provided herein is a method for reducing the content of a coupled polyisobutylene in a polyisobutylene that comprises a polyisobutylene that comprises a coupled polyisobutylene, comprising contacting the coupled polyisobutylene with an optionally substituted aromatic compound in the presence of a Lewis acid and a protic acid.

In another embodiment, the method provided herein is a method for reducing the content of a coupled polyisobutylene in a polyisobutylene that comprises a coupled polyisobutylene, comprising contacting the polyisobutylene that comprises a coupled polyisobutylene with an optionally substituted aromatic compound in the presence of a Lewis acid and a protic acid in a solvent.

In yet another embodiment, the method provided herein is a method for reducing the content of a coupled polyisobutylene in a polyisobutylene that comprises a coupled polyisobutylene, comprising contacting the polyisobutylene that comprises a coupled polyisobutylene with an optionally substituted aromatic compound in the presence of a Lewis acid and a protic acid in a mixture of an unsubstituted alkane and a halogenated alkane.

In yet another embodiment, provided herein is a method for reducing the content of a coupled polyolefin in a polyolefin that comprises a coupled polyolefin, comprising the steps of:

(a) contacting the polyolefin that comprises a coupled polyolefin with a Lewis acid to form a carbocationic coupled polyolefin; and (b) contacting the carbocationic coupled polyolefin with an optionally substituted aromatic compound in the presence of a protic acid.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In yet another embodiment, provided herein is a method for reducing the content of a coupled polyolefin in a polyolefin that comprises a coupled polyolefin, comprising the steps of:

(a) contacting the polyolefin that comprises a coupled polyolefin with a Lewis acid to form a reaction mixture; and (b) contacting the reaction mixture with an optionally substituted aromatic compound in the presence of a protic acid.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In yet another embodiment, provided herein is a method for reducing the content of a coupled polyolefin in a polyolefin that comprises a coupled polyolefin, comprising the steps of:

(a) contacting an optionally substituted aromatic compound with a Lewis acid to form a reaction mixture; and (b) contacting the reaction mixture with the polyolefin that comprises a coupled polyolefin in the presence of a protic acid.

In certain embodiments, step (a) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds of the polyolefin.

In yet another embodiment, provided herein is a method for reducing the content of a coupled polyolefin in a polyolefin that comprises a coupled polyolefin, comprising the steps of:

(a) contacting the polyolefin that comprises a coupled polyolefin with an optionally substituted aromatic compound to form a mixture; and (b) contacting the mixture with a Lewis acid in the presence of a protic acid.

In certain embodiments, step (b) is performed in the presence of an excess amount of the Lewis acid relative to two times the number of non-aromatic main-chain double bonds of the polyolefin. In certain embodiments, step (b) is performed in the presence of a stoichiometric or slight excess amount of the protic acid relative to two times the number of non-aromatic main-chain double bonds of the polyolefin. In certain embodiments, step (b) is performed in the presence of an excess amount of the Lewis acid, and a stoichiometric or slight excess amount of the protic acid, relative to two times the number of non-aromatic main-chain double bonds of the polyolefin.

In still another embodiment, provided herein is a method for reducing the content of a coupled polyolefin in a polyolefin that comprises a coupled polyolefin, comprising the steps of:

(a) contacting the polyolefin that comprises a coupled polyolefin with a Lewis acid and protic acid to form a mixture; and (b) contacting the mixture with an optionally substituted aromatic compound.

In certain embodiments, step (a) is performed in the presence of an excess amount of the Lewis acid relative to two times the number of non-aromatic main-chain double bonds of the polyolefin. In certain embodiments, step (a) is performed in the presence of a stoichiometric or slight excess amount of the protic acid relative to two times the number of non-aromatic main-chain double bonds of the polyolefin. In certain embodiments, step (a) is performed in the presence of an excess amount of the Lewis acid, and a stoichiometric or slight excess amount of the protic acid, relative to two times the number of non-aromatic main-chain double bonds of the polyolefin.

In certain embodiments, the coupled polyolefin content is reduced to no greater than about 5% by weight, no greater than about 4% by weight, no greater than about 3% by weight, no greater than about 2% by weight, or no greater than about 1% by weight.

In certain embodiments, the unsaturated polyolefin is a polyolefin copolymer containing one or more non-aromatic main-chain double bonds.

In one embodiment, provided herein is a method for preparing a functionalized polyolefin from a polyolefin copolymer containing one or more non-aromatic main-chain double bonds, comprising contacting the polyolefin copolymer with an optionally substituted aromatic compound in the presence of a Lewis acid and protic acid to form the functionalized polyolefin.

In certain embodiments, the contacting step is performed in the presence of an excess amount of the Lewis acid relative to two times the number of non-aromatic main-chain double bonds in the polyolefin copolymer. In certain embodiments, the contacting step is performed in the presence of a stoichiometric or slight excess amount of the protic acid relative to two times the number of non-aromatic main-chain double bonds in the polyolefin copolymer. In certain embodiments, the contacting step is performed in the presence of an excess amount of the Lewis acid, and a stoichiometric or slight excess amount of the protic acid, relative to two times the number of non-aromatic main-chain double bonds in the polyolefin copolymer.

In another embodiment, provided herein is a method for preparing a functionalized polyolefin from a polyolefin copolymer containing one or more non-aromatic main-chain double bonds, comprising the steps of:

(a) at least one selected from: contacting the polyolefin copolymer with a Lewis acid to form a carbocationic polyolefin copolymer, contacting the polyolefin copolymer with a Lewis acid to form a mixture, contacting an optionally substituted aromatic compound with a Lewis acid to form a mixture, contacting the polyolefin copolymer with an optionally substituted aromatic compound to form a mixture, and contacting the polyolefin copolymer with a Lewis acid and protic acid to form a mixture; and (b) at least one selected from: contacting the carbocationic polyolefin copolymer with an optionally substituted aromatic compound in the presence of a protic acid to form the functionalized polyolefin, contacting the mixture with an optionally substituted aromatic compound in the presence of a protic acid to form the functionalized polyolefin, contacting the mixture with a Lewis acid and protic acid to form the functionalized polyolefin, and contacting the mixture with an optionally substituted aromatic compound to form the functionalized polyolefin.

In certain embodiments, step (a) is performed in the presence of an excess amount of the Lewis acid relative to two times the number of non-aromatic main-chain double bonds in the polyolefin copolymer. In certain embodiments, step (b) is performed in the presence of a stoichiometric or slight excess amount of the protic acid relative to two times the number of non-aromatic main-chain double bonds in the polyolefin copolymer. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds in the polyolefin copolymer.

In certain embodiments, step (b) is performed in the presence of an excess amount of the Lewis acid relative to two times the number of non-aromatic main-chain double bonds in the polyolefin copolymer. In certain embodiments, step (b) is performed in the presence of a stoichiometric or slight excess amount of the protic acid relative to two times the number of non-aromatic main-chain double bonds in the polyolefin copolymer. In certain embodiments, step (b) is performed in the presence of an excess amount of the Lewis acid, and a stoichiometric or slight excess amount of the protic acid, relative to two times the number of non-aromatic main-chain double bonds in the polyolefin copolymer.

In certain embodiments, step (a) is performed in the presence of an excess amount of the Lewis acid relative to two times the number of non-aromatic main-chain double bonds in the polyolefin copolymer. In certain embodiments, step (a) is performed in the presence of a stoichiometric or slight excess amount of the protic acid relative to two times the number of non-aromatic main-chain double bonds in the polyolefin copolymer. In certain embodiments, step (a) is performed in the presence of an excess amount of the Lewis acid, and a stoichiometric or slight excess amount of the protic acid, relative to two times the number of non-aromatic main-chain double bonds in the polyolefin copolymer.

In certain embodiments, the functionalized polyolefin formed has a weight average molecular weight smaller than that of the polyolefin copolymer. In certain embodiments, the functionalized polyolefin formed has a number average molecular weight smaller than that of the polyolefin copolymer.

In certain embodiments, the functionalized polyolefin prepared according to a method provided herein is difunctional. In certain embodiments, the polyolefin copolymer used in a method provided herein is not made from a difunctional initiator. In certain embodiments, the polyolefin copolymer used in a method provided herein does not contain a residue of a difunctional initiator.

In one embodiment, provided herein is a method for preparing a telechelic polyolefin from a polyolefin copolymer containing two or more non-aromatic main-chain double bonds, comprising contacting the polyolefin copolymer with an optionally substituted aromatic compound in the presence of a Lewis acid and protic acid to form the telechelic polyolefin.

In certain embodiments, the contacting step is performed in the presence of an excess amount of the Lewis acid relative to two times the number of non-aromatic main-chain double bonds in the polyolefin copolymer. In certain embodiments, the contacting step is performed in the presence of a stoichiometric or slight excess amount of the protic acid relative to two times the number of non-aromatic main-chain double bonds in the polyolefin copolymer. In certain embodiments, the contacting step is performed in the presence of an excess amount of the Lewis acid, and a stoichiometric or slight excess amount of the protic acid relative to two times the number of non-aromatic main-chain double bonds in the polyolefin copolymer.

In another embodiment, provided herein is a method for preparing a telechelic polyolefin from a polyolefin copolymer containing two or more non-aromatic main-chain double bonds, comprising the steps of:

(a) at least one selected from: contacting the polyolefin copolymer with a Lewis acid to form a carbocationic polyolefin copolymer, contacting the polyolefin copolymer with a Lewis acid to form a mixture, contacting an optionally substituted aromatic compound with a Lewis acid to form a mixture, contacting the polyolefin copolymer with an optionally substituted aromatic compound to form a mixture, and contacting the polyolefin copolymer with a Lewis acid and protic acid to form a mixture; and (b) at least one selected from: contacting the carbocationic polyolefin copolymer with an optionally substituted aromatic compound in the presence of a protic acid to form the telechelic polyolefin, contacting the mixture with an optionally substituted aromatic compound in the presence of a protic acid to form the telechelic polyolefin, contacting the mixture with the polyolefin copolymer in the presence of a protic acid to form the telechelic polyolefin, contacting the mixture with a Lewis acid and protic acid to form the telechelic polyolefin, and contacting the mixture with an optionally substituted aromatic compound to form the telechelic polyolefin.

In certain embodiments, step (a) is performed in the presence of an excess amount of the Lewis acid relative to two times the number of non-aromatic main-chain double bonds in the polyolefin copolymer. In certain embodiments, step (b) is performed in the presence of a stoichiometric or slight excess amount of the protic acid relative to two times the number of non-aromatic main-chain double bonds in the polyolefin copolymer. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds in the polyolefin copolymer.

In certain embodiments, step (b) is performed in the presence of an excess amount of the Lewis acid relative to two times the number of non-aromatic main-chain double bonds in the polyolefin copolymer. In certain embodiments, step (b) is performed in the presence of a stoichiometric or slight excess amount of the protic acid relative to two times the number of non-aromatic main-chain double bonds in the polyolefin copolymer. In certain embodiments, step (b) is performed in the presence of an excess amount of the Lewis acid, and a stoichiometric or slight excess amount of the protic acid, relative to two times the number of non-aromatic main-chain double bonds in the polyolefin copolymer.

In certain embodiments, step (a) is performed in the presence of an excess amount of the Lewis acid relative to two times the number of non-aromatic main-chain double bonds in the polyolefin copolymer. In certain embodiments, step (a) is performed in the presence of a stoichiometric or slight excess amount of the protic acid relative to two times the number of non-aromatic main-chain double bonds in the polyolefin copolymer. In certain embodiments, step (a) is performed in the presence of an excess amount of the Lewis acid, and a stoichiometric or slight excess amount of the protic acid, relative to two times the number of non-aromatic main-chain double bonds in the polyolefin copolymer.

In certain embodiments, the telechelic polyolefin formed has a weight average molecular weight smaller than that of the polyolefin copolymer. In certain embodiments, the telechelic polyolefin formed has a number average molecular weight smaller than that of the polyolefin copolymer.

In certain embodiments, the telechelic polyolefin prepared according to a method provided herein is difunctional. In certain embodiments, the polyolefin copolymer used in a method provided herein is not made from a difunctional initiator. In certain embodiments, the polyolefin copolymer used in a method provided herein does not contain a residue of a difunctional initiator.

In yet another embodiment, provided herein is a method for reducing the size of a polyolefin copolymer containing one or more non-aromatic main-chain double bonds, comprising contacting the polyolefin copolymer with an optionally substituted aromatic compound in the presence of a Lewis acid and protic acid.

In certain embodiments, the contacting step is performed in the presence of an excess amount of the Lewis acid relative to two times the number of non-aromatic main-chain double bonds in the polyolefin copolymer. In certain embodiments, the contacting step is performed in the presence of a stoichiometric or slight excess amount of the protic acid relative to two times the number of non-aromatic main-chain double bonds in the polyolefin copolymer. In certain embodiments, the contacting step is performed in the presence of an excess amount of the Lewis acid, and a stoichiometric or slight excess amount of the protic acid, relative to two times the number of non-aromatic main-chain double bonds in the polyolefin copolymer.

In yet another embodiment, provided herein is a method for reducing the size of a polyolefin copolymer containing one or more non-aromatic main-chain double bonds, comprising the steps of:

(a) at least one selected from: contacting the polyolefin copolymer with a Lewis acid to form a carbocationic polyolefin copolymer, contacting the polyolefin copolymer with a Lewis acid to form a mixture, contacting an optionally substituted aromatic compound with a Lewis acid to form a mixture, contacting the polyolefin copolymer with an optionally substituted aromatic compound to form a mixture, and contacting the polyolefin copolymer with a Lewis acid and protic acid to form a mixture; and (b) at least one selected from: contacting the carbocationic polyolefin copolymer with an optionally substituted aromatic compound in the presence of a protic acid, contacting the mixture with an optionally substituted aromatic compound in the presence of a protic acid, contacting the mixture with the polyolefin copolymer in the presence of a protic acid, contacting the mixture with a Lewis acid and protic acid, and contacting the mixture with an optionally substituted aromatic compound.

In certain embodiments, step (a) is performed in the presence of an excess amount of the Lewis acid relative to two times the number of non-aromatic main-chain double bonds in the polyolefin copolymer. In certain embodiments, step (b) is performed in the presence of a stoichiometric or slight excess amount of the protic acid relative to two times the number of non-aromatic main-chain double bonds in the polyolefin copolymer. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds in the polyolefin copolymer.

In certain embodiments, step (b) is performed in the presence of an excess amount of the Lewis acid relative to two times the number of non-aromatic main-chain double bonds in the polyolefin copolymer. In certain embodiments, step (b) is performed in the presence of a stoichiometric or slight excess amount of the protic acid relative to two times the number of non-aromatic main-chain double bonds in the polyolefin copolymer. In certain embodiments, step (b) is performed in the presence of an excess amount of the Lewis acid, and a stoichiometric or slight excess amount of the protic acid, relative to two times the number of non-aromatic main-chain double bonds in the polyolefin copolymer.

In certain embodiments, step (a) is performed in the presence of an excess amount of the Lewis acid relative to two times the number of non-aromatic main-chain double bonds in the polyolefin copolymer. In certain embodiments, step (a) is performed in the presence of a stoichiometric or slight excess amount of the protic acid relative to two times the number of non-aromatic main-chain double bonds in the polyolefin copolymer. In certain embodiments, step (a) is performed in the presence of an excess amount of the Lewis acid, and a stoichiometric or slight excess amount of the protic acid, relative to two times the number of non-aromatic main-chain double bonds in the polyolefin copolymer.

In yet another embodiment, provided herein is a method for reducing the polydispersity index (i.e., increasing the homogeneity) of a polyolefin copolymer containing one or more non-aromatic main-chain double bonds, comprising contacting the polyolefin copolymer with an optionally substituted aromatic compound in the presence of a Lewis acid and protic acid.

In certain embodiments, the contacting step is performed in the presence of an excess amount of the Lewis acid relative to two times the number of non-aromatic main-chain double bonds in the polyolefin copolymer. In certain embodiments, the contacting step is performed in the presence of a stoichiometric or slight excess amount of the protic acid relative to two times the number of non-aromatic main-chain double bonds in the polyolefin copolymer. In certain embodiments, the contacting step is performed in the presence of an excess amount of the Lewis acid, and a stoichiometric or slight excess amount of the protic acid, relative to two times the number of non-aromatic main-chain double bonds in the polyolefin copolymer.

In yet another embodiment, provided herein is a method for reducing the polydispersity index of a polyolefin copolymer containing one or more non-aromatic main-chain double bonds, comprising the steps of:

(a) at least one selected from: contacting the polyolefin copolymer with a Lewis acid to form a carbocationic polyolefin copolymer, contacting the polyolefin copolymer with a Lewis acid to form a mixture, contacting an optionally substituted aromatic compound with a Lewis acid to form a mixture, and contacting the polyolefin copolymer with an optionally substituted aromatic compound to form a mixture, or contacting the polyolefin copolymer with a Lewis acid and protic acid to form a mixture; and (b) at least one selected from: contacting the carbocationic polyolefin copolymer with an optionally substituted aromatic compound in the presence of a protic acid, contacting the mixture with an optionally substituted aromatic compound in the presence of a protic acid, contacting the mixture with the polyolefin copolymer in the presence of a protic acid, contacting the mixture with a Lewis acid and protic acid, and contacting the mixture with an optionally substituted aromatic compound.

In certain embodiments, step (a) is performed in the presence of an excess amount of the Lewis acid relative to two times the number of non-aromatic main-chain double bonds in the polyolefin copolymer. In certain embodiments, step (b) is performed in the presence of a stoichiometric or slight excess amount of the protic acid relative to two times the number of non-aromatic main-chain double bonds in the polyolefin copolymer. In certain embodiments, step (a) is performed in the presence of an excess amount of the Lewis acid, and step (b) is performed in the presence of a stoichiometric or slight excess amount of the protic acid, relative to two times the number of non-aromatic main-chain double bonds in the polyolefin copolymer.

In certain embodiments, step (b) is performed in the presence of an excess amount of the Lewis acid relative to two times the number of non-aromatic main-chain double bonds in the polyolefin copolymer. In certain embodiments, step (b) is performed in the presence of a stoichiometric or slight excess amount of the protic acid relative to two times the number of non-aromatic main-chain double bonds in the polyolefin copolymer. In certain embodiments, step (b) is performed in the presence of an excess amount of the Lewis acid, and a stoichiometric or slight excess amount of the protic acid, relative to two times the number of non-aromatic main-chain double bonds in the polyolefin copolymer.

In certain embodiments, step (a) is performed in the presence of an excess amount of the Lewis acid relative to two times the number of non-aromatic main-chain double bonds in the polyolefin copolymer. In certain embodiments, step (a) is performed in the presence of a stoichiometric or slight excess amount of the protic acid relative to two times the number of non-aromatic main-chain double bonds in the polyolefin copolymer. In certain embodiments, step (a) is performed in the presence of an excess amount of the Lewis acid, and a stoichiometric or slight excess amount of the protic acid, relative to two times the number of non-aromatic main-chain double bonds in the polyolefin copolymer.

In certain embodiments, the methods provided herein are performed in a solvent. In certain embodiments, the methods provided herein are performed in a mixture of an unsubstituted alkane and a halogenated alkane. In certain embodiments, the methods provided herein are performed in a mixture of n-hexane and methyl chloride. In certain embodiments, the methods provided herein are performed in a mixture of n-hexane and methylene chloride.

a. Coupled Polyolefins

In certain embodiments, the coupled polyolefin is a coupled homopolyolefin. In certain embodiments, the coupled polyolefin is prepared under a quasiliving or living condition.

In certain embodiments, the coupled polyolefin is a coupled polyisobutylene. In certain embodiments, the coupled polyolefin is a coupled homopolyisobutylene. In certain embodiments, the coupled polyisobutylene is prepared under a quasiliving or living condition.

Examples of quasiliving or living polymerizations can be found, for example, in U.S. Pat. Nos. 6,969,744; 7,420,019; 7,576,161; 7,705,090; 7,709,580; 8,013,073; 8,063,154; and 8,133,954; and U.S. Pat. App. Pub. Nos. 2009/0247716; 2010/0184918; 2010/0249001; 2010/0311915; 2011/0028681; and 2011/0306745; the disclosure of each of which is incorporated herein by reference in its entirety.

In certain embodiments, the coupled polyolefin has a weight average molecular weight ranging from about 1,000 to about 200,000, from about 1,000 to about 100,000, from about 1,000 to about 40,000, from about 1,000 to about 20,000, from about 1,000 to about 10,000, or from about 1,000 to about 5,000. In certain embodiments, the coupled polyolefin has a weight average molecular weight from about 1,000 to about 200,000. In certain embodiments, the coupled polyolefin has a weight average molecular weight from about 1,000 to about 100,000. In certain embodiments, the coupled polyolefin has a weight average molecular weight from about 1,000 to about 40,000. In certain embodiments, the coupled polyolefin has a weight average molecular weight from about 1,000 to about 20,000. In certain embodiments, the coupled polyolefin has a weight average molecular weight from about 1,000 to about 10,000. In certain embodiments, the coupled polyolefin has a weight average molecular weight from about 1,000 to about 5,000. In certain embodiments, the coupled polyolefin has a weight average molecular weight of about 1,000, about 2,000, about 3,000, about 4,000, about 5,000, about 6,000, about 7,000, about 8,000, about 9,000, or about 10,000.

In certain embodiments, the coupled polyolefin has a weight average molecular weight ranging from about 2,000 to about 6,000 or from about 3,000 to about 5,000. In certain embodiments, the coupled polyolefin has a weight average molecular weight of about 2,000, about 2,200, about 2,400, about 2,600, about 2,800, about 3,000, about 3,200, about 3,400, about 3,600, about 3,800, about 4,000, about 4,200, about 4,400, about 4,600, about 4,800, about 5,000, about 5,200, about 5,400, about 5,600, about 5,800, or about 6,000.

In certain embodiments, the coupled polyolefin has a number average molecular weight ranging from about 1,000 to about 200,000, from about 1,000 to about 100,000, from about 1,000 to about 40,000, from about 1,000 to about 20,000, from about 1,000 to about 10,000, or from about 1,000 to about 5,000. In certain embodiments, the coupled polyolefin has a number average molecular weight from about 1,000 to about 200,000. In certain embodiments, the coupled polyolefin has a number average molecular weight from about 1,000 to about 100,000. In certain embodiments, the coupled polyolefin has a number average molecular weight from about 1,000 to about 40,000. In certain embodiments, the coupled polyolefin has a number average molecular weight from about 1,000 to about 20,000. In certain embodiments, the coupled polyolefin has a number average molecular weight from about 1,000 to about 10,000. In certain embodiments, the coupled polyolefin has a number average molecular weight from about 1,000 to about 5,000. In certain embodiments, the coupled polyolefin has a number average molecular weight of about 1,000, about 2,000, about 3,000, about 4,000, about 5,000, about 6,000, about 7,000, about 8,000, about 9,000, or about 10,000.

In certain embodiments, the coupled polyolefin has a number average molecular weight ranging from about 2,000 to about 6,000 or from about 3,000 to about 5,000. In certain embodiments, the coupled polyolefin has a number average molecular weight of about 2,000, about 2,200, about 2,400, about 2,600, about 2,800, about 3,000, about 3,200, about 3,400, about 3,600, about 3,800, about 4,000, about 4,200, about 4,400, about 4,600, about 4,800, about 5,000, about 5,200, about 5,400, about 5,600, about 5,800, or about 6,000.

In certain embodiments, the coupled polyolefin has a polydispersity index of no greater than about 10, no greater than about 5, no greater than about 2.5, no greater than about 2, no greater than about 1.5, no greater than about 1.2, but no less than about 1.1.

In certain embodiments, the coupled polyolefin has 1, 2, 3, 4, or 5 non-aromatic main-chain double bonds.

In one embodiment, the coupled polyolefin has the structure of Formula I:

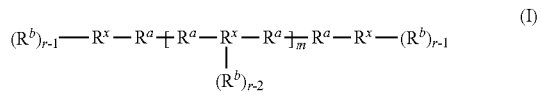

wherein:
each $R^a$ is independently a divalent polyolefin group;
each $R^b$ is independently a monovalent polyolefin group;
each $R^x$ is independently an initiator residue of functionality r;
each r is independently an integer of 2, 3, 4, 5, 6, 7, or 8; and
m is an integer of 0, 1, 2, 3, 4, or 5.

In another embodiment, the coupled polyolefin has the structure of Formula II:

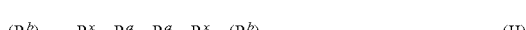

wherein each r is independently an integer of 1, 2, 3, 4, 5, 6, 7, or 8; and $R^a$, $R^b$, and $R^x$ are each as defined herein.

In yet another embodiment, the coupled polyolefin is a coupled polyisobutylene having the structure of Formula I:

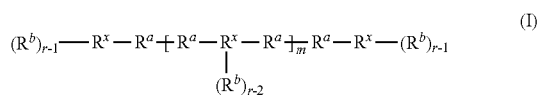

wherein:
each $R^a$ is independently a divalent polyisobutylene group;
each $R^b$ is independently a monovalent polyisobutyl group; and
$R^x$, r, and m are each as defined herein.

In still another embodiment, the coupled polyolefin is a coupled polyisobutylene having the structure of Formula II:

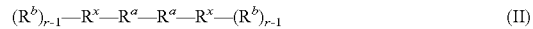

wherein:
each $R^a$ is independently a divalent polyisobutylene group;
each $R^b$ is independently a monovalent polyisobutyl group; and
$R^x$ and r are each as defined herein.

In certain embodiments, the coupled polyolefin is an exo-coupled isomer. In certain embodiments, the coupled polyolefin is an endo-coupled isomer. In certain embodiments, the coupled polyolefin is a mixture of exo-coupled and endo-coupled isomers.

In certain embodiments, the coupled polyisobutylene is an exo-coupled isomer. In certain embodiments, the coupled polyisobutylene is an endo-coupled isomer. In certain embodiments, the coupled polyisobutylene is a mixture of exo-coupled and endo-coupled isomers.

In certain embodiments, the exo-coupled isomer has the structure of

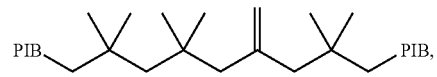

where PIB is a polyisobutyl group.

In certain embodiments, the endo-coupled isomer has the structure of

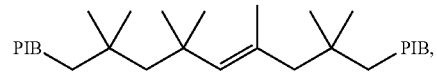

where PIB is a polyisobutyl group.

In certain embodiments, the coupled polyolefin used in the methods provided herein has a purity of no less than about 5% by weight, no less than about 10% by weight, no less than about 20% by weight, no less than about 30% by weight, no less than about 40% by weight, or no less than about 50% by weight. In certain embodiments, the coupled polyolefin used in the methods provided herein has a purity of no less than about 5% by weight. In certain embodiments, the coupled polyolefin used in the methods provided herein has a purity of no less than about 10% by weight. In certain embodiments, the coupled polyolefin used in the methods provided herein has a purity of no less than about 20% by weight. In certain embodiments, the coupled polyolefin used in the methods provided herein has a purity of no less than about 30% by weight. In certain embodiments, the coupled polyolefin used in the methods provided herein has a purity of no less than about 40% by weight. In certain embodiments, the coupled polyolefin used in the methods provided herein has a purity of no less than about 50% by weight. In certain embodiments, the coupled polyolefin used in the methods provided herein is purified.

In certain embodiments, the coupled polyolefin is a mixture of an uncoupled polyolefin and the coupled polyolefin. In certain embodiments, the mixture used in the methods provided herein contains no less than about 5% by weight, no less than about 10% by weight, no less than about 20% by weight, no less than about 30% by weight, no less than about 40% by weight, or no less than about 50% by weight of the coupled polyolefin. In certain embodiments, the mixture used in the methods provided herein contains no less than about 5% by weight of the coupled polyolefin. In certain embodiments, the mixture used in the methods provided herein contains no less than about 10% by weight of the coupled polyolefin. In certain embodiments, the mixture used in the methods provided herein contains no less than about 20% by weight of the coupled polyolefin. In certain embodiments, the mixture used in the methods provided herein contains no less than about 30% by weight of the coupled polyolefin. In certain embodiments, the mixture used in the methods provided herein contains no less than about 40% by weight of the coupled polyolefin. In certain embodiments, the mixture used in the methods provided herein contains no less than about 50% by weight of the coupled polyolefin.

A coupled polyolefin can be detected by $^1$H NMR spectroscopy and/or gel permeation chromatography (GPC). For example, in a $^1$H NMR spectrum, the two identical vinylidene protons of an exo-coupled PIB can be observed at 4.82 ppm, and the single olefinic proton of an endo-coupled PIB can be observed at 5.12 ppm. In GPC, a coupled PIB can be observed as a separate peak or shoulder at a lower elution volume relative to an uncoupled PIB chain. The formation of a coupled polyolefin (e.g., a coupled PIB) is generally considered to be practically irreversible. Coupled PIBs are also generally undesirable.

b. Polyolefin Copolymers

In certain embodiments, a polyolefin copolymer suitable for the methods provided herein has one, two, or more non-aromatic main-chain double bonds. In certain embodiments, the polyolefin copolymer has from about 1 to about 2,000, from about 2 to about 1,500, from about 5 to about 1,000, from about 10 to about 500, from about 20 to about 500, from about 25 to about 500, from about 50 to about 500, or from about 100 to about 500 non-aromatic main-chain double bonds.

In certain embodiments, the polyolefin copolymer has from about 1 to about 2,000 non-aromatic main-chain double bonds. In certain embodiments, the polyolefin copolymer has from about 2 to about 1,500 non-aromatic main-chain double bonds. In certain embodiments, the polyolefin copolymer has from about 5 to about 1,000 non-aromatic main-chain double bonds. In certain embodiments, the polyolefin copolymer has from about 10 to about 500 non-aromatic main-chain double bonds. In certain embodiments, the polyolefin copolymer has from about 25 to about 500 non-aromatic main-chain double bonds. In certain embodiments, the polyolefin copolymer has from about 50 to about 500 non-aromatic main-chain double bonds. In certain embodiments, the polyolefin copolymer has from about 50 to about 100 non-aromatic main-chain double bonds. In certain embodiments, the polyolefin copolymer has about 10, about 20, about 30, about 40, about 50, about 60, about 70, about 80, about 90, about 100, about 150, about 200, about 250, about 300, about 350, about 400, about 450, or about 500 non-aromatic main-chain double bonds.

In certain embodiments, the polyolefin copolymer contains one or more endo main-chain double bonds (e.g., Copolymer ChainCopolymer Chain). In certain embodiments, the polyolefin copolymer contains one or more exo main-chain double bonds

(e.g., Copolymer Chain Copolymer Chain).

In certain embodiments, the polyolefin copolymer is a copolymer of an olefin and a comonomer. In certain embodiments, the olefin is ethylene, propylene, isobutylene, or styrene. In certain embodiments, the olefin is isobutylene. In certain embodiments, the comonomer is a diene or monosubstituted acetylene. In certain embodiments, the polyolefin copolymer is a copolymer of isobutylene with a comonomer selected from butadiene, isoprene, 2,3-dimethylbutadiene (23DMBU), 1,3-dimethylbuta-1,3-diene (13DMBU), 2-phenyl-1,3-butadiene, 2,3-diphenylbutadiene (DPBU), 1,3-diphenylbuta-1,3-diene, 2-(4-fluorophenyl) buta-1,3-diene, 2,3-di-(4-fluorophenyl)buta-1,3-diene, 1,3-pentadiene, 2,4-dimethyl-1,3-pentadiene, propyne, 2-phenyl-4-methyl-1,3-pentadiene, and phenylacetylene. In certain embodiments, the polyolefin copolymer is a copolymer of isobutylene with a comonomer selected from butadiene, isoprene, 23DMBU, 13DMBU, 2-phenyl-1,3-butadiene, DPBU, 1,3-diphenylbuta-1,3-diene, 1,3-pentadiene, 2,4-dimethyl-1,3-pentadiene, propyne, 2-phenyl-4-methyl-1,3-pentadiene, and phenylacetylene. In certain embodiments, the polyolefin copolymer is a copolymer of isobutylene with a comonomer selected from isoprene, 2,4-dimethyl-1,3-pentadiene, propyne, and phenylacetylene.

In certain embodiments, the polyolefin copolymer comprises from about 0.1% to about 25%, from about 0.5% to about 10%, or from about 1% to about 5% by mole of the comonomer. In certain embodiments, the polyolefin copolymer comprises about 0.5%, about 1%, about 1.1%, about 1.2%, about 1.3%, about 1.4%, about 1.5%, about 1.6%, about 1.7%, about 1.8%, about 1.9%, or about 2% by mole of the comonomer.

In one embodiment, a method provided herein further comprises the step of copolymerization of an olefin and a comonomer to form a polyolefin polymer containing one, two, or more main-chain double bonds. In certain embodiments, the copolymerization is cationic copolymerization. In certain embodiments, the copolymerization is cationic copolymerization under living conditions. In certain embodiments, the copolymerization is cationic copolymerization under non-living conditions.

Examples of living polymerizations can be found, for example, in U.S. Pat. Nos. 6,969,744; 7,420,019; 7,576,161; 7,705,090; 7,709,580; 8,013,073; 8,063,154; 8,133,954; 8,344,073; 8,383,736; 8,394,897; 8,394,898; 8,552,122; and 8,592,527; the disclosure of each of which is incorporated herein by reference in its entirety.

In certain embodiments, the copolymerization step comprises contacting an olefin with a comonomer in the presence of an initiator. In certain embodiments, the olefin used in the copolymerization step is ethylene, propylene, isobutylene, or styrene. In certain embodiments, the olefin used in the copolymerization step is isobutylene. In certain embodiments, the comonomer used in the copolymerization step is a diene or a monosubstituted acetylene. In certain embodiments, the comonomer used in the copolymerization step is butadiene, isoprene, 2,3-dimethylbutadiene (DMBU), 2,3-diphenylbutadiene (DPBU), 2-(4-fluorophenyl)buta-1,3-diene, 2,3-di-(4-fluorophenyl)buta-1,3-diene, 1,3-pentadiene, 2,4-dimethyl-1,3-pentadiene, propyne, or phenylacetylene.

In certain embodiments, the initiator used in the copolymerization step is a monofunctional initiator. In certain embodiments, the initiator used in the copolymerization step is 2-chloro-2,4,4-trimethylpentane. In certain embodiments, the initiator used in the copolymerization step is a protic initiator. In certain embodiments, the initiator used in the copolymerization step is water or hydrogen halide. In certain embodiments, the initiator used in the copolymerization step is water or hydrogen chloride.

In certain embodiments, the terminal group of the polyolefin copolymer chain is exo-double bond, endo-double bond, tert-chloride, or a mixture thereof. In certain embodiments, the terminal group of the polyolefin copolymer chain is a double bond arising from chain transfer.

In certain embodiments, the polyolefin copolymer is a butyl rubber, halobutyl rubber, chlorobutyl rubber, or bromobutyl rubber.

In certain embodiments, the polyolefin copolymer has the structure of Formula III:

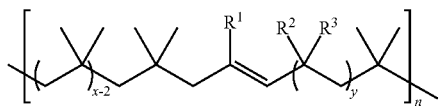

(III)

wherein:
$R^1$, $R^2$, and $R^3$ are each independently hydrogen, alkyl, or aryl;
n is an integer ranging from about 1 to about 2,000;
x is an integer ranging from about 10 to about 200; and
y is an integer of 0 or 1;
wherein each alkyl and aryl is independently and optionally substituted with one or more substituents Q as described herein.

In certain embodiments, in Formula III, n is an integer ranging from about 1 to about 2,000, from about 2 to about 1,500, from about 5 to about 1,000, from about 10 to about 1,000, from about 20 to about 1,000, from about 50 to about 1,000, from about 100 to about 1,000, from about 200 to about 1,000, or from about 200 to about 800. In certain embodiments, in Formula III, n is an integer ranging from about 1 to about 2,000. In certain embodiments, in Formula III, n is an integer ranging from about 2 to about 1,500. In certain embodiments, in Formula III, n is an integer ranging from about 5 to about 1,000. In certain embodiments, in Formula III, n is an integer ranging from about 10 to about 1,000. In certain embodiments, in Formula III, n is an integer ranging from about 20 to about 1,000. In certain embodiments, in Formula III, n is an integer ranging from about 50 to about 1,000. In certain embodiments, in Formula III, n is an integer ranging from about 100 to about 1,000. In certain embodiments, in Formula III, n is an integer ranging from about 200 to about 1,000. In certain embodiments, in Formula III, n is an integer ranging from about 200 to about 800. In certain embodiments, in Formula III, n is about 100, about 200, about 300, about 400, about 500, about 600, about 700, about 800, about 900, or about 1,000.

In certain embodiments, in Formula III, x is an integer ranging from about 10 to about 200, from about 10 to about 150, from about 20 to about 100, or from about 50 to about 100. In certain embodiments, in Formula III, x is an integer ranging from about 10 to about 200. In certain embodiments, in Formula III, x is an integer ranging from about 10 to about 150. In certain embodiments, in Formula III, x is an integer ranging from about 20 to about 100. In certain embodiments, in Formula III, x is an integer ranging from about 50 to about 100. In certain embodiments, in Formula III, x is about 10, about 20, about 30, about 40, about 50, about 60, about 70, about 80, about 90, or about 100.

In certain embodiments, in Formula III, y is 0. In certain embodiments, in Formula III, y is 1.

In certain embodiments, the comonomer is a diene. In certain embodiments, in Formula III, y is 1 when the comonomer is a diene.

In certain embodiments, the comonomer is a diene having the structure of Formula IV:

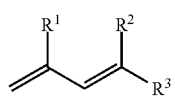

(IV)

wherein $R^1$, $R^2$, and $R^3$ are each as defined herein.

In certain embodiments, in Formula III or IV, $R^1$ is alkyl, optionally substituted with one or more substituents Q as described herein. In certain embodiments, in Formula III or IV, $R^1$ is $C_{1-6}$ alkyl, optionally substituted with one or more substituents Q as described herein. In certain embodiments, in Formula III or IV, $R^1$ is methyl.

In certain embodiments, in Formula III or IV, $R^2$ is hydrogen. In certain embodiments, in Formula III or IV, $R^2$ is alkyl, optionally substituted with one or more substituents Q as described herein. In certain embodiments, in Formula III or IV, $R^2$ is $C_{1-6}$ alkyl, optionally substituted with one or more substituents Q as described herein. In certain embodiments, in Formula III or IV, $R^2$ is methyl.

In certain embodiments, in Formula III or IV, $R^3$ is hydrogen. In certain embodiments, in Formula III or IV, $R^3$ is alkyl, optionally substituted with one or more substituents Q as described herein. In certain embodiments, in Formula III or IV, $R^3$ is $C_{1-6}$ alkyl, optionally substituted with one or more substituents Q as described herein. In certain embodiments, in Formula III or IV, $R^3$ is methyl.

In certain embodiments, in Formula III or IV, $R^1$ is alkyl, and $R^2$ and $R^3$ are each independently hydrogen or alkyl; where each alkyl is optionally substituted with one or more substituents Q as described herein. In certain embodiments, in Formula III or IV, $R^1$ is $C_{1-6}$ alkyl, and $R^2$ and $R^3$ are each independently hydrogen or $C_{1-6}$ alkyl; where each alkyl is optionally substituted with one or more substituents Q as described herein. In certain embodiments, in Formula III or IV, $R^1$ is methyl, and $R^2$ and $R^3$ are each independently hydrogen or methyl.

In certain embodiments, the diene is butadiene, isoprene, 23DMBU, 13DMBU, 2-phenyl-1,3-butadiene, DPBU, 1,3-diphenylbuta-1,3-diene, 2-(4-fluorophenyl)buta-1,3-diene, 2,3-di-(4-fluorophenyl)buta-1,3-diene, 1,3-pentadiene, 2,4-dimethyl-1,3-pentadiene, or 2-phenyl-4-methyl-1,3-pentadiene. In certain embodiments, the diene is butadiene, isoprene, 23DMBU, 13DMBU, 2-phenyl-1,3-butadiene, DPBU, 1,3-diphenylbuta-1,3-diene, 1,3-pentadiene, 2,4-dimethyl-1,3-pentadiene, or 2-phenyl-4-methyl-1,3-pentadiene. In certain embodiments, the diene is butadiene. In certain embodiments, the diene is isoprene. In certain embodiments, the diene is 2,3-dimethylbutadiene. In certain embodiments, the diene is 1,3-dimethylbuta-1,3-diene. In certain embodiments, the diene is 2-phenyl-1,3-butadiene. In certain embodiments, the diene is 2,3-diphenylbutadiene. In certain embodiments, the diene is 1,3-diphenylbuta-1,3-diene. In certain embodiments, the diene is 2-(4-fluorophenyl)buta-1,3-diene. In certain embodiments, the diene is 2,3-di-(4-fluorophenyl)buta-1,3-diene. In certain embodiments, the diene is 1,3-pentadiene. In certain embodiments, the diene is 2,4-dimethyl-1,3-pentadiene. In certain embodiments, the diene is 2-phenyl-4-methyl-1,3-pentadiene.

In certain embodiments, the mode of addition of the diene into the polyolefin copolymer is 1,4. See, e.g., Rehner, *Ind. Eng. Chem.* 1944, 36, 46-51; and Kaszas et al., *Macromolecules* 1992, 25, 1775-1779.

In certain embodiments, the comonomer is a monosubstituted acetylene. In certain embodiments, in Formula III, y is 0 when the comonomer is a monosubstituted acetylene.

In certain embodiments, the comonomer is a monosubstituted acetylene having the structure of Formula V:

wherein $R^1$ is (i) hydrogen; or (ii) alkyl or aryl, each optionally substituted with one or more substituents Q as defined herein.

In certain embodiments, in Formula III or V, $R^1$ is alkyl, optionally substituted with one or more substituents Q as described herein. In certain embodiments, in Formula III or V, $R^1$ is $C_{1-6}$ alkyl, optionally substituted with one or more substituents Q as described herein. In certain embodiments, in Formula III or V, $R^1$ is methyl.

In certain embodiments, in Formula III or V, $R^1$ is aryl, optionally substituted with one or more substituents Q as described herein. In certain embodiments, in Formula III or V, $R^1$ is $C_{6-14}$ aryl, optionally substituted with one or more substituents Q as described herein. In certain embodiments, in Formula III or V, $R^1$ is phenyl, optionally substituted with one or more substituents Q as described herein.

In certain embodiments, the monosubstituted acetylene is propyne. In certain embodiments, the monosubstituted acetylene is phenylacetylene.

In another embodiment, a method provided herein further comprises the steps of (i) copolymerization of an olefin and a comonomer to form a first polyolefin copolymer that does not contain a main-chain double bond; and (ii) post-polymerization modification of the first polyolefin copolymer to form a second polyolefin copolymer that contains one, two, or more main-chain double bonds.

In certain embodiments, the first polyolefin copolymer is a copolymer of an olefin and a comonomer. In certain embodiments, the olefin is ethylene, propylene, isobutylene, or styrene. In certain embodiments, the olefin is isobutylene. In certain embodiments, the comonomer is a monosubstituted ethylene.

In certain embodiments, the first polyolefin copolymer is a copolymer of an olefin and a monosubstituted ethylene. In certain embodiments, the first polyolefin copolymer is a copolymer of isobutylene with a comonomer selected from propylene and styrene.

In certain embodiments, the first polyolefin copolymer has the structure of Formula IV:

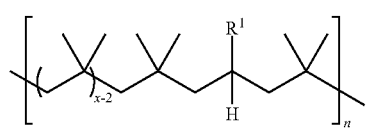

wherein $R^1$ is (i) hydrogen; or (ii) alkyl or aryl, each optionally substituted with one or more substituents Q as defined herein; and n and x are each as defined herein.

In certain embodiments, the comonomer is a monosubstituted ethylene having the structure of Formula VII:

wherein $R^1$ is (i) hydrogen; or (ii) alkyl or aryl, each optionally substituted with one or more substituents Q as defined herein.

In certain embodiments, the post-polymerization modification step comprises (i) selective halogenation of the first polyolefin copolymer to form a halogenated polyolefin copolymer; and (ii) dehydrohalogenation of the halogenated polyolefin copolymer to form a second polyolefin copolymer that contains one, two, or more main-chain double bonds. In certain embodiments, the post-polymerization modification step comprises (i) selective bromination of the first polyolefin copolymer to form a brominated polyolefin copolymer; and (ii) dehydrobromination of the brominated polyolefin copolymer to form a second polyolefin copolymer that contains one, two, or more main-chain double bonds.

In certain embodiments, the brominated polyolefin copolymer has the structure of Formula VIII:

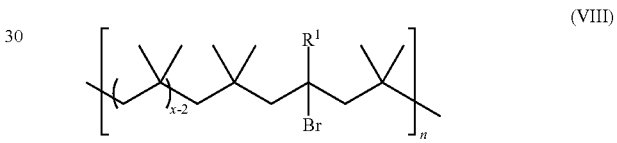

wherein $R^1$, n, and x are each as defined herein.

In certain embodiments, in Formula VI or VIII, n is an integer ranging from about 1 to about 2,000, from about 2 to about 1,500, from about 5 to about 1,000, from about 10 to about 1,000, from about 20 to about 1,000, from about 50 to about 1,000, from about 100 to about 1,000, from about 200 to about 1,000, or from about 200 to about 800. In certain embodiments, in Formula VI or VIII, n is an integer ranging from about 1 to about 2,000. In certain embodiments, in Formula VI or VIII, n is an integer ranging from about 2 to about 1,500. In certain embodiments, in Formula VI or VIII, n is an integer ranging from about 5 to about 1,000. In certain embodiments, in Formula VI or VIII, n is an integer ranging from about 10 to about 1,000. In certain embodiments, in Formula VI or VIII, n is an integer ranging from about 20 to about 1,000. In certain embodiments, in Formula VI or VIII, n is an integer ranging from about 50 to about 1,000. In certain embodiments, in Formula VI or VIII, n is an integer ranging from about 100 to about 1,000. In certain embodiments, in Formula VI or VIII, n is an integer ranging from about 200 to about 1,000. In certain embodiments, in Formula VI or VIII, n is an integer ranging from about 200 to about 800. In certain embodiments, in Formula VI or VIII, n is about 100, about 200, about 300, about 400, about 500, about 600, about 700, about 800, about 900, or about 1,000.

In certain embodiments, in Formula VI or VIII, x is an integer ranging from about 10 to about 200, from about 10 to about 100, from about 20 to about 100, or from about 50 to about 100. In certain embodiments, in Formula VI or VIII, x is an integer ranging from about 10 to about 200. In certain embodiments, in Formula VI or VIII, x is an integer ranging from about 10 to about 100. In certain embodiments, in Formula VI or VIII, x is an integer ranging from about 20 to about 100. In certain embodiments, in Formula VI or VIII, x is an integer ranging from about 50 to about 100. In certain embodiments, in Formula VI or VIII, x is about 10, about 20, about 30, about 40, about 50, about 60, about 70, about 80, about 90, or about 100.

In certain embodiments, in any of Formulae III and VI to VIII, $R^1$ is alkyl, optionally substituted with one or more substituents Q as described herein. In certain embodiments, in any of Formulae III and VI to VIII, $R^1$ is $C_{1-6}$ alkyl, optionally substituted with one or more substituents Q as described herein. In certain embodiments, in any of Formulae III and VI to VIII, $R^1$ is methyl.

In certain embodiments, in any of Formulae III and VI to VIII, $R^1$ is aryl, optionally substituted with one or more substituents Q as described herein. In certain embodiments, in any of Formulae III and VI to VIII, $R^1$ is $C_{6-14}$ aryl, optionally substituted with one or more substituents Q as described herein. In certain embodiments, in any of Formulae III and VI to VIII, $R^1$ is phenyl, optionally substituted with one or more substituents Q as described herein.

In certain embodiments, the monosubstituted ethylene is propylene. In certain embodiments, the monosubstituted ethylene is styrene.

In certain embodiments, the polyolefin copolymer has the structure of Formula IX:

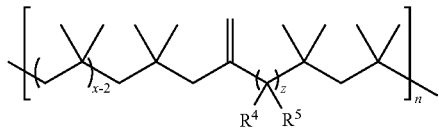

(IX)

wherein each $R^4$ and $R^5$ is independently hydrogen, alkyl, or aryl; and each z is independently an integer of 1, 2, 3, 4, 5, 6, 7, 8, 9, 10, 11, 12, 13, 14, 15, 16, 17, 18, 19, or 20; where the alkyl and aryl are each independently and optionally substituted, in one embodiment, with one or more substituents Q as defined herein; and n and x are each as defined herein.

In certain embodiments, the comonomer is a cyclic alkene. In certain embodiments, the comonomer is a monocyclic alkene. In certain embodiments, the comonomer is a monocyclic alkene having the structure of Formula X:

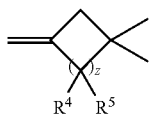

(X)

wherein $R^4$, $R^5$, and z are each as defined herein.

In certain embodiments, in Formula IX or X, $R^4$ is hydrogen. In certain embodiments, in Formula IX or X, $R^5$ is hydrogen. In certain embodiments, in Formula IX or X, z is an integer of 1, 2, 3, or 4. In certain embodiments, in Formula IX or X, z is an integer of 1 or 2. In certain embodiments, in Formula IX or X, $R^4$ is hydrogen. In certain embodiments, in Formula IX or X, $R^5$ is hydrogen. In certain embodiments, in Formula IX or X, z is an integer of 1, 2, 3, or 4. In certain embodiments, in Formula IX or X, each $R^4$ and $R^5$ is hydrogen; and z is an integer of 1 or 2.

In certain embodiments, the comonomer is 1,1-dimethyl-3-methylenecyclobutane.

In certain embodiments, the polyolefin copolymer has the structure of Formula XI:

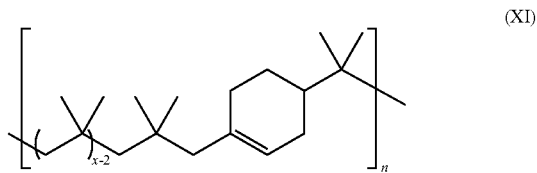

(XI)

wherein n and x are each as defined herein.

In certain embodiments, the comonomer is a bicyclic alkene. In certain embodiments, the bicyclic alkene is a bicyclic monoterpene. In certain embodiments, the bicyclic alkene is camphene, carene, pinene, sabinene, or thujene. In certain embodiments, the bicyclic alkene is pinene. In certain embodiments, the bicyclic alkene is α-pinene. In certain embodiments, the bicyclic alkene is β-pinene.

In certain embodiments, the polyolefin copolymers described herein (including the polyolefin copolymer containing one, two, or more main-chain double bonds, the first polyolefin copolymer, and the second polyolefin copolymer) each independently have a weight average molecular weight ranging from about 1,000 to about 1,000,000, from about 2,000 to about 500,000, from about 5,000 to about 500,000, from about 10,000 to about 500,000, from about 20,000 to about 500,000, from about 50,000 to about 500,000, or from about 100,000 to about 500,000. In certain embodiments, the polyolefin copolymers described herein each independently have a weight average molecular weight ranging from about 1,000 to about 1,000,000. In certain embodiments, the polyolefin copolymers described herein each independently have a weight average molecular weight ranging from about 2,000 to about 500,000. In certain embodiments, the polyolefin copolymers described herein each independently have a weight average molecular weight ranging from about 5,000 to about 500,000. In certain embodiments, the polyolefin copolymers described herein each independently have a weight average molecular weight ranging from about 10,000 to about 500,000. In certain embodiments, the polyolefin copolymers described herein each independently have a weight average molecular weight ranging from about 20,000 to about 500,000. In certain embodiments, the polyolefin copolymers described herein each independently have a weight average molecular weight ranging from about 50,000 to about 500,000. In certain embodiments, the polyolefin copolymers described herein each independently have a weight average molecular weight ranging from about 100,000 to about 500,000. In certain embodiments, the polyolefin copolymers described herein each independently have a weight average molecular weight of about 50,000, about 10,000, about 20,000, about 50,000, about 100,000, about 150,000, about 200,000, about 250,000, about 300,000, about 350,000, about 400,000, about 450,000, or about 500,000.

In certain embodiments, the polyolefin copolymers described herein (including the polyolefin copolymer containing one, two, or more main-chain double bonds, the first polyolefin copolymer, and the second polyolefin copolymer) each independently have a number average molecular weight ranging from about 1,000 to about 1,000,000, from about 2,000 to about 500,000, from about 5,000 to about 500,000, from about 10,000 to about 500,000, from about 20,000 to about 500,000, from about 50,000 to about 500,000, or from about 100,000 to about 500,000. In certain embodiments, the polyolefin copolymers described herein each independently have a number average molecular weight ranging from about 1,000 to about 1,000,000. In certain embodiments, the polyolefin copolymers described herein each independently have a number average molecular weight ranging from about 2,000 to about 500,000. In certain embodiments, the polyolefin copolymers described herein each independently have a number average molecular weight ranging from about 5,000 to about 500,000. In certain embodiments, the polyolefin copolymers described herein each independently have a number average molecular weight ranging from about 10,000 to about 500,000. In certain embodiments, the polyolefin copolymers described herein each independently have a number average molecular weight ranging from about 20,000 to about 500,000. In certain embodiments, the polyolefin copolymers described herein each independently have a number average molecular weight ranging from about 50,000 to about 500,000. In certain embodiments, the polyolefin copolymers described herein each independently have a number average molecular weight ranging from about 100,000 to about 500,000. In certain embodiments, the polyolefin copolymers described herein each independently have a number average molecular weight of about 50,000, about 10,000, about 20,000, about 50,000, about 100,000, about 150,000, about 200,000, about 250,000, about 300,000, about 350,000, about 400,000, about 450,000, or about 500,000.

In certain embodiments, the polyolefin copolymers described herein (including the polyolefin copolymer containing one, two, or more main-chain double bonds, the first polyolefin copolymer, and the second polyolefin copolymer) each independently have a polydispersity index ranging from about 1.1 to about 20, from about 1.2 to about 10, from about 1.5 to about 5, or from about 1.5 to about 2. In certain embodiments, the polyolefin copolymers described herein each independently have a polydispersity index of no less than about 1.1, no less than about 1.2, no less than about 1.3, no less than about 1.4, no less than about 1.5, no less than about 1.6, no less than about 1.7, no less than about 1.8, no less than about 1.9, or no less than about 2; but no greater than about 5, about 10, or about 20.

c. Aromatic Compounds

In certain embodiments, the aromatic compound is an arene, optionally substituted with one or more substituents Q as described herein. In certain embodiments, the aromatic compound is a monocyclic arene, optionally substituted with one or more substituents Q as described herein. In certain embodiments, the aromatic compound is a bicyclic arene, optionally substituted with one or more substituents Q as described herein. In certain embodiments, the aromatic compound is benzene, optionally substituted with one or more substituents Q as described herein.

In one embodiment, the aromatic compound has the structure of Formula XII:

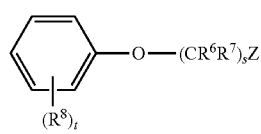

(XII)

wherein:
each $R^6$ and $R^7$ is independently hydrogen or alkyl;
each $R^8$ is independently halo, alkyl, alkoxy, or —$NR^{1b}R^{1c}$, where $R^{1b}$ and $R^{1c}$ are each independently (i) hydrogen; or (ii) alkyl, alkenyl, alkynyl, cycloalkyl, aryl, aralkyl, heteroaryl, or heterocyclyl; or (iii) $R^{1b}$ and $R^{1c}$ together with the N atom to which they are attached form heteroaryl or heterocyclyl;
Z and s are:
i. s is an integer of 0; and
   Z is hydrogen, alkyl, alkenyl, alkynyl, aryl, aralkyl, heteroaryl, heterocyclyl, or -L-$SiR^{Za}R^{Zb}R^{Zc}$;
ii. s is an integer of 1; and
   Z is hydrogen, halo, fluoro, chloro, bromo, iodo, —CN, —NC, —NCO, —OCN, —NCS, —SCN, alkyl, alkenyl, alkynyl, aryl, aralkyl, heteroaryl, heterocyclyl, —C(O)$OR^{2a}$, —C(O)$NR^{2b}R^{2c}$, —$OR^{2a}$, alkoxy, —OC(O)$R^{2a}$, or -L-$SiR^{Za}R^{Zb}R^{Zc}$; or
iii. s is an integer of 2, 3, 4, 5, 6, 7, 8, 9, 10, 11, 12, 13, 14, 15, 16, 17, 18, 19, or 20; and
   Z is hydrogen, halo, fluoro, chloro, bromo, iodo, —CN, —NC, —NCO, —OCN, —NCS, —SCN, alkyl, alkenyl, alkynyl, aryl, aralkyl, heteroaryl, heterocyclyl, —C(O)$OR^{2a}$, —C(O)$NR^{2b}R^{2c}$, —$OR^{2a}$, alkoxy, —OC(O)$R^{2a}$, —$NR^{2b}R^{2c}$, or -L-$SiR^{Za}R^{Zb}R^{Zc}$;
each L is independently a bond (i.e., absent) or ethynylene (—C≡C—);
each $R^{Za}$, $R^{Zb}$, and $R^{Zc}$ is independently halo, fluoro, chloro, bromo, iodo, alkyl, alkenyl, alkynyl, aryl, aralkyl, heteroaryl, heterocyclyl, —$OR^{2a}$, hydroxyl, alkoxy, or —$NR^{2b}R^{2c}$;
t is an integer of 0, 1, 2, 3, 4, or 5; and
each $R^{2a}$, $R^{2b}$, and $R^{2c}$ is independently (i) hydrogen; or (ii) alkyl, alkenyl, alkynyl, cycloalkyl, aryl, aralkyl, heteroaryl, or heterocyclyl; or (iii) $R^{2b}$ and $R^{2c}$ together with the N atom to which they are attached form heteroaryl or heterocyclyl;
wherein each alkyl, alkenyl, alkynyl, aryl, aralkyl, heteroaryl, heterocyclyl, and alkoxy is independently and optionally substituted, in one embodiment, with one or more substituents Q as described herein.

In certain embodiments, the aromatic compound is anisole, isopropoxybenzene, 2-bromoethoxybenzene, or 3-bromopropoxybenzene.

In certain embodiments, the aromatic compound is a compound that is capable of reacting with a carbocationic polyolefin under Friedel-Craft reaction conditions.

In certain embodiments, an excess amount of the aromatic compound relative to the number of non-aromatic main-chain double bonds in the unsaturated polyolefin is used in the methods provided herein. In certain embodiments, a molar ratio of the aromatic compound relative to the number of non-aromatic main-chain double bonds in the unsaturated polyolefin used in the methods provided herein is ranging from about 0.1 to about 50, from about 0.5 to about 20, from about 1 to about 20, from about 1 to about 10, from about 1 to about 5, or from about 1 to about 2.5. In certain embodiments, a molar ratio of the aromatic compound relative to the number of non-aromatic main-chain double bonds in the unsaturated polyolefin used in the methods provided herein is ranging from about 0.1 to about 50. In certain embodiments, a molar ratio of the aromatic compound relative to the number of non-aromatic main-chain double bonds in the unsaturated polyolefin used in the methods provided herein is ranging from about 0.5 to about 20. In certain embodiments, a molar ratio of the aromatic compound relative to the number of non-aromatic main-chain double bonds in the unsaturated polyolefin used in the methods provided herein is ranging from about 1 to about 20. In certain embodiments, a molar ratio of the aromatic compound relative to the number of non-aromatic main-chain double bonds in the unsaturated polyolefin used in the methods provided herein is ranging from about 1 to about 10. In certain embodiments, a molar ratio of the aromatic compound relative to the number of non-aromatic main-chain double bonds in the unsaturated polyolefin used in the methods provided herein is ranging from about 1 to about 5. In certain embodiments, a molar ratio of the aromatic compound relative to the number of non-aromatic main-chain double bonds in the unsaturated polyolefin used in the methods provided herein is ranging from about 1 to about 2.5. In certain embodiments, a molar ratio of the aromatic compound relative to the number of non-aromatic main-chain double bonds in the unsaturated polyolefin used in the methods provided herein is about 1, about 1.1, about 1.2, about 1.3, about 1.4, about 1.5, about 1.6, about 1.7, about 1.8, about 1.9, about 2, about 2.1, about 2.2, about 2.3, about 2.4, or about 2.5.

d. Lewis Acids

In certain embodiments, the Lewis acid is a non-protic acid. In certain embodiments, the Lewis acid is a metal halide or non-metal halide. In certain embodiments, the Lewis acid is a titanium tetrahalide, a boron trihalide, an aluminum trihalide, a tin tetrahalide, a zinc halide, ethyl aluminum dichloride, or a mixture thereof.

In certain embodiments, the Lewis acid is a metal halide. In certain embodiments, the Lewis acid is a titanium (IV) halide, a zinc (II) halide, a tin (IV) halide, an iron halide, or an aluminum (III) halide.

In certain embodiments, the Lewis acid is a titanium(IV) halide, such as titanium tetrabromide or titanium tetrachloride.

In certain embodiments, the Lewis acid is a zinc(II) halide, such as zinc dichloride.

In certain embodiments, the Lewis acid is a tin(IV) halide, such as tin tetrachloride ($SnCl_4$).

In certain embodiments, the Lewis acid is an iron(III) halide, such as iron trichloride ($FeCl_3$) or iron tribromide ($FeBr_3$).

In certain embodiments, the Lewis acid is an aluminum (III) halide, such as aluminum trichloride ($AlCl_3$) or aluminum tribromide ($AlBr_3$). In certain embodiments, the Lewis acid is ethylaluminum dichloride.

In certain embodiments the Lewis acid is a non-metal halide. In certain embodiments, the Lewis acid is an antimony(VI) halide, a gallium(III) halide, or a boron(III) halide. In certain embodiments the Lewis acid is a boron(III) halide, such as is boron trichloride or boron trifluoride.

In certain embodiments, an excess amount of the Lewis acid relative to the number of non-aromatic main-chain double bonds in the unsaturated polyolefin is used in the methods provided herein. In certain embodiments, a molar ratio of the Lewis acid relative to the number of non-aromatic main-chain double bonds in the unsaturated polyolefin used in the methods provided herein is ranging from about 0.1 to about 50, from about 0.5 to about 20, from about 1 to about 20, from about 1 to about 10, from about 1 to about 5, or from about 2 to about 5. In certain embodiments, a molar ratio of the Lewis acid relative to the number of non-aromatic main-chain double bonds in the unsaturated polyolefin used in the methods provided herein is ranging from about 0.1 to about 50. In certain embodiments, a molar ratio of the Lewis acid relative to the number of non-aromatic main-chain double bonds in the unsaturated polyolefin used in the methods provided herein is ranging from about 0.5 to about 20. In certain embodiments, a molar ratio of the Lewis acid relative to the number of non-aromatic main-chain double bonds in the unsaturated polyolefin used in the methods provided herein is ranging from about 1 to about 20. In certain embodiments, a molar ratio of the Lewis acid relative to the number of non-aromatic main-chain double bonds in the unsaturated polyolefin used in the methods provided herein is ranging from about 1 to about 10. In certain embodiments, a molar ratio of the Lewis acid relative to the number of non-aromatic main-chain double bonds in the unsaturated polyolefin used in the methods provided herein is ranging from about 1 to about 5. In certain embodiments, a molar ratio of the Lewis acid relative to the number of non-aromatic main-chain double bonds in the unsaturated polyolefin used in the methods provided herein is ranging from about 2 to about 5. In certain embodiments, a molar ratio of the Lewis acid relative to the number of non-aromatic main-chain double bonds in the unsaturated polyolefin used in the methods provided herein is about 1, about 1.2, about 1.4, about 1.6, about 1.8, about 2, about 2.2, about 2.4, about 2.6, about 2.8, or about 3, about 3.2.

e. Protic Acids

In certain embodiments, the protic acid is an inorganic acid. In certain embodiments, the protic acid is boric acid, nitric acid, hydrobromic acid, hydrochloric acid, hydroiodic acid, perchloric acid, phosphoric acid, or sulfuric acid. In certain embodiments, the protic acid is hydrochloric acid. In certain embodiments, the protic acid is sulfuric acid.

In certain embodiments, the protic acid is an organic acid. In certain embodiments, the protic acid is formic acid, acetic acid, propionic acid, or benzoic acid. In certain embodiments, the protic acid is methanol or ethanol. In certain embodiments, the protic acid is benzenesulfonic acid, camphorsulfonic acid, (+)-(1S)-camphor-10-sulfonic acid, cyclohexanesulfamic acid, dodecylsulfuric acid, ethane-1,2-disulfonic acid, ethanesulfonic acid, 2-hydroxy-ethanesulfonic acid, methanesulfonic acid, naphthalene-2-sulfonic acid, naphthalene-1,5-disulfonic acid, or p-toluenesulfonic acid.

In certain embodiments, the protic acid is formed in situ. In certain embodiments, the protic acid is hydrochloric acid formed in situ. In certain embodiments, the protic acid is formed in situ by the reaction of the Lewis acid with a protic impurity, in one embodiment, moisture.

In certain embodiments, a stoichiometric amount of the protic acid relative to two times the number of non-aromatic main-chain double bonds in the unsaturated polyolefin is used in the methods provided herein. In certain embodiments, an excess amount of the protic acid relative to two times the number of non-aromatic main-chain double bonds in the unsaturated polyolefin is used in the methods provided herein. In certain embodiments, a slight excess amount of the protic acid relative to two times the number of non-aromatic main-chain double bonds in the unsaturated polyolefin is used in the methods provided herein.

In certain embodiments, a molar ratio of the protic acid relative to the number of non-aromatic main-chain double bonds in the unsaturated polyolefin used in the methods provided herein is ranging from about 0.2 to about 20, from about 0.4 to about 10, from about 1 to about 4, from about 1.5 to about 3, or from about 1.5 to about 2.5. In certain embodiments, a molar ratio of the protic acid relative to the number of non-aromatic main-chain double bonds in the unsaturated polyolefin used in the methods provided herein is ranging from about 0.2 to about 20. In certain embodiments, a molar ratio of the protic acid relative to the number of non-aromatic main-chain double bonds in the unsaturated polyolefin used in the methods provided herein is ranging from about 0.4 to about 10. In certain embodiments, a molar ratio of the protic acid relative to the number of non-aromatic main-chain double bonds in the unsaturated polyolefin used in the methods provided herein is ranging from about 1 to about 4. In certain embodiments, a molar ratio of the protic acid relative to the number of non-aromatic main-chain double bonds in the unsaturated polyolefin used in the methods provided herein is ranging from about 1.5 to about 3. In certain embodiments, a molar ratio of the protic acid relative to the number of non-aromatic main-chain double bonds in the unsaturated polyolefin used in the methods provided herein is ranging from about 1.5 to about 2.5. In certain embodiments, a molar ratio of the protic acid relative to the number of non-aromatic main-chain double bonds in the unsaturated polyolefin used in the methods provided herein is about 1, about 1.2, about 1.4, about 1.6, about 1.8, about 2, about 2.2, about 2.4, about 2.6, about 2.8, or about 3.

f. Solvents

In certain embodiments, the methods provided herein are performed in a solvent. In certain embodiments, the solvent is petroleum ether, pentane, hexane(s), heptane, octane, isooctane, cyclopentane, cyclohexane, methylcyclohexane, mineral oil, methyl chloride, methylene chloride (dichloromethane), chloroform, carbon tetrachloride, ethyl chloride, 1,1-dichloroethane, 1,2-dichloroethane, trichloroethane, 1,1,2,2-tetrachloroethane, n-propyl chloride, isopropyl chloride, 1,2-dichloropropane, 1,3-dichloropropane, n-butyl chloride, isobutyl chloride, chlorobenzene, diethyl ether, diisopropyl ether, methyl t-butyl ether (MTBE), 1,2-dimethoxyethane, bis(2-methoxyethyl)ether, 1,1-dimethoxymethane, 2,2-dimethoxypropane, acetone, butanone, methyl ethyl ketone (MEK), methyl isopropyl ketone, methyl butyl ketone, methyl isobutyl ketone (MIBK), ethylene carbonate, propylene carbonate, formamide, N,N-dimethylformamide (DMF), N,N-dimethylacetamide, acetonitrile (ACN), dimethyl sulfoxide (DMSO), sulfolane, nitromethane, nitrobenzene, N-methyl pyrrolidone, 2-methyl tetrahydrofuran, tetrahydrofuran (THF), dioxane, carbon sulfide, or a mixture thereof. In certain embodiments, the solvent is petroleum ether, pentane, hexane(s), heptane, octane, isooctane, cyclopentane, cyclohexane, methylcyclohexane, mineral oil, methyl chloride, methylene chloride (dichloromethane), chloroform, carbon tetrachloride, ethyl chloride, 1,1-dichloroethane, 1,2-dichloroethane, trichloroethane, 1,1,2,2-tetrachloroethane, n-propyl chloride, isopropyl chloride, 1,2-dichloropropane, 1,3-dichloropropane, n-butyl chloride, isobutyl chloride, chlorobenzene, or a mixture thereof.

In certain embodiments, the solvent is a hydrocarbon, a halogenated hydrocarbon, or a mixture thereof. In certain embodiments, the solvent is an alkane, a halogenated alkane, carbon disulfide, sulfur dioxide, or a mixture thereof. In certain embodiments, the solvent is petroleum ether, pentane, hexane(s), heptane, octane, isooctane, cyclopentane, cyclohexane, methylcyclohexane, mineral oil, methyl chloride, methylene chloride, chloroform, carbon tetrachloride, ethyl chloride, 1,1-dichloroethane, 1,2-dichloroethane, trichloroethane, 1,1,2,2-tetrachloroethane, n-propyl chloride, isopropyl chloride, 1,2-dichloropropane, 1,3-dichloropropane, n-butyl chloride, isobutyl chloride, chlorobenzene, or a mixture thereof.

Examples of alkanes include, but are not limited to, propane, butane, pentane, hexane, heptane, octane, nonane, decane, n-propane, n-butane, n-pentane, n-hexane, n-heptane, n-octane, n-nonane, n-decane, isobutane, isopentane, neopentane, isohexane, 3-methylpentane, 2,2-dimethylbutane, or 2,3-dimethylbutane.

Examples of halogenated alkanes include, but are not limited to, methyl chloride, methylene chloride, chloroform, carbon tetrachloride, ethyl chloride, 1,1-dichloroethane, 1,2-dichloroethane, trichloroethane, 1,1,2,2-tetrachloroethane, n-propyl chloride, isopropyl chloride, 1,2-dichloropropane, 1,3-dichloropropane, n-butyl chloride, or isobutyl chloride.

In certain embodiments, the solvent is a hydrocarbon. In certain embodiments, the solvent is an alkane. In certain embodiments, the solvent is hexane. In certain embodiments, the solvent is n-hexane. In certain embodiments, the solvent is hexanes.

In certain embodiments, the solvent is a halogenated hydrocarbon. In certain embodiments, the solvent is a halogenated alkane. In certain embodiments, the solvent is methyl chloride. In certain embodiments, the solvent is methylene chloride.

In certain embodiments, the solvent is a mixture of a hydrocarbon and a halogenated hydrocarbon. In certain embodiments, the volumetric ratio of the hydrocarbon and the halogenated hydrocarbon is ranging from about 5/95 to about 95/5, from about 10/90 to about 90/10, from about 20/80 to about 80/20, from about 30/70 to about 70/30, or from about 40/60 to about 60/40. In certain embodiments, the volumetric ratio of the hydrocarbon and the halogenated hydrocarbon is ranging from about 5/95 to about 95/5. In certain embodiments, the volumetric ratio of the hydrocarbon and the halogenated hydrocarbon is ranging from about 10/90 to about 90/10. In certain embodiments, the volumetric ratio of the hydrocarbon and the halogenated hydrocarbon is ranging from about 20/80 to about 80/20. In certain embodiments, the volumetric ratio of the hydrocarbon and the halogenated hydrocarbon is ranging from about 30/70 to about 70/30. In certain embodiments, the volumetric ratio of the hydrocarbon and the halogenated hydrocarbon is ranging from about 40/60 to about 60/40.

In certain embodiments, the solvent is a mixture of an alkane and a halogenated alkane. In certain embodiments, the volumetric ratio of the alkane and the halogenated alkane is ranging from about 5/95 to about 95/5, from about 10/90 to about 90/10, from about 20/80 to about 80/20, from about 30/70 to about 70/30, or from about 40/60 to about 60/40. In certain embodiments, the volumetric ratio of the alkane and the halogenated alkane is ranging from about 5/95 to about 95/5. In certain embodiments, the volumetric ratio of the alkane and the halogenated alkane is ranging from about 10/90 to about 90/10. In certain embodiments, the volumetric ratio of the alkane and the halogenated alkane is ranging from about 20/80 to about 80/20. In certain embodiments, the volumetric ratio of the alkane and the halogenated alkane is ranging from about 30/70 to about 70/30. In certain embodiments, the volumetric ratio of the alkane and the halogenated alkane is ranging from about 40/60 to about 60/40.

In certain embodiments, the solvent is a mixture of hexane and methyl chloride. In certain embodiments, the volumetric ratio of hexane and methyl chloride is ranging from about 5/95 to about 95/5, from about 10/90 to about 90/10, from about 20/80 to about 80/20, from about 30/70 to about 70/30, or from about 40/60 to about 60/40. In certain embodiments, the volumetric ratio of hexane and methyl chloride is ranging from about 5/95 to about 95/5. In certain embodiments, the volumetric ratio of hexane and methyl chloride is ranging from about 10/90 to about 90/10. In certain embodiments, the volumetric ratio of hexane and methyl chloride is ranging from about 20/80 to about 80/20. In certain embodiments, the volumetric ratio of hexane and methyl chloride is ranging from about 30/70 to about 70/30. In certain embodiments, the volumetric ratio of hexane and methyl chloride is ranging from about 40/60 to about 60/40.

In certain embodiments, the solvent is a mixture of hexane and methylene chloride. In certain embodiments, the volumetric ratio of hexane and methylene chloride is ranging from about 5/95 to about 95/5, from about 10/90 to about 90/10, from about 20/80 to about 80/20, from about 30/70 to about 70/30, or from about 40/60 to about 60/40. In certain embodiments, the volumetric ratio of hexane and methylene chloride is ranging from about 5/95 to about 95/5. In certain embodiments, the volumetric ratio of hexane and methylene chloride is ranging from about 10/90 to about 90/10. In certain embodiments, the volumetric ratio of hexane and methylene chloride is ranging from about 20/80 to about 80/20. In certain embodiments, the volumetric ratio of hexane and methylene chloride is ranging from about 30/70 to about 70/30. In certain embodiments, the volumetric ratio of hexane and methylene chloride is ranging from about 40/60 to about 60/40.

In certain embodiments, the solvent comprises from about 40 to about 90% by volume of hexane and from about 60 to about 10% by volume of methyl chloride. In certain embodiments, the solvent comprises from about 40 to about 60% by volume of hexane and from about 60 to about 40% by volume of methyl chloride. In certain embodiments, the solvent comprises about 40% by volume of hexane and about 60% by volume of methyl chloride. In certain embodiments, the solvent comprises about 80% by volume of hexane and about 20% by volume of methyl chloride.

In certain embodiments, the solvent comprises from about 40 to about 90% by volume of hexane and from about 60 to about 10% by volume of methylene chloride. In certain embodiments, the solvent comprises from about 40 to about 60% by volume of hexane and from about 60 to about 40% by volume of methylene chloride. In certain embodiments, the solvent comprises about 60% by volume of hexane and about 40% by volume of methylene chloride. In certain embodiments, the solvent comprises about 80% by volume of hexane and about 20% by volume of methylene chloride.

g. Temperatures

In certain embodiments, each step in the methods provided herein is independently performed at a temperature ranging from about −150° C. to about 50° C., about −120° C. to about 50° C., from about −100° C. to about 20° C., from about −90° C. to about 10° C., from about −80° C. to about 0° C., or from about −60° C. to about −10° C. In certain embodiments, each step in the methods provided herein is independently performed at a temperature ranging from about −150° C. to about 50° C. In certain embodiments, each step in the methods provided herein is independently performed at a temperature ranging from about −120° C. to about 50° C. In certain embodiments, each step in the methods provided herein is independently performed at a temperature ranging from about −100° C. to about 20° C. In certain embodiments, each step in the methods provided herein is independently performed at a temperature ranging from about −90° C. to about 10° C. In certain embodiments, each step in the methods provided herein is independently performed at a temperature ranging from about −80° C. to about 0° C. In certain embodiments, each step in the methods provided herein is independently performed at a temperature ranging from about −60° C. to about −10° C. In certain embodiments, each step in the methods provided herein is independently performed at a temperature of about −100° C., about −90° C., about −85° C., about −80° C., about −75° C., about −70° C., about −65° C., about −55° C., about −50° C., about −45° C., about −40° C., about −35° C., about −30° C., about −25° C., about −20° C., about −15° C., about −10° C., about −5° C., about 0° C., about 5° C., about 10° C., about 15° C., about 20° C., or about 25° C.

4.3 Functionalized Polyolefins

In one embodiment, provided herein is a functionalized polyolefin formed using a method provided herein. In certain embodiments, the functionalized polyolefin is a telechelic polyolefin.

In certain embodiments, the functionalized polyolefins provided herein each independently have a weight average molecular weight ranging from about 500 to about 200,000, from about 1,000 to about 100,000, from about 1,000 to about 50,000, or from about 1,000 to about 20,000.

In certain embodiments, the functionalized polyolefins provided herein each independently have a weight average molecular weight ranging from about 500 to about 200,000. In certain embodiments, the functionalized polyolefins provided herein each independently have a weight average molecular weight ranging from about 1,000 to about 100,000. In certain embodiments, the functionalized polyolefins provided herein each independently have a weight average molecular weight ranging from about 1,000 to about 50,000. In certain embodiments, the functionalized polyolefins provided herein each independently have a weight average molecular weight ranging from about 1,000 to about 20,000.

In certain embodiments, the functionalized polyolefins provided herein each independently have a weight average molecular weight of about 1,000, about 2,000, about 3,000, about 4,000, about 5,000, about 6,000, about 7,000, about 8,000, about 9,000, about 10,000, about 11,000, about 12,000, about 13,000, about 14,000, or about 15,000.

In certain embodiments, the functionalized polyolefins provided herein each independently have a number average molecular weight ranging from about 500 to about 200,000, from about 1,000 to about 100,000, from about 1,000 to about 50,000, or from about 1,000 to about 20,000.

In certain embodiments, the functionalized polyolefins provided herein each independently have a number average molecular weight ranging from about 500 to about 200,000. In certain embodiments, the functionalized polyolefins provided herein each independently have a number average molecular weight ranging from about 1,000 to about 100,000. In certain embodiments, the functionalized polyolefins provided herein each independently have a number average molecular weight ranging from about 1,000 to about 50,000. In certain embodiments, the functionalized polyolefins provided herein each independently have a number average molecular weight ranging from about 1,000 to about 20,000.

In certain embodiments, the functionalized polyolefins provided herein each independently have a number average molecular weight of about 1,000, about 2,000, about 3,000, about 4,000, about 5,000, about 6,000, about 7,000, about 8,000, about 9,000, about 10,000, about 11,000, about 12,000, about 13,000, about 14,000, or about 15,000.

In certain embodiments, the functionalized polyolefins provided herein each independently have a polydispersity index of no greater than about 10, no greater than about 5, no greater than about 2.5, no greater than about 2, no greater than about 1.9, no greater than about 1.8, no greater than about 1.7, no greater than about 1.6, no greater than about 1.5, no greater than about 1.4, no greater than about 1.3, no greater than about 1.2, or no greater than about 1.1.

In certain embodiments, the functionalized polyolefins provided herein each independently have a polydispersity index of no greater than about 10. In certain embodiments, the functionalized polyolefins provided herein each independently have a polydispersity index of no greater than about 5. In certain embodiments, the functionalized polyolefins provided herein each independently have a polydispersity index of no greater than about 2.5. In certain embodiments, the functionalized polyolefins provided herein each independently have a polydispersity index of no greater than about 2. In certain embodiments, the functionalized polyolefins provided herein each independently have a polydispersity index of no greater than about 1.9. In certain embodiments, the functionalized polyolefins provided herein each independently have a polydispersity index of no greater than about 1.8. In certain embodiments, the functionalized polyolefins provided herein each independently have a polydispersity index of no greater than about 1.7. In certain embodiments, the functionalized polyolefins provided herein each independently have a polydispersity index of no greater than about 1.6. In certain embodiments, the functionalized polyolefins provided herein each independently have a polydispersity index of no greater than about 1.5. In certain embodiments, the functionalized polyolefins provided herein each independently have a polydispersity index of no greater than about 1.4. In certain embodiments, the functionalized polyolefins provided herein each independently have a polydispersity index of no greater than about 1.3. In certain embodiments, the functionalized polyolefins provided herein each independently have a polydispersity index of no greater than about 1.2. In certain embodiments, the functionalized polyolefins provided herein each independently have a polydispersity index of no greater than about 1.1.

In certain embodiments, the functionalized polyolefins provided herein each independently have a polydispersity index of about 1.1, about 1.2, about 1.3, about 1.4, about 1.5, about 1.6, about 1.7, about 1.8, about 1.9, or about 2.

In one embodiment, the functionalized polyolefin provided herein has the structure of Formula XV:

(XV)

wherein:
  each $R^A$ is independently aryl or heteroaryl, each of which is optionally substituted with one or more substituents Q; in one embodiment, each $R^A$ is independently a residue of an aromatic compound as described herein; and
  $R^a$, $R^x$, and r are each as defined herein.

In certain embodiments, in Formula XV, each $R^A$ is independently $C_{6-14}$ aryl, optionally substituted. In certain embodiments, in Formula XV, each $R^A$ is independently phenyl, optionally substituted.

In one embodiment, the functionalized polyolefin provided herein has the structure of Formula XVI:

(XVI)

wherein $R^8$, $R^a$, $R^x$, r, and t are each as defined herein.

In another embodiment, the functionalized polyolefin provided herein has the structure of Formula XVII:

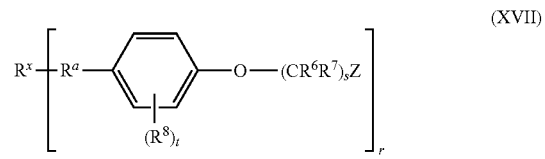

(XVII)

wherein t is an integer of 0, 1, 2, 3, or 4; and $R^6$, $R^7$, $R^8$, $R^a$, $R^x$, Z, r, and s are each as defined herein.

In certain embodiments, in Formula XV, each $R^A$ is independently heteroaryl, optionally substituted. In certain embodiments, in Formula XV, each $R^A$ is independently 5-membered heteroaryl, optionally substituted. In certain embodiments, in Formula XV, each $R^A$ is independently pyrrolyl, optionally substituted. In certain embodiments, in Formula XV, each $R^A$ is independently furanyl, optionally substituted.

In one embodiment, the functionalized polyolefin provided herein comprises a compound having the structure of Formula XXI:

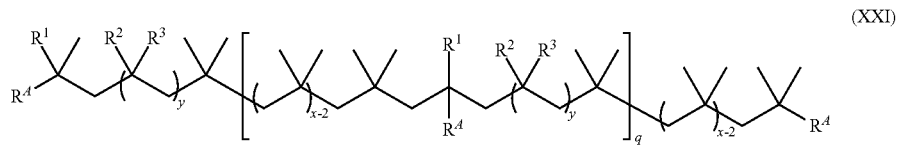

(XXI)

wherein q is an integer of 0, 1, 2, 3, 4, 5, 6, 7, 8, 9, 10, 11, 12, 13, 14, 15, 16, 17, 18, 19, or 20; in one embodiment, q is an integer of 0, 1, or 2; and $R^1$, $R^2$, $R^3$, $R^4$, x, and y are each as defined herein.

In one embodiment, the functionalized polyolefin provided herein comprises a compound having the structure of Formula XXIa:

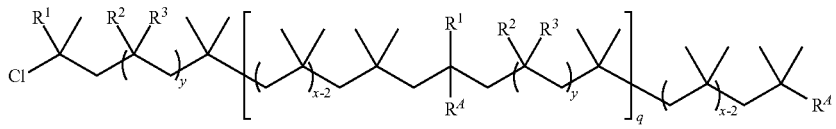

(XXIa)

wherein $R^1$, $R^2$, $R^3$, $R^A$, q, x, and y are each as defined herein.

In another embodiment, the functionalized polyolefin provided herein comprises a compound having the structure of Formula XXIb:

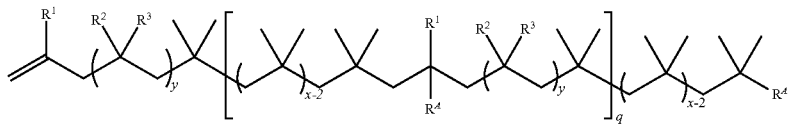

(XXIb)

wherein $R^1$, $R^2$, $R^3$, $R^A$, q, x, and y are each as defined herein.

In certain embodiments, in Formula XXI, XXIa, or XXIb, each $R^A$ is independently $C_{6-14}$ aryl, optionally substituted with one or more substituents Q as described herein. In certain embodiments, in Formula XXI, XXIa, or XXIb, each $R^A$ is independently phenyl, optionally substituted with one or more substituents Q as described herein.

In another embodiment, the functionalized polyolefin provided herein comprises a compound having the structure of Formula XXII:

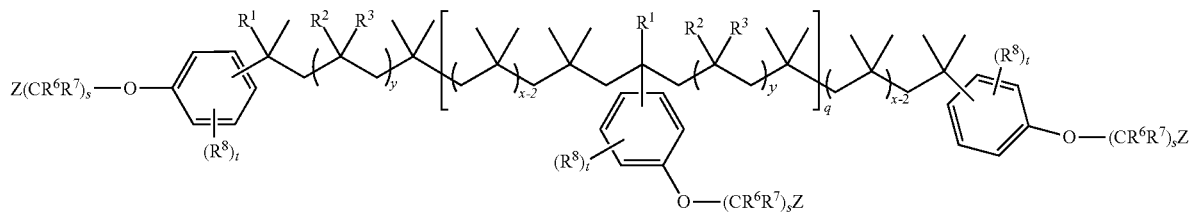

(XXII)

wherein $R^1$, $R^2$, $R^3$, $R^6$, $R^7$, $R^8$, Z, q, s, t, x, and y are each as defined herein.

In one embodiment, the functionalized polyolefin provided herein comprises a compound having the structure of Formula XXIIa:

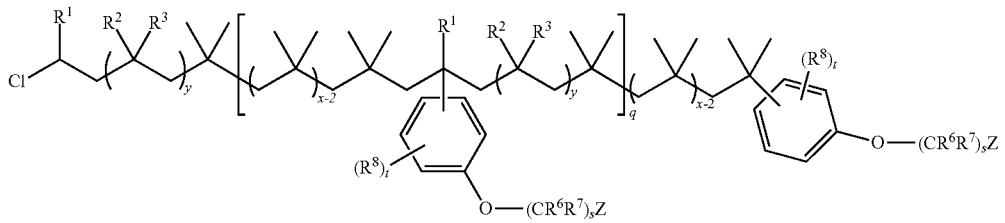

(XXIIa)

wherein $R^1$, $R^2$, $R^3$, $R^6$, $R^7$, $R^8$, Z, q, s, t, x, and y are each as defined herein.

In another embodiment, the functionalized polyolefin provided herein comprises a compound having the structure of Formula XXIIb:

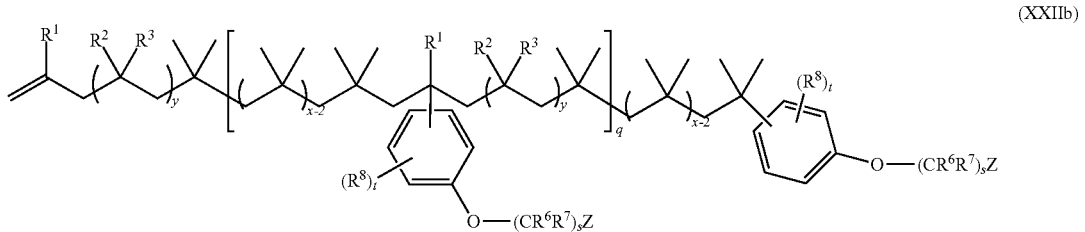

(XXIIb)

wherein $R^1$, $R^2$, $R^3$, $R^6$, $R^7$, $R^8$, Z, q, s, t, x, and y are each as defined herein.

In yet another embodiment, the functionalized polyolefin provided herein comprises a compound having the structure of Formula XXIII:

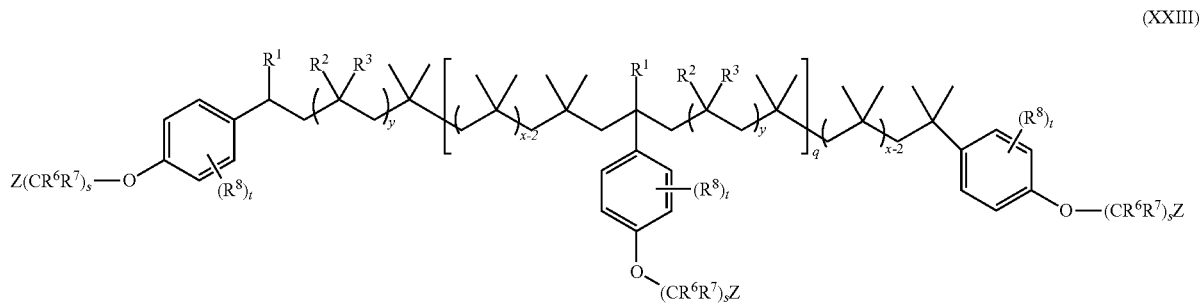

(XXIII)

wherein $R^1$, $R^2$, $R^3$, $R^6$, $R^7$, $R^8$, Z, q, s, t, x, and y are each as defined herein.

In one embodiment, the functionalized polyolefin provided herein comprises a compound having the structure of Formula XXIIIa:

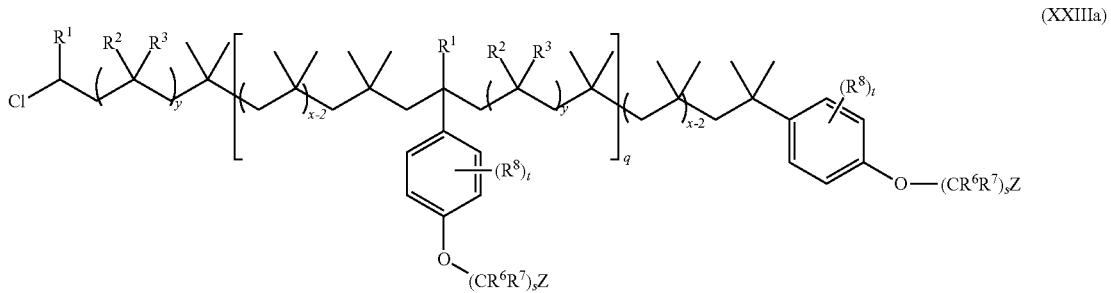

(XXIIIa)

wherein $R^1$, $R^2$, $R^3$, $R^6$, $R^7$, $R^8$, Z, q, s, t, x, and y are each as defined herein.

In another embodiment, the functionalized polyolefin provided herein comprises a compound having the structure of Formula XXIIIb:

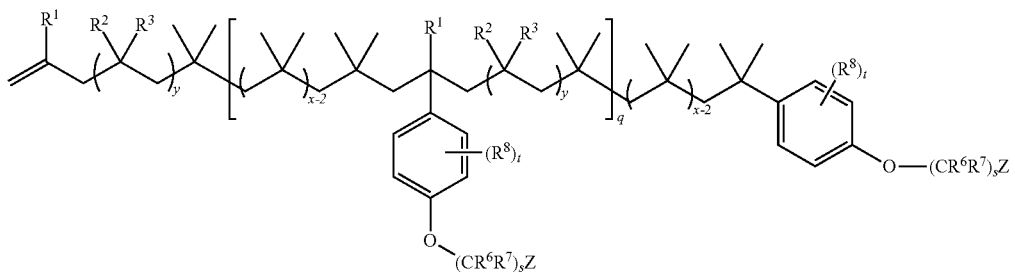
(XXIIIb)

wherein $R^1$, $R^2$, $R^3$, $R^6$, $R^7$, $R^8$, Z, q, s, t, x, and y are each as defined herein.

In certain embodiments, in Formula XXI, XXIa, or XXIb, each $R^A$ is independently heteroaryl, optionally substituted with one or more substituents Q as described herein. In certain embodiments, in Formula XXI, XXIa, or XXIb, each $R^A$ is independently 5-membered heteroaryl, optionally substituted with one or more substituents Q as described herein. In certain embodiments, in Formula XXI, XXIa, or XXIb, each $R^A$ is independently pyrrolyl, optionally substituted with one or more substituents Q as described herein. In certain embodiments, in Formula XXI, XXIa, or XXIb, each $R^A$ is independently furanyl, optionally substituted with one or more substituents Q as described herein.

In one embodiment, the functionalized polyolefin provided herein comprises a compound having the structure of Formula XXVII:

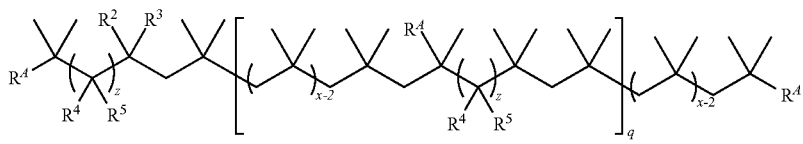
(XXVII)

wherein $R^4$, $R^5$, $R^A$, q, x, and z are each as defined herein.

In one embodiment, the functionalized polyolefin provided herein comprises a compound having the structure of Formula XXVIIa:

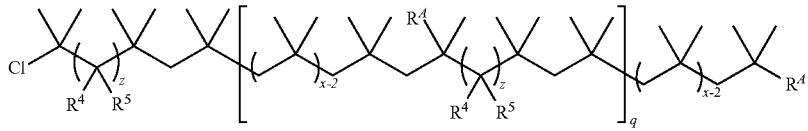
(XXVIIa)

wherein $R^4$, $R^5$, $R^A$, q, x, and z are each as defined herein.

In another embodiment, the functionalized polyolefin provided herein comprises a compound having the structure of Formula XXVIIb:

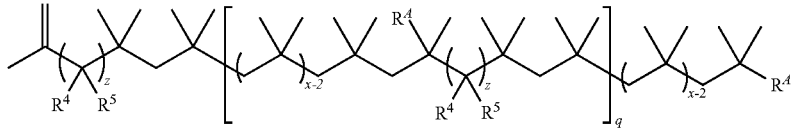
(XXVIIb)

wherein $R^4$, $R^5$, $R^A$, q, x, and z are each as defined herein.

In certain embodiments, in Formula XXVII, XXVIIa, or XXVIIb, each $R^4$ is independently $C_{6-14}$ aryl, optionally substituted with one or more substituents Q as described herein. In certain embodiments, in Formula XXVII, XXVIIa, or XXVIIb, each $R^4$ is independently phenyl, optionally substituted with one or more substituents Q as described herein.

In another embodiment, the functionalized polyolefin provided herein comprises a compound having the structure of Formula XXVIII:

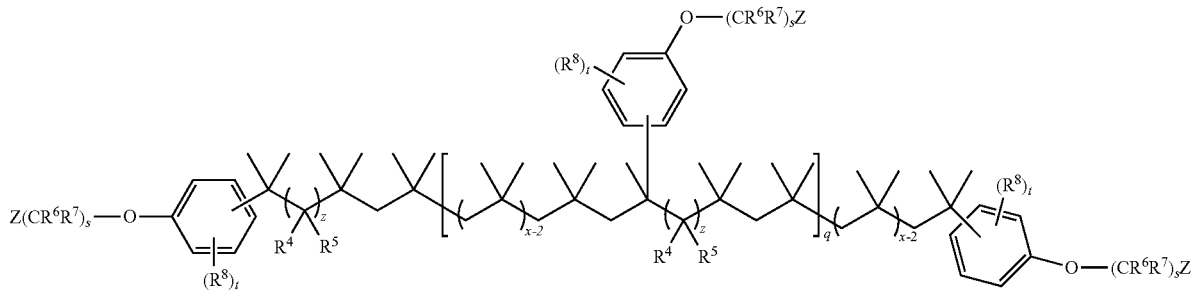

(XXVIII)

wherein $R^4$, $R^5$, $R^6$, $R^7$, $R^8$, Z, q, s, t, x, and z are each as defined herein.

In one embodiment, the functionalized polyolefin provided herein comprises a compound having the structure of Formula XXVIIIa:

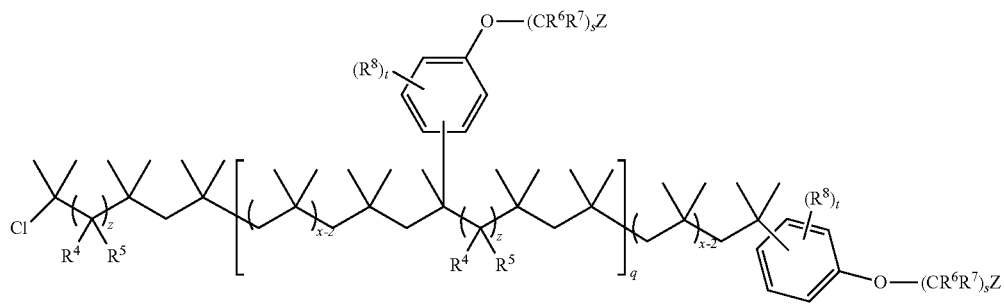

(XXVIIIa)

wherein $R^4$, $R^5$, $R^6$, $R^7$, $R^8$, Z, q, s, t, x, and z are each as defined herein.

In another embodiment, the functionalized polyolefin provided herein comprises a compound having the structure of Formula XXVIIIb:

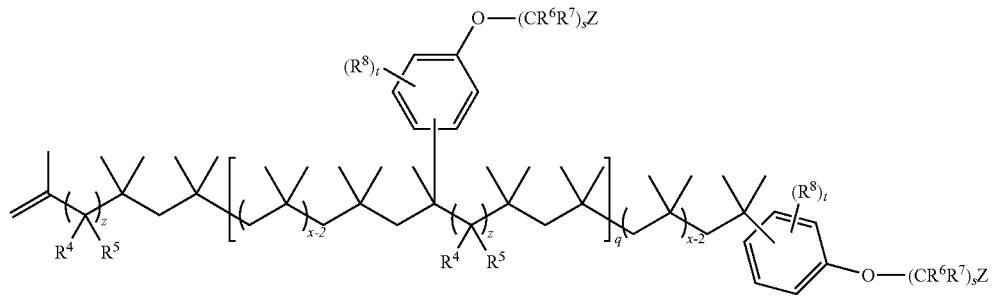

(XXVIIIb)

wherein $R^4$, $R^5$, $R^6$, $R^7$, $R^8$, Z, q, s, t, x, and z are each as defined herein.

In yet another embodiment, the functionalized polyolefin provided herein comprises a compound having the structure of Formula XXIX:

(XXIX)

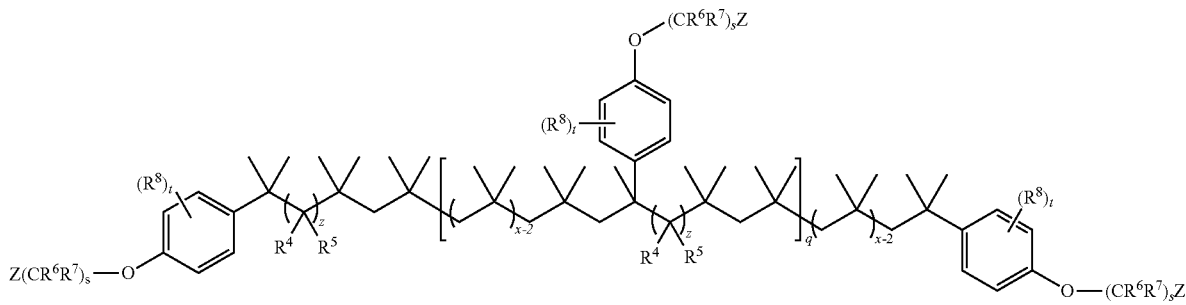

wherein $R^4$, $R^5$, $R^6$, $R^7$, $R^8$, Z, q, s, t, x, and z are each as defined herein.

In one embodiment, the functionalized polyolefin provided herein comprises a compound having the structure of Formula XXIXa:

(XXIXa)

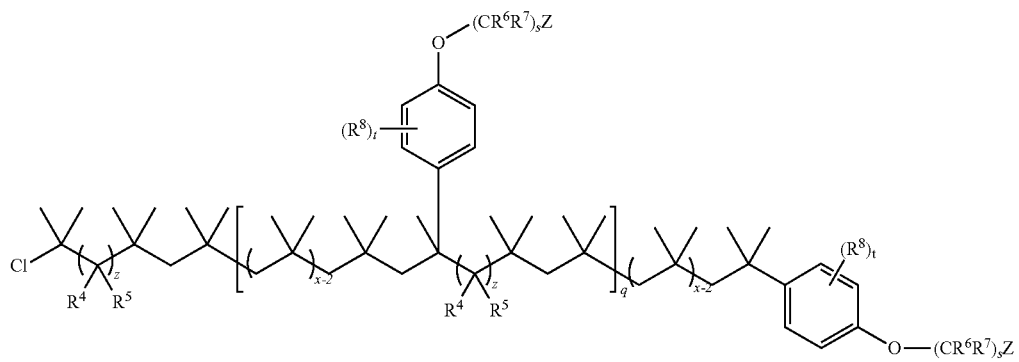

wherein $R^4$, $R^5$, $R^6$, $R^7$, $R^8$, Z, q, s, t, x, and z are each as defined herein.

In another embodiment, the functionalized polyolefin provided herein comprises a compound having the structure of Formula XXIXb:

(XXIXb)

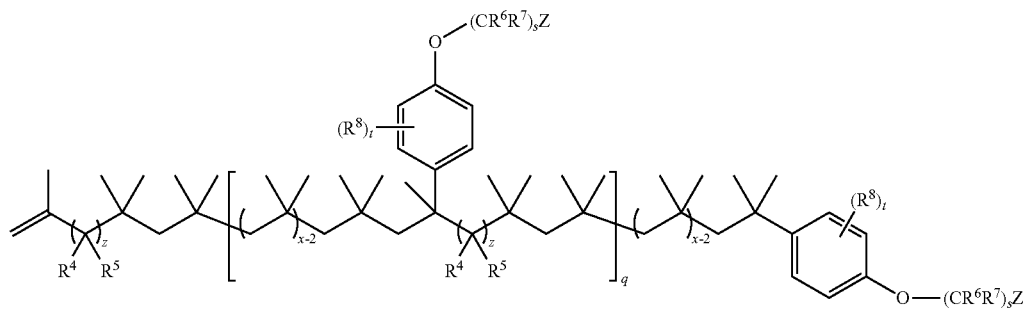

wherein $R^4$, $R^5$, $R^6$, $R^7$, $R^8$, Z, q, s, t, x, and z are each as defined herein.

In certain embodiments, in Formula XXVII, XXVIIa, or XXVIIb, each $R^A$ is independently heteroaryl, optionally substituted with one or more substituents Q as described herein. In certain embodiments, in Formula XXVII, XXVIIa, or XXVIIb, each $R^A$ is independently 5-membered heteroaryl, optionally substituted with one or more substituents Q as described herein. In certain embodiments, in Formula XXVII, XXVIIa, or XXVIIb, each $R^A$ is independently pyrrolyl, optionally substituted with one or more substituents Q as described herein. In certain embodiments, in Formula XXVII, XXVIIa, or XXVIIb, each $R^A$ is independently furanyl, optionally substituted with one or more substituents Q as described herein.

In one embodiment, the functionalized polyolefin provided herein comprises a compound having the structure of Formula XXXIII:

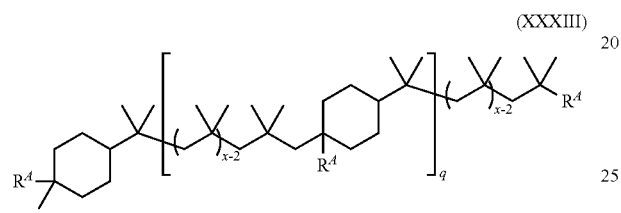

(XXXIII)

wherein $R^A$, q, and x are each as defined herein.

In one embodiment, the functionalized polyolefin provided herein comprises a compound having the structure of Formula XXXIIIa:

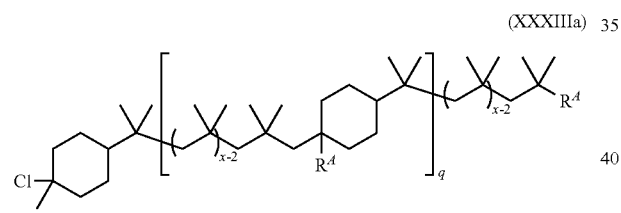

(XXXIIIa)

wherein $R^A$, q, and x are each as defined herein.

In another embodiment, the functionalized polyolefin provided herein comprises a compound having the structure of Formula XXXIIIb:

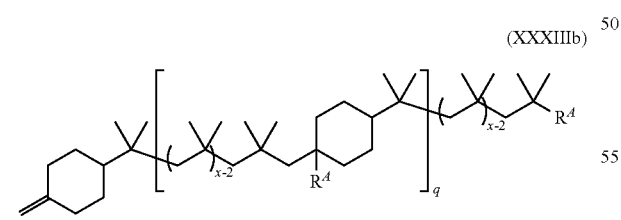

(XXXIIIb)

wherein $R^A$, q, and x are each as defined herein.

In certain embodiments, in Formula XXXIII, XXXIIIa, or XXXIIIb, each $R^A$ is independently $C_{6-14}$ aryl, optionally substituted with one or more substituents Q as described herein. In certain embodiments, in Formula XXXIII, XXXIIIa, or XXXIIIb, each $R^A$ is independently phenyl, optionally substituted with one or more substituents Q as described herein.

In another embodiment, the functionalized polyolefin provided herein comprises a compound having the structure of Formula XXXIV:

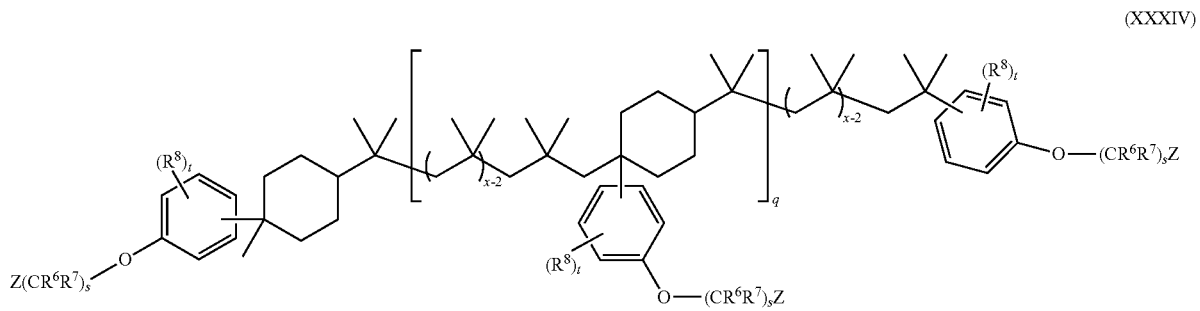

(XXXIV)

wherein $R^6$, $R^7$, $R^8$, Z, s, t, and x are each as defined herein.

In one embodiment, the functionalized polyolefin provided herein comprises a compound having the structure of Formula XXXIVa:

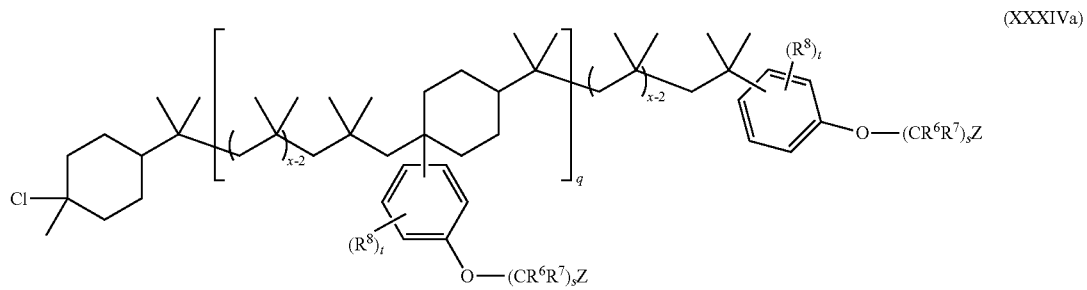

(XXXIVa)

wherein $R^6$, $R^7$, $R^8$, Z, s, t, and x are each as defined herein.

In another embodiment, the functionalized polyolefin provided herein comprises a compound having the structure of Formula XXXIVb:

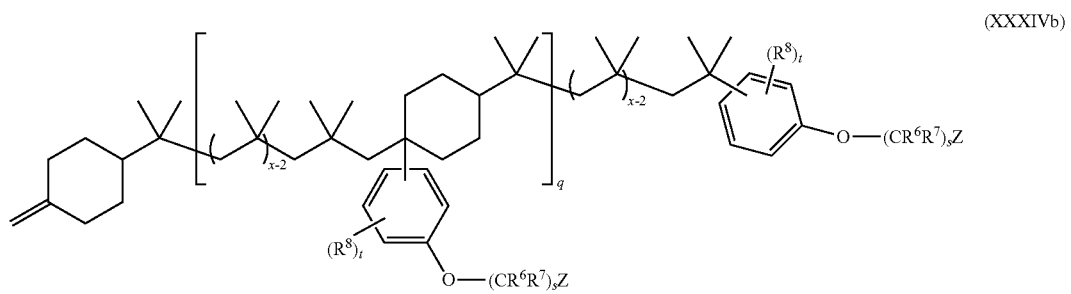

(XXXIVb)

wherein $R^6$, $R^7$, $R^8$, Z, s, t, and x are each as defined herein.

In yet another embodiment, the functionalized polyolefin provided herein comprises a compound having the structure of Formula XXXV:

(XXXV)

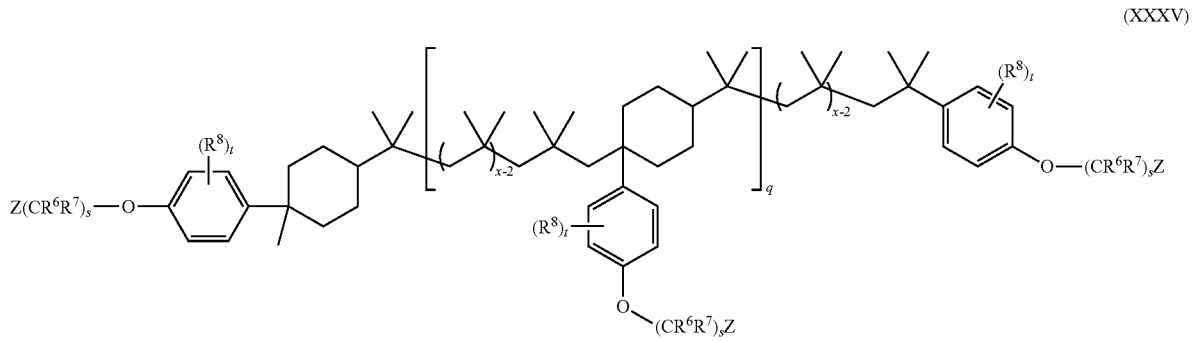

wherein $R^6$, $R^7$, $R^8$, Z, q, s, t, and x are each as defined herein.

In one embodiment, the functionalized polyolefin provided herein comprises a compound having the structure of Formula XXXVa:

(XXXVa)

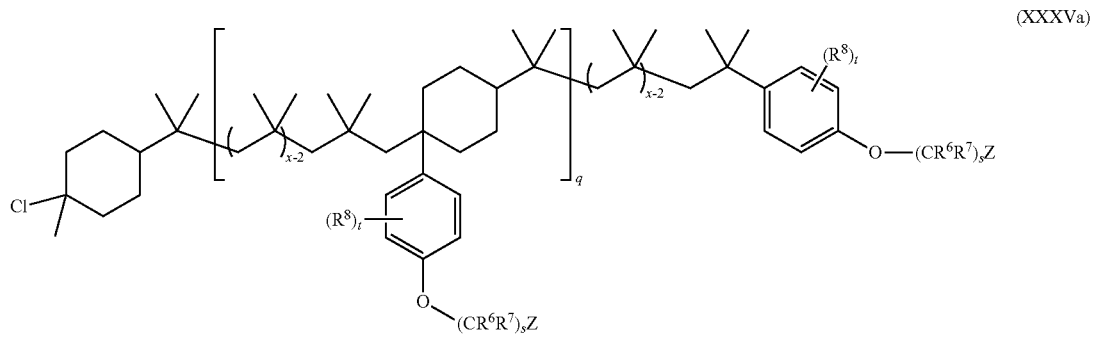

wherein $R^6$, $R^7$, $R^8$, Z, q, s, t, and x are each as defined herein.

In another embodiment, the functionalized polyolefin provided herein comprises a compound having the structure of Formula XXXVb:

(XXXVb)

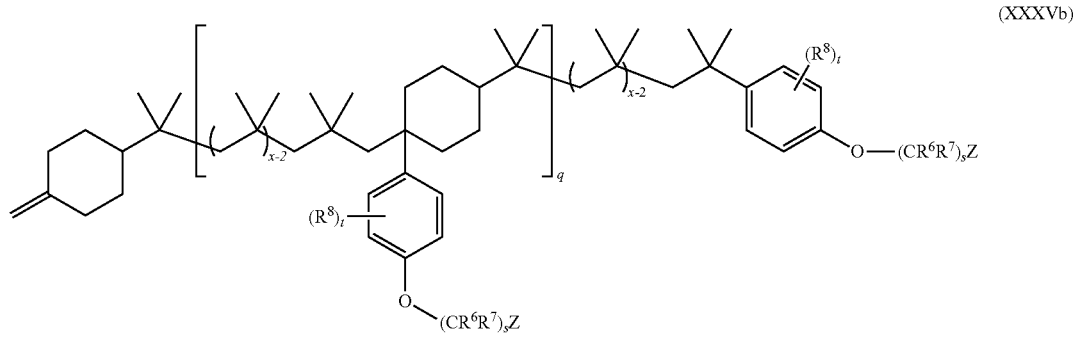

wherein $R^6$, $R^7$, $R^8$, Z, q, s, t, and x are each as defined herein.

In certain embodiments, in Formula XXXIII, XXXIIIa, or XXXIIIb, each $R^A$ is independently heteroaryl, optionally substituted with one or more substituents Q as described herein. In certain embodiments, in Formula XXXIII, XXXIIIa, or XXXIIIb, each $R^A$ is independently 5-membered heteroaryl, optionally substituted with one or more substituents Q as described herein. In certain embodiments, in Formula XXXIII, XXXIIIa, or XXXIIIb, each $R^A$ is independently pyrrolyl, optionally substituted with one or more substituents Q as described herein. In certain embodiments, in Formula XXXIII, XXXIIIa, or XXXIIIb, each $R^A$ is independently furanyl, optionally substituted with one or more substituents Q as described herein.

The groups, $R^1$, $R^2$, $R^3$, $R^4$, $R^5$, $R^6$, $R^7$, $R^8$, $R^9$, $R^1$, $R^A$, $R^a$, $R^b$, $R^x$, Z, m, n, q, r, s, t, x, y, and z in Formulae provided herein, e.g., Formulae I to XII, XV to XVII, XXI to XXIII, XXVII, XXVIII, XIX, XXXIII to XXXV, XXIa to XXIIIa, XXVIIa, XXVIIIa, XIXa, XXXIIIa to XXXVa, XXIb to XXIIIb, XXVIIb, XXVIIIb, XIXb, and XXXIIIb to XXXVb, are further defined in the embodiments described herein. All combinations of the embodiments provided herein for such groups are within the scope of this disclosure.

In certain embodiments, each $R^1$ is independently hydrogen. In certain embodiments, each $R^1$ is independently alkyl, optionally substituted, in one embodiment, with one or more substituents Q as defined herein. In certain embodiments, each $R^1$ is independently $C_{1-6}$ alkyl, optionally substituted, in one embodiment, with one or more substituents Q as defined herein. In certain embodiments, each $R^1$ is independently methyl. In certain embodiments, each $R^1$ is independently aryl, optionally substituted, in one embodiment, with one or more substituents Q as defined herein. In certain embodiments, each $R^1$ is independently $C_{6-14}$ aryl, optionally substituted, in one embodiment, with one or more substituents Q as defined herein. In certain embodiments, each $R^1$ is independently phenyl, optionally substituted, in one embodiment, with one or more substituents Q as defined herein.

In certain embodiments, each $R^2$ is independently hydrogen or alkyl, wherein the alkyl is optionally substituted, in one embodiment, with one or more substituents Q as defined herein. In certain embodiments, each $R^2$ is independently hydrogen or $C_{1-6}$ alkyl, wherein the alkyl is optionally substituted, in one embodiment, with one or more substituents Q as defined herein. In certain embodiments, each $R^2$ is independently hydrogen or methyl. In certain embodiments, each $R^2$ is hydrogen. In certain embodiments, each $R^2$ is independently alkyl, optionally substituted, in one embodiment, with one or more substituents Q as defined herein. In certain embodiments, each $R^2$ is independently $C_{1-6}$ alkyl, optionally substituted, in one embodiment, with one or more substituents Q as defined herein. In certain embodiments, each $R^2$ is independently methyl. In certain embodiments, each $R^2$ is independently aryl, optionally substituted, in one embodiment, with one or more substituents Q as defined herein. In certain embodiments, each $R^2$ is independently $C_{6-14}$ aryl, optionally substituted, in one embodiment, with one or more substituents Q as defined herein. In certain embodiments, each $R^2$ is independently phenyl, optionally substituted, in one embodiment, with one or more substituents Q as defined herein.

In certain embodiments, each $R^3$ is independently hydrogen or alkyl, wherein the alkyl is optionally substituted, in one embodiment, with one or more substituents Q as defined herein. In certain embodiments, each $R^3$ is independently hydrogen or $C_{1-6}$ alkyl, wherein the alkyl is optionally substituted, in one embodiment, with one or more substituents Q as defined herein. In certain embodiments, each $R^3$ is independently hydrogen or methyl. In certain embodiments, each $R^3$ is independently hydrogen. In certain embodiments, each $R^3$ is independently alkyl, optionally substituted, in one embodiment, with one or more substituents Q as defined herein. In certain embodiments, each $R^3$ is independently $C_{1-6}$ alkyl, optionally substituted, in one embodiment, with one or more substituents Q as defined herein. In certain embodiments, each $R^3$ is independently methyl. In certain embodiments, each $R^3$ is independently aryl, optionally substituted, in one embodiment, with one or more substituents Q as defined herein. In certain embodiments, each $R^3$ is independently $C_{6-14}$ aryl, optionally substituted, in one embodiment, with one or more substituents Q as defined herein. In certain embodiments, each $R^3$ is independently phenyl, optionally substituted, in one embodiment, with one or more substituents Q as defined herein.

In certain embodiments, each $R^2$ and $R^3$ is independently hydrogen or alkyl, wherein the alkyl is optionally substituted, in one embodiment, with one or more substituents Q as defined herein. In certain embodiments, each $R^2$ and $R^3$ are independently hydrogen or $C_{1-6}$ alkyl, wherein the alkyl is optionally substituted, in one embodiment, with one or more substituents Q as defined herein. In certain embodiments, each $R^2$ and $R^3$ is independently hydrogen or methyl. In certain embodiments, each $R^2$ and $R^3$ is hydrogen. In certain embodiments, each $R^2$ and $R^3$ is independently alkyl, optionally substituted, in one embodiment, with one or more substituents Q as defined herein. In certain embodiments, each $R^2$ and $R^3$ is independently $C_{1-6}$ alkyl, optionally substituted, in one embodiment, with one or more substituents Q as defined herein. In certain embodiments, each $R^2$ and $R^3$ is methyl.

In certain embodiments, $R^1$, $R^2$, and $R^3$ are each hydrogen. In certain embodiments, $R^1$ is methyl, and $R^2$ and $R^3$ are each hydrogen. In certain embodiments, $R^1$ and $R^2$ are each methyl and $R^3$ is hydrogen. In certain embodiments, $R^1$ and $R^3$ are each methyl and $R^2$ is hydrogen. In certain embodiments, $R^1$ and $R^2$ are each phenyl, and $R^3$ is hydrogen. In certain embodiments, $R^1$ and $R^3$ are each phenyl and $R^2$ is hydrogen.

In certain embodiments, each $R^4$ is independently hydrogen. In certain embodiments, each $R^4$ is independently alkyl, optionally substituted, in one embodiment, with one or more substituents Q as defined herein. In certain embodiments, each $R^4$ is independently $C_{1-6}$ alkyl, optionally substituted, in one embodiment, with one or more substituents Q as defined herein. In certain embodiments, each $R^4$ is independently methyl. In certain embodiments, each $R^4$ is independently aryl, optionally substituted, in one embodiment, with one or more substituents Q as defined herein. In certain embodiments, each $R^4$ is independently $C_{6-14}$ aryl, optionally substituted, in one embodiment, with one or more substituents Q as defined herein. In certain embodiments, each $R^4$ is independently phenyl, optionally substituted, in one embodiment, with one or more substituents Q as defined herein.

In certain embodiments, each $R^5$ is independently hydrogen. In certain embodiments, each $R^5$ is independently alkyl, optionally substituted, in one embodiment, with one or more substituents Q as defined herein. In certain embodiments, each $R^5$ is independently $C_{1-6}$ alkyl, optionally substituted, in one embodiment, with one or more substituents Q as defined herein. In certain embodiments, each $R^5$ is independently methyl. In certain embodiments, each $R^5$ is independently aryl, optionally substituted, in one embodiment, with one or more substituents Q as defined herein. In certain embodiments, each $R^5$ is independently $C_{6-14}$ aryl, optionally substituted, in one embodiment, with one or more substituents Q as defined herein. In certain embodiments, each $R^5$ is independently phenyl, optionally substituted, in one embodiment, with one or more substituents Q as defined herein.

In certain embodiments, each $R^6$ is independently hydrogen. In certain embodiments, each $R^6$ is independently alkyl, optionally substituted, in one embodiment, with one or more substituents Q as defined herein. In certain embodiments, each $R^6$ is independently $C_{1-6}$ alkyl, optionally substituted, in one embodiment, with one or more substituents Q as defined herein. In certain embodiments, each $R^6$ is independently methyl.

In certain embodiments, each $R^7$ is independently hydrogen. In certain embodiments, each $R^7$ is independently alkyl, optionally substituted, in one embodiment, with one or more substituents Q as defined herein. In certain embodiments, each $R^7$ is independently $C_{1-6}$ alkyl, optionally substituted, in one embodiment, with one or more substituents Q as defined herein. In certain embodiments, each $R^7$ is independently methyl.

In certain embodiments, each $R^8$ is independently halo. In certain embodiments, each $R^8$ is independently fluoro, chloro, bromo, or iodo. In certain embodiments, each $R^8$ is independently alkyl, optionally substituted, in one embodiment, with one or more substituents Q as defined herein. In certain embodiments, each $R^8$ is independently $C_{1-6}$ alkyl, optionally substituted, in one embodiment, with one or more substituents Q as defined herein. In certain embodiments, each $R^8$ is independently alkoxy, optionally substituted, in one embodiment, with one or more substituents Q as defined herein. In certain embodiments, each $R^8$ is independently $C_{1-6}$ alkoxy, optionally substituted, in one embodiment, with one or more substituents Q as defined herein. In certain embodiments, each $R^8$ is independently $-NR^{1b}R^{1c}$, where $R^{1b}$ and $R^{1c}$ are each as defined herein. In certain embodiments, each $R^8$ is independently $-NH_2$.

In certain embodiments, each $R^9$ is independently halo. In certain embodiments, each $R^9$ is independently fluoro, chloro, bromo, or iodo. In certain embodiments, each $R^9$ is independently alkyl, optionally substituted, in one embodiment, with one or more substituents Q as defined herein. In certain embodiments, each $R^9$ is independently $C_{1-6}$ alkyl, optionally substituted, in one embodiment, with one or more substituents Q as defined herein. In certain embodiments, each $R^9$ is independently alkoxy, optionally substituted, in one embodiment, with one or more substituents Q as defined herein. In certain embodiments, each $R^9$ is independently $C_{1-6}$ alkoxy, optionally substituted, in one embodiment, with one or more substituents Q as defined herein. In certain embodiments, each $R^9$ is independently $-NR^{1b}R^{1c}$, where $R^{1b}$ and $R^{1c}$ are each as defined herein. In certain embodiments, each $R^9$ is independently $-NH_2$.

In certain embodiments, each $R^{10}$ is independently alkyl, optionally substituted, in one embodiment, with one or more substituents Q as defined herein. In certain embodiments, each $R^{10}$ is independently $C_{1-6}$ alkyl, optionally substituted, in one embodiment, with one or more substituents Q as defined herein. In certain embodiments, each $R^{10}$ is independently $-(CR^6R^7)_sZ$, wherein $R^6$, $R^7$, Z, and s are each as defined herein.

In certain embodiments, each $R^A$ is independently aryl, optionally substituted. In certain embodiments, each $R^A$ is independently monocyclic aryl, optionally substituted. In certain embodiments, each $R^A$ is independently phenyl, optionally substituted. In certain embodiments, each $R^A$ is independently phenyl, optionally substituted. In certain embodiments, each $R^A$ is independently heteroaryl, optionally substituted. In certain embodiments, each $R^A$ is independently monocyclic heteroaryl, optionally substituted. In certain embodiments, each $R^A$ is independently 5-membered heteroaryl, optionally substituted. In certain embodiments, each $R^A$ is independently pyrrolyl, optionally substituted. In certain embodiments, each $R^A$ is independently N-substituted pyrrolyl, optionally substituted. In certain embodiments, each $R^A$ is independently furanyl, optionally substituted. In certain embodiments, each $R^A$ is independently 2-substituted furanyl, optionally substituted.

In certain embodiments, each $R^a$ is independently a divalent polyolefin group. In certain embodiments, each $R^a$ is independently a divalent quasiliving polyolefin group. In certain embodiments, each $R^a$ is independently a divalent living polyolefin group. In certain embodiments, each $R^a$ is independently a divalent polyisobutyl group. In certain embodiments, each $R^a$ is independently a divalent quasiliving polyisobutyl group. In certain embodiments, each $R^a$ is independently a divalent living polyisobutyl group. In certain embodiments, each $R^a$ is independently a divalent polyisobutyl group of $-[CH_2-C(CH_3)_2]_s-$, wherein s is an integer ranging from about 2 to about 5,000. In certain embodiments, s is an integer ranging from about 5 to about 2,500 (e.g., from about 10 to about 2,000, from about 2 to about 2,000, from about 5 to about 500, from about 10 to about 200, from about 10 to about 100, from about 10 to about 50). In certain embodiments, s is an integer of about 5, about 10, about 15, about 20, about 25, about 30, about 35, about 40, about 45, or about 50. In certain embodiments, each $R^a$ is independently $-[CH_2-C(CH_3)_2]_{20}-$ or $-[CH_2-C(CH_3)_2]_{40}-$. In certain embodiments, each $R^a$ is $-[CH_2-C(CH_3)_2]_{20}-$. In certain embodiments, each $R^a$ is $-[CH_2-C(CH_3)_2]_{40}-$.

In certain embodiments, each $R^b$ is independently a monovalent polyolefin group. In certain embodiments, each $R^b$ is independently a monovalent quasiliving polyolefin group. In certain embodiments, each $R^b$ is independently a monovalent living polyolefin group. In certain embodiments, each $R^b$ is independently a monovalent polyisobutyl group. In certain embodiments, each $R^b$ is independently a monovalent quasiliving polyisobutyl group. In certain embodiments, each $R^b$ is independently a monovalent living polyolefin group.

In certain embodiments, $R^x$ is an initiator residue of functionality r, wherein r is as defined herein. In certain embodiments, $R^x$ is a monofunctional initiator residue. In certain embodiments, $R^x$ is a monofunctional carbocationic initiator residue. In certain embodiments, $R^x$ is a residue of an initiator, where the initiator is 2-chloro-2,4,4-trimethylpentane (TMPCl), 2-acetoxy-2,4,4,-trimethylpentane, 2-propionyl-2,4,4-trimethylpentane, 2-methoxy-2,4,4-trimethylpentane, 2-ethoxy-2,4,4-trimethylpentane, 2-chloro-2-phenylpropane (cumyl chloride), 2-acetoxy-2-phenylpropane (cumyl acetate), 2-propionyloxy-2-phenylpropane (cumyl propionate), 2-methoxy-2-phenylpropane (cumylmethyl ether), or 2-ethoxy-2-phenylpropane (cumylethyl ether). In certain embodiments, $R^x$ is 2,4,4-trimethylpent-2-yl or 2-phenylprop-2-yl. Additional examples of initiators can be found in U.S. Pat. No. 8,383,760, the disclosure of which is incorporated herein by reference in its entirety.

In certain embodiments, $R^x$ is a polyfunctional initiator residue of functionality r, wherein r is as defined herein. In certain embodiments, $R^x$ is a polyfunctional carbocationic initiator residue of functionality r, wherein r is as defined herein. In certain embodiments, $R^x$ is a divalent or trivalent initiator residue.

In certain embodiments, $R^x$ is a divalent initiator residue. In certain embodiments, $R^x$ is a divalent carbocationic initiator residue. In certain embodiments, $R^x$ is a trivalent initiator residue. In certain embodiments, $R^x$ is an initiator residue having the structure of:

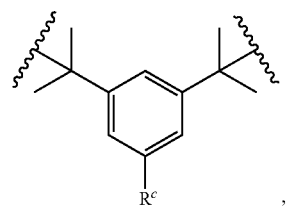

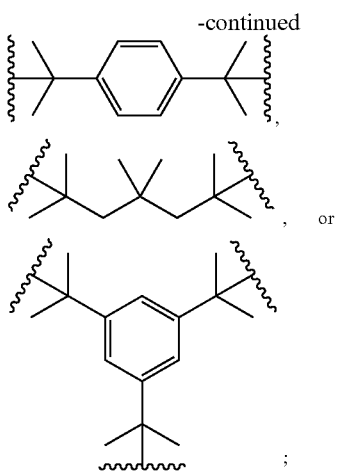

wherein $R^c$ is hydrogen or alkyl, where the alkyl is optionally substituted.

In certain embodiments, $R^x$ is an initiator residue having the structure of:

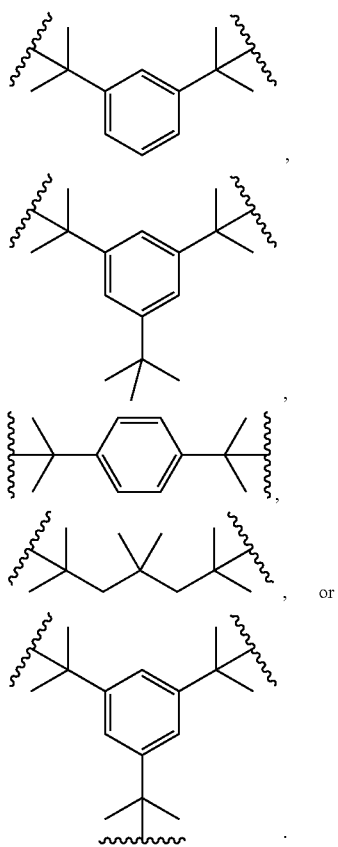

In certain embodiments, $R^x$ is a residue of an initiator, where the initiator is 1,3-di(1-chloro-1-methylethyl)-5-tert-butylbenzene (bDCC), 1,3-di(1-acetoxy-1-methylethyl)-5-tert-butylbenzene, 1,3-di(1-propionyloxy-1-methylethyl)-5-tert-butylbenzene, 1,3-di(1-methoxy-1-methylethyl)-5-tert-butylbenzene, 1,3-di(1-ethoxy-1-methylethyl)-5-tert-butylbenzene, 1,4-di(1-chloro-1-methylethyl)benzene, 1,4-di(1-acetoxy-1-methylethyl)benzene, 1,4-di(1-propionyloxy-1-methylethyl)benzene, 1,4-di(1-methoxy-1-methylethyl)benzene, 1,4-di(1-ethoxy-1-methylethyl)benzene, 2,6-dichloro-2,4,4,6-tetramethylheptane, 2,6-diacetoxy-2,4,4,6-tetramethylheptane, 2,6-dipropionyloxy-2,4,4,6-tetramethylheptane, 2,6-dimethoxy-2,4,4,6-tetramethylheptane, 2,6-diethoxy-2,4,4,6-tetramethylheptane, 1,3,5-tri(1-chloro-1-methylethyl)benzene, 1,3,5-tri(1-acetoxy-1-methylethyl)benzene, 1,3,5-tri(1-propionyloxy-1-methylethyl)benzene, 1,3,5-tri(1-methoxy-1-methylethyl)benzene, or 1,3,5-tri(1-ethoxy-1-methylethyl)benzene. Additional examples of initiators can be found in U.S. Pat. No. 4,946,899, the disclosure of which is incorporated herein by reference in its entirety.

In certain embodiments, $R^x$ is a residue of a terpene initiator. Examples of terpene initiators can be found, e.g., in U.S. Pat. No. 8,492,491, the disclosure of which is incorporated herein by reference in its entirety.

In certain embodiments, each Z is independently hydrogen. In certain embodiments, each Z is independently halo. In certain embodiments, each Z is independently fluoro, chloro, bromo, or iodo. In certain embodiments, each Z is independently chloro. In certain embodiments, each Z is independently bromo. In certain embodiments, each Z independently is iodo.

In certain embodiments, each Z is independently —CN, —NC, —NCO, —OCN, —NCS, or —SCN.

In certain embodiments, each Z is independently alkyl, optionally substituted, in one embodiment, with one or more substituents Q as defined herein. In certain embodiments, each Z is independently $C_{1-6}$ alkyl, optionally substituted, in one embodiment, with one or more substituents Q as defined herein. In certain embodiments, each Z is independently alkenyl, optionally substituted, in one embodiment, with one or more substituents Q as defined herein. In certain embodiments, each Z is independently $C_{2-6}$ alkenyl, optionally substituted, in one embodiment, with one or more substituents Q as defined herein. In certain embodiments, each Z is independently alkynyl, optionally substituted, in one embodiment, with one or more substituents Q as defined herein. In certain embodiments, each Z is independently $C_{2-6}$ alkynyl, optionally substituted, in one embodiment, with one or more substituents Q as defined herein. In certain embodiments, each Z is independently aryl, optionally substituted, in one embodiment, with one or more substituents Q as defined herein. In certain embodiments, each Z is independently $C_{6-14}$ aryl, optionally substituted, in one embodiment, with one or more substituents Q as defined herein. In certain embodiments, each Z is independently aralkyl, optionally substituted, in one embodiment, with one or more substituents Q as defined herein. In certain embodiments, each Z is independently $C_{7-15}$ aralkyl, optionally substituted, in one embodiment, with one or more substituents Q as defined herein. In certain embodiments, each Z is independently heteroaryl, optionally substituted, in one embodiment, with one or more substituents Q as defined herein. In certain embodiments, each Z is independently heterocyclyl, optionally substituted, in one embodiment, with one or more substituents Q as defined herein.

In certain embodiments, each Z is independently —C(O)OR$^{2a}$, wherein R$^{2a}$ is as defined herein. In certain embodiments, each Z is independently —C(O)NR$^{2b}$R$^{2c}$, wherein R$^{2b}$ and R$^{2c}$ are each as defined herein. In certain embodiments, each Z is independently —OR$^{2a}$, wherein R$^{2a}$ is as defined herein. In certain embodiments, each Z is independently hydroxyl. In certain embodiments, each Z is independently alkoxy, optionally substituted, in one embodiment, with one or more substituents Q as defined herein. In certain embodiments, each Z is independently $C_{1-6}$ alkoxy, optionally substituted, in one embodiment, with one or more substituents Q as defined herein. In certain embodiments, each Z is independently —OC(O)$R^{2a}$, wherein $R^{2a}$ is as defined herein. In certain embodiments, each Z is independently —$NR^{2b}R^{2c}$, wherein $R^{2b}$ and $R^{2c}$ are each as defined herein. In certain embodiments, each Z is independently -L-$SiR^{Za}R^{Zb}R^{Zc}$, wherein L, $R^{Za}$, $R^{Zb}$, and $R^{Zc}$ are each as defined herein.

In certain embodiments, each m is independently 0. In certain embodiments, each m is independently 1. In certain embodiments, each m is independently 2. In certain embodiments, each m is independently 3. In certain embodiments, each m is independently 4. In certain embodiments, each m is independently 5.

In certain embodiments, n is an integer ranging from about 1 to about 2,000 (e.g., from about 2 to about 1,500, from about 5 to about 1,000 from about 10 to about 1,000, from about 20 to about 1,000 from about 50 to about 1,000, from about 100 to about 1,000, from about 200 to about 1,000, or from about 200 to about 800). In certain embodiments, n is about 100, about 200, about 300, about 400, about 500, about 600, about 700, about 800, about 900, or about 1,000.

In certain embodiments, each q is independently 0. In certain embodiments, each q is independently 1. In certain embodiments, each q is independently 2. In certain embodiments, each q is independently 3. In certain embodiments, each q is independently 4. In certain embodiments, each q is independently 5. In certain embodiments, each q is independently 6. In certain embodiments, each q is independently 7. In certain embodiments, each q is independently 8. In certain embodiments, each q is independently an integer ranging from 0 to about 8. In certain embodiments, each q is independently an integer ranging from 0 to about 4. In certain embodiments, each q is independently an integer of 0, 1, or 2.

In certain embodiments, each r is independently 1. In certain embodiments, each r is independently 2. In certain embodiments, each r is independently 3. In certain embodiments, each r is independently 4. In certain embodiments, each r is independently 5. In certain embodiments, each r is independently 6. In certain embodiments, each r is independently 7. In certain embodiments, each r is independently 8. In certain embodiments, each r is independently an integer ranging from 2 to about 8. In certain embodiments, each r is independently an integer ranging from 2 to about 4.

In certain embodiments, each s is independently 0. In certain embodiments, each s is independently 1. In certain embodiments, each s is independently 2. In certain embodiments, each s is independently 3. In certain embodiments, each s is independently 4. In certain embodiments, each s is independently 5. In certain embodiments, each s is independently 6. In certain embodiments, each s is independently 7. In certain embodiments, each s is independently 8. In certain embodiments, each s is independently 9. In certain embodiments, each s is independently 10. In certain embodiments, each s is independently 11. In certain embodiments, each s is independently 12. In certain embodiments, each s is independently 13. In certain embodiments, each s is independently 14. In certain embodiments, each s is independently 15. In certain embodiments, each s is independently 16. In certain embodiments, s is independently 17. In certain embodiments, s is independently 18. In certain embodiments, each s is independently 19. In certain embodiments, each s is independently 20. In certain embodiments, each s is independently an integer ranging from about 2 to about 20. In certain embodiments, each s is independently an integer ranging from about 2 to about 12. In certain embodiments, each s is independently 2, 3, 4, 6, or 11.

In certain embodiments, each t is independently 0. In certain embodiments, each t is independently 1. In certain embodiments, each t is independently 2. In certain embodiments, each t is independently 3. In certain embodiments, each t is independently 4. In certain embodiments, each t is independently 5.

In certain embodiments, each x is independently an integer ranging from about 10 to about 200 (e.g., from about 10 to about 150, from about 20 to about 100, or from about 50 to about 100). In certain embodiments, each x is independently about 10, about 20, about 30, about 40, about 50, about 60, about 70, about 80, about 90, or about 100.

In certain embodiments, each y is independently 0. In certain embodiments, each y is independently 1.

In certain embodiments, each z is independently 1. In certain embodiments, each z is independently 2. In certain embodiments, each z is independently 3. In certain embodiments, each z is independently 4. In certain embodiments, each z is independently 5. In certain embodiments, each z is independently 6. In certain embodiments, each z is independently 7. In certain embodiments, each z is independently 8. In certain embodiments, each z is independently an integer ranging from about 9 to about 20.

4.4 EXAMPLES

Example 1

Functionalization of Pre-Formed PIB with (3-Bromopropoxy)benzene

A polyisobutylene sample, PIB1, was prepared using 2-chloro-2,4,4-trimethylpentane (TMPCl) and $TiCl_4$ in hexane:methyl chloride (60:40) (vol:vol) at −60° C. under conditions to yield a large fraction of a coupled product. Molecular weight and molecular weight distribution were measured by gel permeation chromatography using the procedures as described in Simison et al., *Macromolecules* 2006, 39, 2481-2487, with absolute molecular weights determined by multi-angle laser light scattering (MALLS) detection using a dn/dc calculated from the refractive index detector response and assuming 100% mass recovery from the columns. Composition of the PIB end groups was quantified via $^1$H NMR integration using a 300 MHz Varian Mercury$^{plus}$ NMR (VNMR 6.1C) spectrometer, with sample concentrations of 3-5% (wt/wt) in $CDCl_3$.

It was assumed that the four end-group species, exo olefin, endo olefin, tert-chloride, and coupled PIB, represent 100% of the chain ends. Fractional molar amounts of each type of chain end were normalized to original chains (i.e., one coupled PIB moiety was defined to be two primary PIB chains, each bearing a "coupled PIB" end group). The fractional molar amount of each type of chain end was obtained using equations such as that below for determining the fraction of exo olefin ($F_{exo}$), $$F_{exo}=(A_{exo})/(A_{exo}+A_{endo}+A_{exo\text{-}coupled}+^2A_{endo\text{-}coupled}+A_{tert\text{-}Cl}/2) \quad (3)$$

where $A_{exo}$ is the area of the upfield exo-olefinic proton at 4.64 ppm, $A_{endo}$ is the area of the endo-olefinic proton at 5.15 ppm, and $A_{endo\text{-}coupled}$ is the area of the endo-olefinic proton of the endo-coupled product at 5.12 ppm. The $A_{endo\text{-}coupled}$ term in eq. 3 carries a coefficient of 2 because coupled product represents 2 original PIB chains.

$A_{exo-coupled}$ in eq. 3 was calculated as follows:

$$A_{exo-coupled} = (A_{4.75-5.0} - A_{exo}) \quad (4)$$

where $A_{4.75-5.0}$ is the integrated area of the convoluted peaks from 4.75-5.0 ppm associated with the downfield exo-olefinic proton and the two identical olefinic protons of the exo-coupled product. The $A_{exo-coupled}$ term in eq. 3 carries a net coefficient of 1 because coupled product represents 2 original PIB chains and $A_{exo-coupled}$ represents the contribution of two protons.

$A_{tert-Cl}$ was calculated as:

$$A_{tert-Cl} = A_{1.95-2.05} - 2A_{exo} - 2A_{exo-coupled} - 2A_{endo-coupled} \quad (5)$$

where $A_{1.95-2.05}$ is the integrated area of the convoluted peaks from 1.95-2.05 ppm associated with the ultimate methylene protons of tert-chloride, exo-olefin, exo-coupled, and endo-coupled chain ends. The $A_{tert-Cl}$ term in eq. 3 is divided by 2 because this area represents the contribution of two protons.

Reaction of PIB1 with (3-bromopropoxy)benzene was performed within a $N_2$-atmosphere glovebox, with integral heptane cold bath, as follows. Hexane (60 mL) and methyl chloride (40 mL) were chilled to −70° C. and charged to a 300 mL round-bottom flask equipped with a mechanical stirrer and thermocouple. To this mixture was charged, via a syringe, a solution of PIB1 (2.25 g) in hexane (5 mL). After thermal equilibration to −70° C., $TiCl_4$ (0.6 mL, 1.0 g, 5.5 mmol) (neat and at room temperature) was added to the mixture. After 1 min, (3-bromopropoxy)benzene (1 mL, 1.37 g, 6.3 mmol) (neat and at room temperature) was added. After 5 hrs, the reaction was terminated by the addition of prechilled methanol (4 mL). The methyl chloride was allowed to evaporate, the resulting mixture was further concentrated by rotavap, and the polymer was then precipitated by addition of methanol (100 mL). The polymer was dissolved in hexane (50 mL), and the resulting solution was washed with water and dried over magnesium sulfate. The hexane was removed by vacuum stripping to yield a transparent polymer.

Tables 1 and 2 list end-group compositions of the starting PIB1 and the quenched product, 4-(3-bromopropoxy)phenyl-terminated PIB1, respectively, as calculated from $^1H$ NMR data using eqs. 3-5. FIG. 1 shows $^1H$ NMR spectra of PIB1 (A) and 4-(3-bromopropoxy)phenyl-terminated PIB1 (B), respectively.

Table 1 shows that the starting PIB1 sample contained various tert-chloride and olefinic end groups including about 42% primary chains that had coupled. Table 2 shows that the quenching process converted all chain ends to 4-(3-bromopropoxy)phenyl groups. Without being limited by any theory, the $^1H$ NMR spectrum of the quenched product (FIG. 1B) provided evidence that coupled chains were alkylated according to the proposed mechanism as shown in Scheme 1, i.e., alkylation was accompanied by decoupling of the coupled PIB chains. If alkylation had occurred without decoupling, the expected product would be that shown in Scheme 2. In Scheme 1 and 2, R is 3-bromopropyl. The methylene protons a', by virtue of their position relative to the aromatic ring, would be expected to appear as an additional signal (4 protons) in the range of 1.75-2.25 ppm in the $^1H$ NMR spectrum. However, FIG. 1B shows only one signal in this range (i) due to the ultimate methylene unit of the desired product. In fact, the $^1H$ NMR spectrum of the quenched product is indistinguishable from (3-bromopropoxy)benzene-quenched PIB derived from a starting PIB with no detectable coupled fraction (see FIG. 21 in Morgan et al., *Macromolecules* 2000, 43, 8724-8740).

TABLE 1

Characterization of PIB1

| End-Group Composition Determined By $^1H$ NMR | | | | | GPC | |
|---|---|---|---|---|---|---|
| | | Coupled | | | | |
| Exo | Endo | exo | endo | tert-Cl | $M_n$ (g/mol) | PDI |
| 50.3 | 2.0 | 37.7 | 4.0 | 6.0 | 2,250 | 1.35 |

TABLE 2

Characterization of 4-(3-Bromopropoxy)phenyl-terminated PIB1

| End-Group Composition Determined By $^1H$ NMR | | | | | GPC | |
|---|---|---|---|---|---|---|
| | | | | 4-(3-Bromo- | | |
| exo | endo | Coupled | tert-Cl | propoxy)phenyl | $M_n$ (g/mol) | PDI |
| 0.0 | 0.0 | 0.0 | 0.0 | 100.0 | 2,380 | 1.23 |

Scheme 1

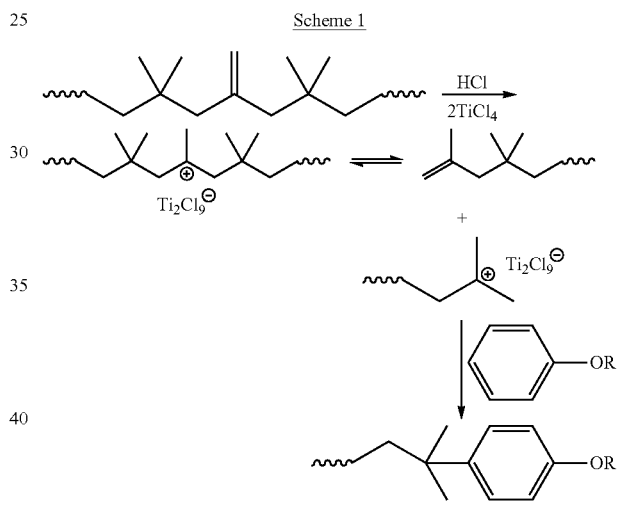

Scheme 2

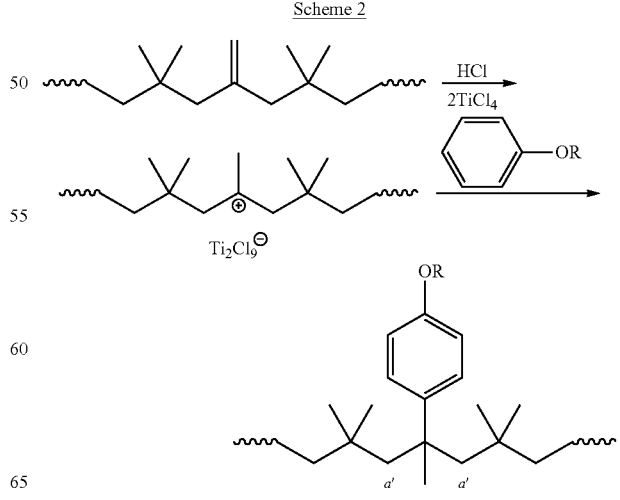

Example 2

Functionalization of Pre-Formed PIB with (3-Bromopropoxy)benzene

A polyisobutylene sample, PIB2, was prepared using 2-chloro-2,4,4-trimethylpentane (TMPCl) and $TiCl_4$ in hexane:methyl chloride (60:40) (vol:vol) at −60° C. under conditions to yield a large fraction of a coupled product.

Reaction of PIB2 with (3-bromopropoxy)benzene was performed within a $N_2$-atmosphere glovebox, with integral heptane cold bath, as follows. Hexane (60 mL) and methyl chloride (40 mL) were chilled to −70° C. and charged to a 300 mL round-bottom flask equipped with a mechanical stirrer and thermocouple. To this mixture was charged, via a syringe, a solution of PIB2 (3.2 g) in hexane (5 mL). After thermal equilibration to −70° C., $TiCl_4$ (0.56 mL, 0.97 g, 5.1 mmol) (neat and at room temperature) was added to the mixture. After 1 min, (3-bromopropoxy)benzene (1 mL, 1.37 g, 6.3 mmol) (neat and at room temperature) was added. After 5 hrs, the reaction was terminated by the addition of prechilled methanol (4 mL). The methyl chloride was allowed to evaporate, the resulting mixture was further concentrated by rotavap, and the polymer was then precipitated by addition of methanol (100 mL). The polymer was dissolved in hexane (50 mL), and the resulting solution was washed with water and dried over magnesium sulfate. The hexane was removed by vacuum stripping to yield a transparent polymer.

Figure 2:
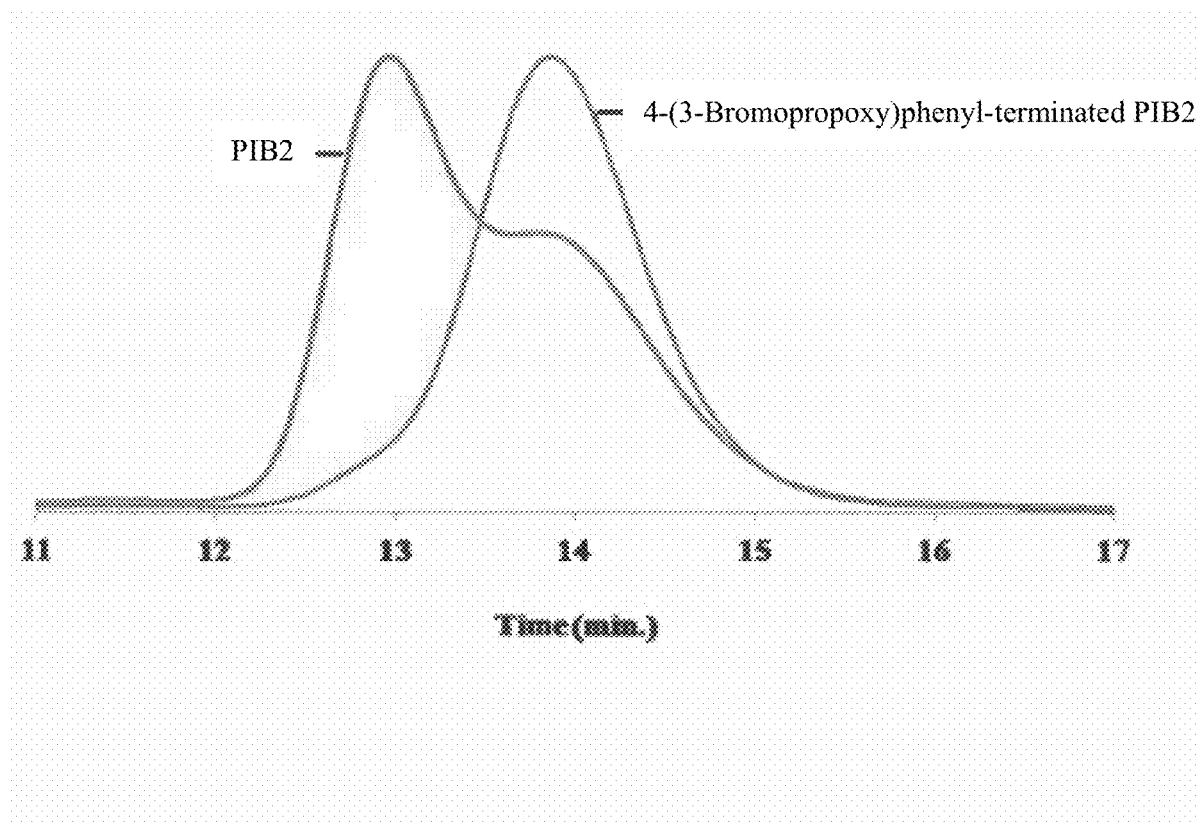
FIG. 2 shows gel permeation chromatography (GPC) traces of PIB2, a hompolyisobutylene that comprises a coupled homopolyisobutylene, and 4-(3-bromopropoxy) phenyl-terminated homopolyisobutylene prepared from PIB2, respectively.
Figure 3:
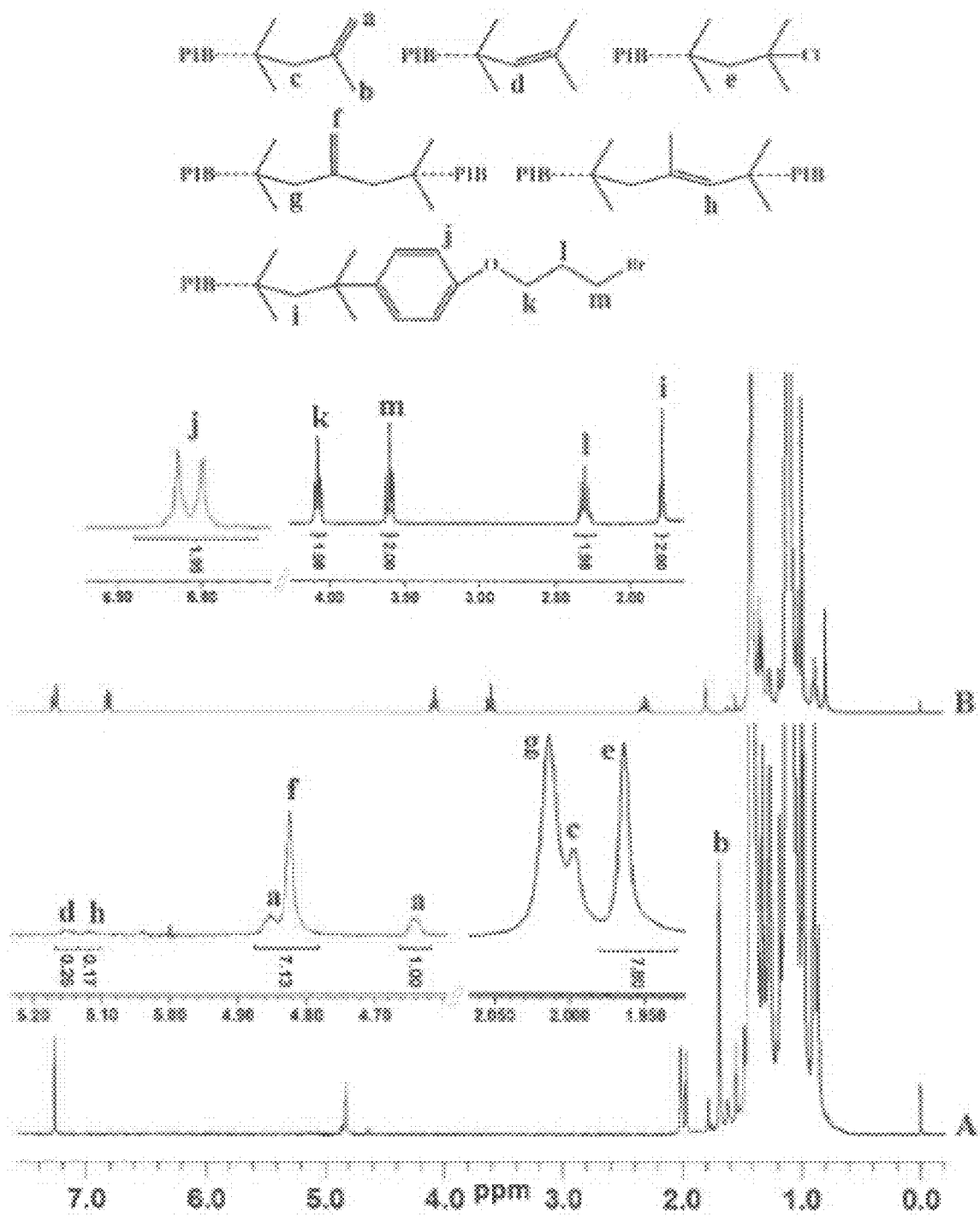
FIG. 3 shows $^1$H NMR spectra of PIB2 (A) and 4-(3-bromopropoxy)phenyl-terminated homopolyisobutylene (B) prepared from PIB2, respectively.

Tables 3 and 4 list end-group compositions of the starting PIB2 and the quenched product, 4-(3-bromopropoxy)phenyl-terminated PIB2, respectively. The data in Tables 3 and 4 were obtained using the same techniques as described in Example 1. FIG. 2 shows the GPC traces of PIB2 and (3-bromopropoxy)phenyl-terminated PIB2. FIG. 3 shows the $^1$H NMR spectra of PIB2 (A) and 4-(3-bromopropoxy)phenyl-terminated PIB2 (B), respectively.

TABLE 3

Characterization of PIB2

End-Group Composition Determined By $^1$H NMR

| Coupled | | | | | GPC | |
|---|---|---|---|---|---|---|
| exo | endo | exo | endo | tert-Cl | $M_n$ (g/mol) | PDI |
| 8.6 | 2.2 | 52.7 | 3.0 | 33.5 | 3,360 | 1.14 |

TABLE 4

Characterization of 4-(3-Bromopropoxy)phenyl-terminated PIB2

End-Group Composition Determined By $^1$H NMR

| exo | endo | Coupled | tert-Cl | 4-(3-Bromo-propoxy)phenyl | GPC | |
|---|---|---|---|---|---|---|
| | | | | | $M_n$ (g/mol) | PDI |
| 0.0 | 0.0 | 0.0 | 0.0 | 100.0 | 2,830 | 1.06 |

Table 3 shows that the original PIB2 sample contained primarily tert-chloride-terminated and coupled PIB (about 56% of the primary chains were coupled). Table 4 shows that the quenching process converted all chain ends to 4-(3-bromopropoxy)phenyl groups. FIG. 2 shows GPC traces of PIB2 and 4-(3-bromopropoxy)phenyl-terminated PIB2. The trace of PIB2 is bimodal with the peak at lower elution volume representing the coupled fraction and the peak at higher elution volume representing the un-coupled, primary-chain fraction. After quenching with (3-bromopropoxy)benzene, the peak due to the coupled fraction has been reduced nearly to zero, and the GPC trace consists almost entirely of un-coupled primary chains carrying 4-(3-bromopropoxy)phenyl end groups. The $^1$H NMR spectrum of the quenched product (FIG. 3B) shows only one signal in the 1.75-2.25 ppm range, indicating that the quenched product essentially contains only primary PIB chains terminated with 4-(3-bromopropoxy)phenyl groups.

Example 3

Functionalization of Pre-Formed PIB with Anisole

Reaction of PIB1 with anisole was performed within a $N_2$-atmosphere glovebox, with integral heptane cold bath, as follows. Hexane (60 mL) and methyl chloride (40 mL) were chilled to −70° C. and charged to a 300 mL round-bottom flask equipped with a mechanical stirrer and thermocouple. To this mixture was charged, via a syringe, a solution of PIB1 (2.25 g) in hexane (5 mL). After thermal equilibration to −70° C., $TiCl_4$ (0.6 mL, 1 g, 5.3 mmol) (neat and at room temperature) was added to the mixture. After 1 min, anisole (0.7 mL, 0.7 g, 6.4 mmol) (neat and at room temperature) was added. After 18 hrs, the reaction was terminated by the addition of prechilled methanol (4 mL). The methyl chloride was allowed to evaporate, the resulting mixture was further concentrated by rotavap, and the polymer was then precipitated by addition of methanol (100 mL). The polymer was dissolved in hexane (50 mL), and the resulting solution was washed with water and dried over magnesium sulfate. The hexane was removed by vacuum stripping to yield a transparent polymer.

Table 5 lists end-group composition of the quenched product, 4-methoxyphenyl-terminated PIB1. The data in Table 5 were obtained using the same techniques described in Example 1. Table 5 shows that the quenching process converted all chain ends to 4-methoxyphenyl groups.

TABLE 5

Characterization of 4-Methoxyphenyl-terminated PIB1

End-Group Composition Determined By $^1$H NMR | GPC

| exo | endo | Coupled | tert-Cl | 4-Methoxyphenyl | $M_n$ (g/mol) | PDI |
|---|---|---|---|---|---|---|
| 0.0 | 0.0 | 0.0 | 0.0 | 100.0 | 1,880 | 1.31 |

Example 4

Functionalization of Pre-Formed PIB with Anisole

Reaction of PIB2 with anisole was performed within a $N_2$-atmosphere glovebox, with integral heptane cold bath, as follows. Hexane (60 mL) and methyl chloride (40 mL) were chilled to −70° C. and charged to a 300 mL round-bottom flask equipped with a mechanical stirrer and thermocouple. To this mixture was charged, via a syringe, a solution of PIB2 (3.2 g) in hexane (5 mL). After thermal equilibration to −70° C., $TiCl_4$ (0.56 mL, 0.97 g, 5.1 mmol) (neat and at room temperature) was added to the mixture. After 1 min, anisole (0.67 mL, 0.67 g, 6.2 mmol) (neat and at room temperature) was added. After 18 hrs, the reaction was terminated by the addition of prechilled methanol (4 mL).

The methyl chloride was allowed to evaporate, the resulting mixture was further concentrated by rotavap, and the polymer was precipitated by addition of methanol (100 mL). The polymer was dissolved in hexane (50 mL), and the resulting solution was washed with water and dried over magnesium sulfate. The hexane was removed by vacuum stripping to yield a transparent polymer.

Figure 4:
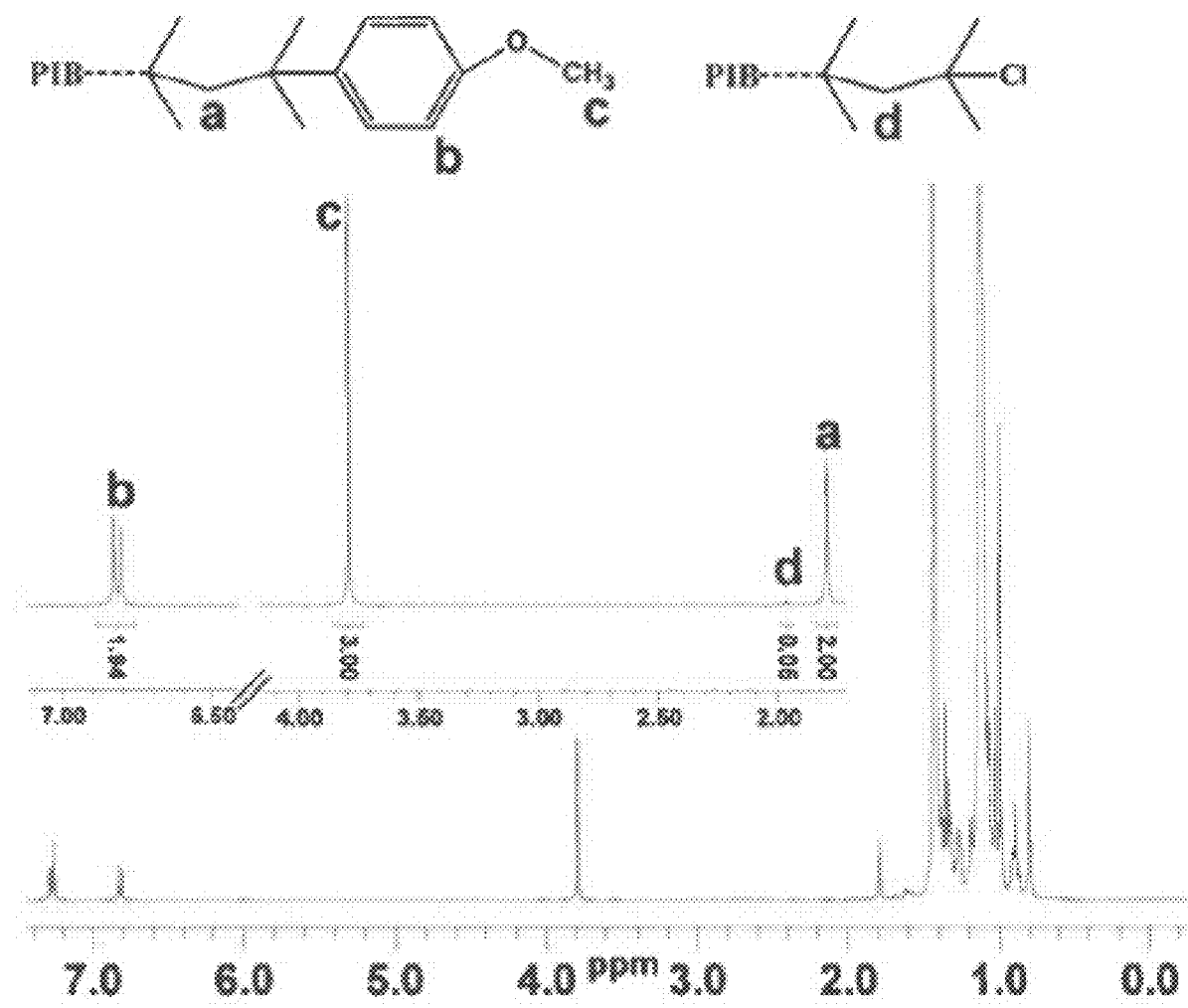
FIG. 4 shows a $^1$H NMR spectrum of 4-methoxyphenyl-terminated homopolyisobutylene prepared from PIB2.

Table 6 lists end-group composition of the quenched product, 4-methoxyphenyl-terminated PIB2. The data in Table 6 were obtained using the same techniques described in Example 1. FIG. 4 shows the $^1$H NMR of 4-methoxyphenyl-terminated PIB2. Table 6 shows that the quenching process converted nearly all chain ends to 4-methoxyphenyl groups. The $^1$H NMR spectrum of the quenched product (FIG. 4) shows two signals in the 1.75-2.25 ppm range, indicating that the quenched product contains primarily PIB chains terminated with 4-methoxyphenyl groups plus a small fraction of residual tert-Cl terminated PIB.

TABLE 6

Characterization of 4-Methoxyphenyl-terminated PIB2

| End-Group Composition Determined By $^1$H NMR | | | | | GPC | |
|---|---|---|---|---|---|---|
| exo | endo | Coupled | tert-Cl | 4-Methoxyphenyl | $M_n$ (g/mol) | PDI |
| 0.0 | 0.0 | 0.0 | 2.6 | 97.6 | 2,420 | 1.1 |

Figure 5:
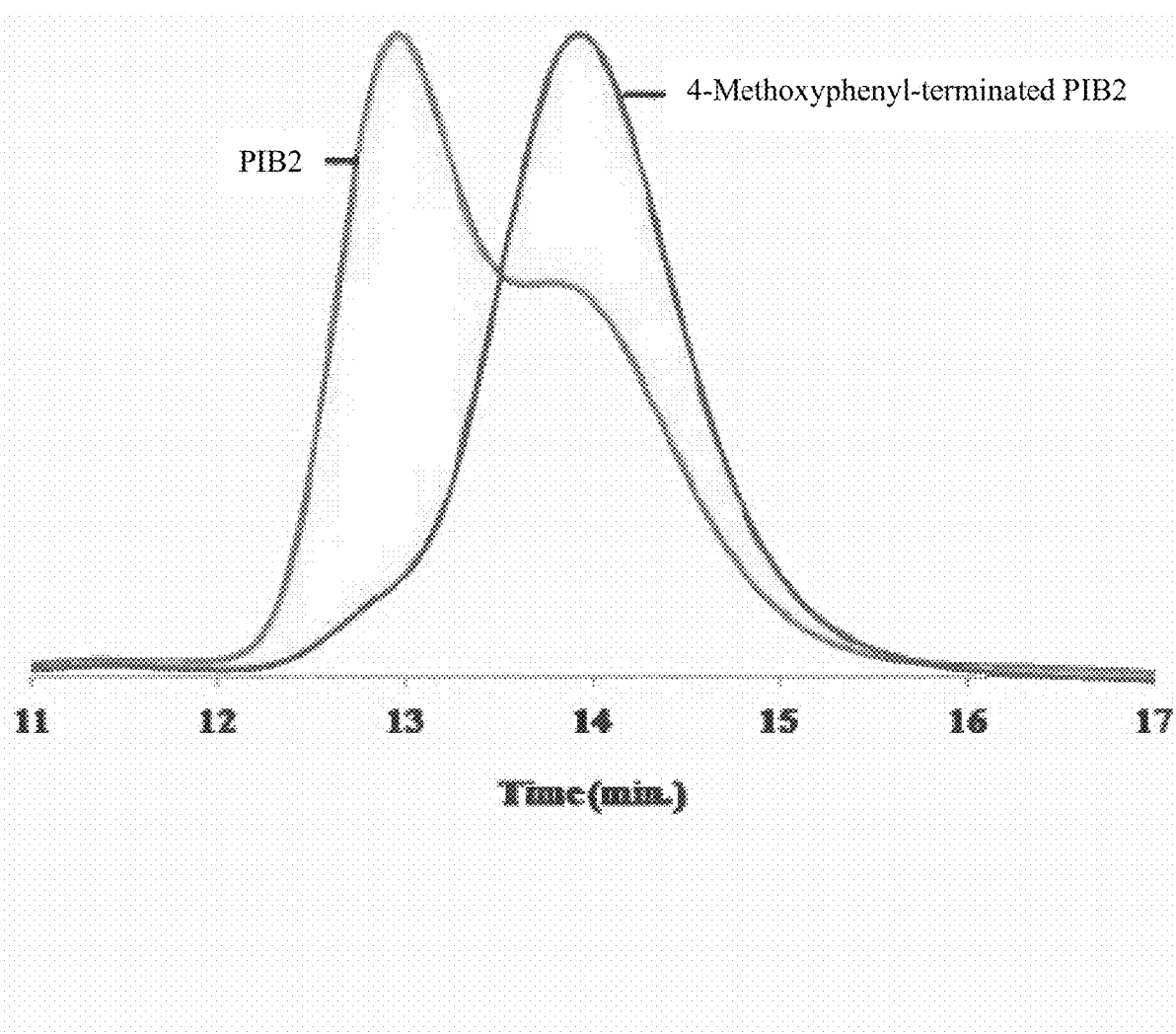
FIG. 5 shows GPC traces of PIB2 and 4-methoxyphenyl-terminated homopolyisobutylene prepared from PIB2, respectively.

FIG. 5 shows GPC traces of PIB2 and 4-methoxyphenyl-terminated PIB2. The trace of PIB2 is bimodal with the peak at lower elution volume representing the coupled fraction and the peak at higher elution volume representing the un-coupled, primary-chain fraction. After quenching with anisole, the peak due to the coupled fraction has been reduced nearly to zero, and the GPC trace consists almost entirely of un-coupled primary chains carrying 4-methoxypheny end groups.

Example 5

Reaction of Pre-Formed PIB with (3-Bromopropoxy)benzene in the Presence of 2,6-Lutidine Reaction of PIB2 with (3-bromopropoxy)benzene in the presence of 2,6-lutidine was performed within a $N_2$-atmosphere glovebox, with integral heptane cold bath, as follows. Hexane (60 mL) and methylene chloride (40 mL) were chilled to −70° C. and charged to a 300 mL round-bottom flask equipped with a mechanical stirrer and thermocouple. To this mixture was charged, via a syringe, a solution of PIB2 (3.12 g) in hexane (5 mL), and 2,6-lutidine (0.3 mL, 0.28 g, 2.6 mmol). After thermal equilibration to −70° C., $TiCl_4$ (neat and at room temperature) (0.84 mL, 1.45 g, 7.7 mmol) was added to the mixture. After 1 min, (3-bromopropoxy)benzene (0.96 mL, 1.31 g, 6.1 mmol) was added (neat and at room temperature). After 12 hrs, the reaction was terminated by the addition of prechilled methanol (4 mL). The methylene chloride was allowed to evaporate, and the polymer was precipitated by addition of methanol (100 mL). The polymer was dissolved in hexane (50 mL), and the resulting solution was washed with water and dried over magnesium sulfate. The hexane was removed by vacuum stripping to yield a transparent polymer.

Figure 6:
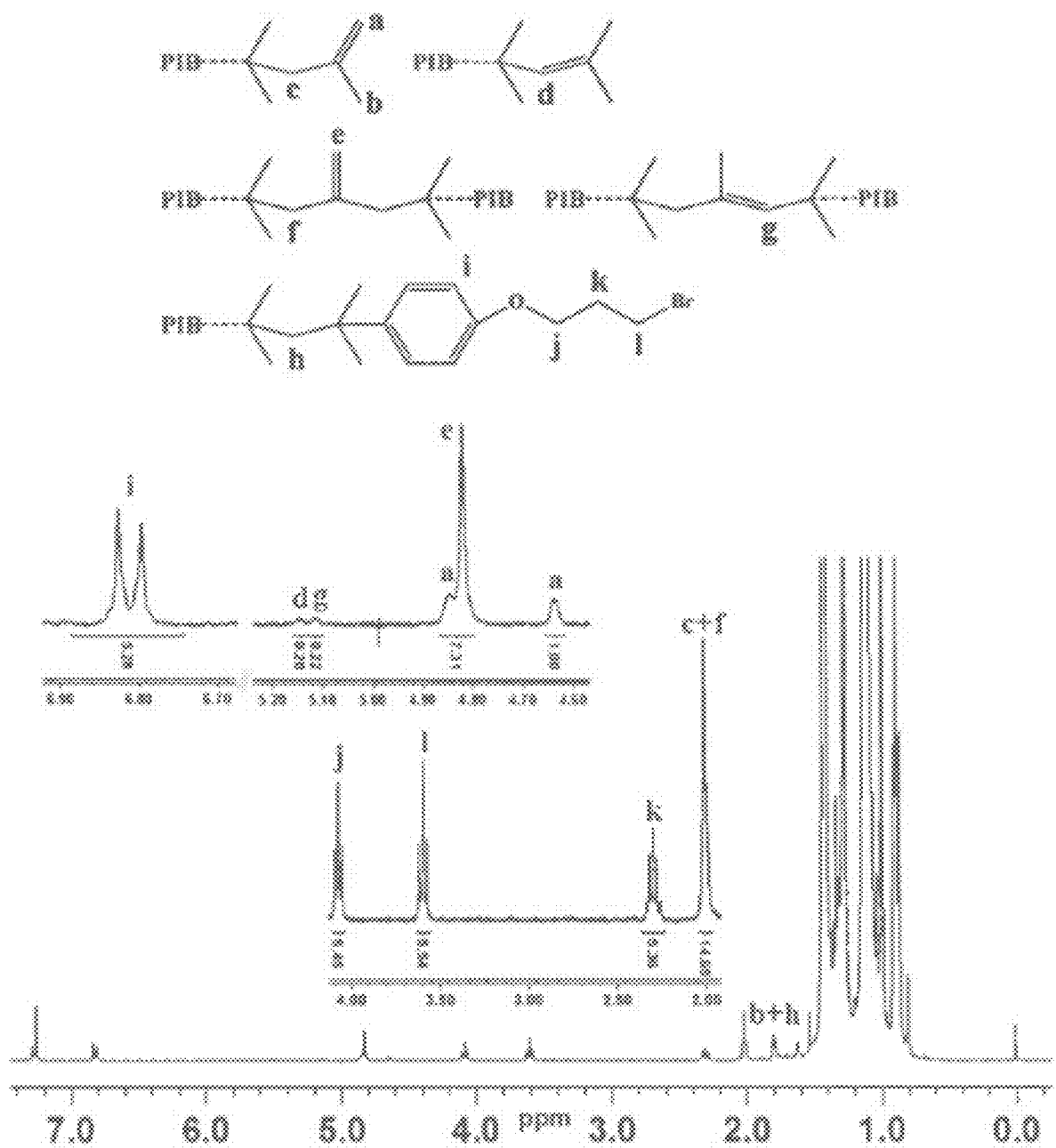
FIG. 6 shows a $^1$H NMR spectrum of the reaction products of PIB2 and (3-bromopropoxy)benzene in the presence of 2,6-lutidine.
Figure 7:
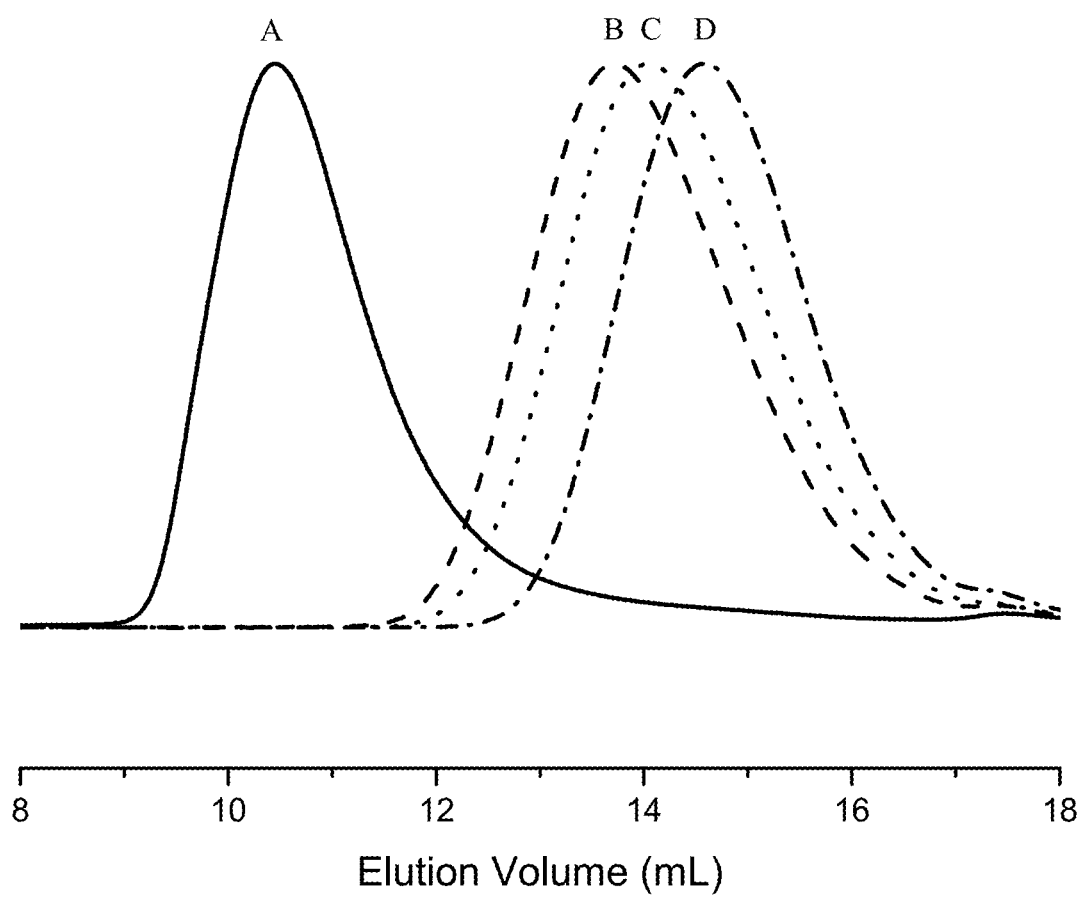
FIG. 7 shows size exclusion chromatography (SEC) traces of butyl rubber (A) and constructive degradation products of butyl rubber with 3-bromopropoxy)benzene in Examples 11 (B), 12 (C), and 13 (D).

Table 7 lists end-group composition of the quenched product, 4-(3-bromopropoxy)phenyl-terminated PIB2. The data in Table 7 were obtained using the same techniques described in Example 1. FIG. 6 shows the $^1$H NMR of 4-(3-bromopropoxy)phenyl-terminated PIB2.

TABLE 7

Characterization of Treated PIB2 in the Presence of 2,6-Lutidine

| End-Group Composition Determined By $^1$H NMR | | | | | | GPC | |
|---|---|---|---|---|---|---|---|
| Coupled | | | | | 4-(3-Bromo- | | |
| exo | endo | exo | endo | tert-Cl | propoxy)phenyl | $M_n$ (g/mol) | PDI |
| 10.8 | 2.2 | 68.1 | 4.7 | 0 | 14.2 | 3,250 | 1.1 |

The data in Table 7 show that, in the presence of 2,6-lutidine, the quenching process failed to convert all chain ends to 4-(3-bromopropoxy)phenyl groups. The presence of 2,6-lutidine prevented the reaction of coupled PIB with (3-bromopropoxy)benzene. The data in Table 7 suggest that only tert-chloride end groups reacted by direct ionization with $TiCl_4$, producing some (3-bromopropoxy)phenyl-terminated PIB2, but also additional exo-olefin and coupled PIB. The $^1$H NMR spectrum of the quenched product is shown in FIG. 6. The presence of both exo- and endo-coupled PIB are observed in the product.

Example 6

Constructive Degradation of Butyl Rubber with (3-Bromopropoxy)benzene

Butyl rubber, a copolymer of isobutylene and isoprene, was obtained from Scientific Polymer Products, containing 2.2 mole % isoprene and having a number average molecular weight ($M_n$) of 250,000 g/mol. The butyl rubber was determined to have a $M_n$ of 236,400 g/mol and a polydispersity index (PDI) of 1.78 (size exclusion chromatography (SEC) coupled with multi-angle laser light scattering (MALLS) detection). The butyl rubber was also determined to contain 1.72 mole % isoprene based on $^1$H NMR.

The butyl rubber (0.998 g) was dissolved into n-hexane (Acros, 99%) (11.291 g) to form a 8.12 wt % solution. Into a 3-neck, round-bottom flask equipped with an overhead mechanical stirrer were charged at −40° C. the entirety of butyl rubber solution (0.306 mmol isoprene repeat units) and methyl chloride (10 mL) (Airgas, C.P. grade; a gaseous reagent passed over a column packed with $CaSO_4$ and 4 Å molecular sieves, and condensed immediately prior to use). The resulting charge was cooled to −40° C. with stirring. (3-Bromopropoxy)benzene (0.35 mL, 0.48 g, 2.2 mmol) (Acros, 95%) and $TiCl_4$ (0.35 mL, 0.61 g, 3.2 mmol) (Sigma Aldrich, 99.9%, packaged under $N_2$ in sure-seal bottles) were then added. The reaction mixture was continuously stirred at −40° C.

At 48 hrs, an aliquot was removed from the reaction mixture and added into excess methanol. The precipitate was collected and then redissolved in fresh hexane. The resulting solution was washed with deionized water, dried over anhydrous $MgSO_4$, and then vacuum stripped to yield an isolated polymer.

At 72.5 hrs, the reaction was terminated by addition of excess methanol. The reaction mixture was allowed to warm to room temperature, causing evaporation of methyl chloride. The resulting polymer solution was precipitated into excess methanol. The precipitate was collected and redissolved in fresh hexane. The resulting solution was re-precipitated into excess methanol. The precipitate was collected and redissolved in fresh hexane. The resulting solution was washed twice with deionized water, dried over anhydrous MgSO$_4$, and then vacuum stripped to yield an isolated polymer product. The isolated polymer product from the 72.5 hrs reaction mixture was determined to have a M$_n$ of 7,000 g/mol and a PDI of 1.5 (SEC/MALLS).

Functional equivalent weight (EW) of a polymer product (mass of polymer per incorporated quencher moiety) was calculated from $^1$H NMR data according to eq. 6.

$$EW = \frac{A_{1.4} \times M_{IB} + A_{3.6} \times M_{3BPP}}{A_{3.6}} \quad (6)$$

In an $^1$H NMR (300 MHz, CDCl$_3$, 64 transients, 5 s pulse delay) spectrum of the isolated polymer product from the 72.5 hrs reaction mixture, peaks due to the isobutylene repeat unit methyl and methylene protons were observed at 1.1 and 1.4 ppm, respectively, and characteristic peaks due to the (3-bromopropoxy)-phenyl moiety were observed at 6.8 (Ph-2,6-H), 4.1 (OCH$_2$), 3.6 (CH$_2$Br), and 2.3 ppm (CH$_2$). In eq. 6, A$_{1.4}$ and A$_{3.6}$ are the integrated intensities of the isobutylene repeat unit methylene protons and the CH$_2$Br methylene protons of the (3-bromopropoxy)phenyl moiety, respectively. M$_{IB}$ is the molecular weight of the isobutylene repeat unit (56.1 g/mol). M$_{3BPP}$ is the molecular weight of the (3-bromopropoxy)phenyl moiety (214 g/mol).

The isolated polymer product from the 72.5 hrs reaction mixture was determined to have a bromide EW of 2,640 g/mol, yielding a calculated number average bromide functionality (F$_n$) of 2.7. No residual olefin was observed in the $^1$H NMR spectrum.

Example 7

Constructive Degradation of Butyl Rubber with (3-Bromopropoxy)benzene

Sources and purities of reagents used in this example were identical to those in Example 6, except that a portion of the n-hexane solvent used in this example was anhydrous grade.

The butyl rubber (1.000 g) and n-hexane (9.813 g) (Acros, 99%) were charged to a scintillation vial and shaken overnight. The resulting solution was transferred to a 2-neck, round-bottom flask equipped with an overhead mechanical stirrer. The scintillation vial was rinsed with anhydrous n-hexane (7 mL, 4.6 g) (Acros, 95%) and this rinse was added to the flask. Methyl chloride (12 mL) was added to the flask at -40° C. After the resulting solution was equilibrated to -40° C. with stirring for 30 min, (3-bromopropoxy) benzene (0.35 mL, 0.48 g, 2.2 mmol) and TiCl$_4$ (0.40 mL, 0.69 g, 3.6 mmol) were added. The reaction mixture was stirred at -40° C., and aliquots were removed from the reaction mixture at 5, 10, and 30 min, and at 1, 2, 3, 20, and 44 hr(s), and terminated immediately into excess methanol. At 72.5 hrs, the reaction was terminated by addition of excess methanol.

Polymer products were isolated from the aliquots and 72 hrs reaction mixture as described in Example 6. A small fraction of olefin was observed in the $^1$H NMR spectrum in the isolated polymer product from the 72.5 hrs reaction mixture, however, the amount was too small for quantification. For certain isolated polymer products, M$_n$ and PDI were determined by SEC/MALLS, and bromide EW was determined by $^1$H NMR as described in Example 6. The results are summarized in Table 8.

TABLE 8

| Reaction Time (hrs) | M$_n$ (g/mol) | PDI | EW (g/mol) | F$_n$ |
|---|---|---|---|---|
| 3 | 10,900 | 1.57 | 14,800 | 0.74 |
| 20 | 10,800 | 1.47 | 6,720 | 1.61 |
| 44 | 9,950 | 1.49 | 4,970 | 2.00 |
| 72.5 | 9,700 | 1.48 | 4,200 | 2.31 |

Example 8

Constructive Degradation of Butyl Rubber with (3-Bromopropoxy)benzene

Sources and purities of reagents used in this example were identical to those in Example 6.

Into a 500 mL round-bottom flask equipped with an overhead mechanical stirrer were charged the butyl rubber (11.0 g) and n-hexane (110 g). The mixture was stirred to dissolve the butyl rubber. After the resulting solution was cooled to -40° C. with stirring, methyl chloride (112 mL) was added. (3-Bromopropoxy)benzene (3.7 mL, 5.1 g, 23 mmol), concentrated sulfuric acid (0.21 mL, 0.39 g, 3.9 mmol) (Fisher Scientific, 96.4%), and TiCl$_4$ (3.9 mL, 6.7 g, 36 mmol) were added. The reaction mixture was stirred at -40° C., and aliquots were removed from the reaction mixture at 1, 5, 10, and 30 min, and at 1, 2, 4, 8.5, and 52.5 hrs and terminated immediately into excess methanol. At 72.5 hrs, the reaction was terminated by addition of excess methanol.

Polymer products were isolated from the aliquots and 72 hrs reaction mixture as described in Example 6. For certain isolated polymer products, M$_n$ and PDI were determined by SEC/MALLS, and bromide EW was determined by $^1$H NMR as described in Example 6. The isolated polymer product from the 72.5 hrs reaction mixture was determined to have a M$_n$ of 6,970 g/mol, a PDI of 1.46, a bromide EW of 3,020 g/mol, and an F$_n$ of 2.31.

Example 9

Constructive Degradation of Bromobutyl Rubber with (3-Bromopropoxy)benzene

Bromobutyl rubber (EXXON™ Bromobutyl 2211) was obtained from ExxonMobil Corporation, which was determined to have a number average molecular weight (M$_n$) of 2.48×10$^5$ g/mol, a PDI of 1.61 (SEC with MALLS detection), and a Br content ranging from 0.93 to 1.23 mol %.

The brominated butyl rubber (2 g) and n-hexane (30 mL) were charged to a one-neck round bottom flask. After the mixture was shaken overnight, methylene chloride (20 mL) and a magnetic stir bar were added. The resulting solution was equilibrated to -70° C. with stirring for 30 min, followed by addition of (3-bromopropoxy)benzene (1 mL, 1.4 g, 6.3 mmol) and TiCl$_4$ (1 mL, 1.7 g, 9.1 mmol). After the reaction mixture was stirred at -70° C. for 22 hrs, excess methanol was added to terminate the reaction. The polymer product was isolated from the reaction mixture as described in Example 6. M$_n$ and PDI were determined by SEC/MALLS, and (3-bromopropoxy)phenyl EW was determined by $^1$H NMR as described in Example 6. The product was determined to have a M$_n$ of 24,500 g/mol, a PDI of 1.68, a bromide EW of 2,700 g/mol, and an F$_n$ of 9.1.

Example 10

Constructive Degradation of Chlorobutyl Rubber with Isopropoxybenzene

Chlorinated butyl rubber (EXXON™ Chlorobutyl 1066) was obtained from ExxonMobil Corporation, which was determined to have a number average molecular weight ($M_n$) of 2.27×10$^5$ g/mol, a PDI of 1.673 (SEC with MALLS detection), and a Cl content ranging from 1.18 to 1.34 mol %.

The chlorinated butyl rubber (2 g) and n-hexane (30 mL) were charged to a one-neck round bottom flask. After the mixture was shaken overnight, methylene chloride (20 mL) and a magnetic stir bar were added. The resulting solution was equilibrated to −70° C. with stirring for 30 min, followed by addition of isopropoxybenzene (Oakwood Products, 97%) (1 mL, 0.93 g, 6.8 mmol) and TiCl$_4$ (1 mL, 1.7 g, 9.1 mmol). After the reaction mixture was stirred at −70° C. for 22 hrs, excess methanol was added to terminate the reaction. The polymer product was isolated as described in Example 6. $M_n$ and PDI were determined by SEC/MALLS as described in Example 6. Functional equivalent weight (EW) of the product (mass of polymer per incorporated quencher moiety) was calculated from $^1$H NMR data (300 MHz, CDCl$_3$, 64 transients, 5 s pulse delay) using eq. 7.

$$EW = \frac{A_{1.4} \times M_{IB} + 2A_{4.5} \times M_{IPP}}{2A_{4.5}} \quad (7)$$

In an $^1$H NMR (300 MHz, CDCl$_3$, 64 transients, 5 s pulse delay) spectrum of the isolated polymer product, peaks due to the isobutylene repeat unit methyl and methylene protons were observed at 1.1 and 1.4 ppm, respectively, and characteristic peaks due to the isopropoxyphenyl moiety were observed at 6.8 (Ar—C$_{2,6}$—H) and 4.5 ppm (OCH). In eq. 7, $A_{1.4}$ and $A_{4.5}$ are the integrated intensities of the isobutylene repeat unit methylene protons and the methine protons of the isopropoxyphenyl moiety, respectively. $M_{IB}$ is the molecular weight of the isobutylene repeat unit (56.1 g/mol). $M_{IPP}$ is the molecular weight of the isopropoxyphenyl moiety (135 g/mol).

The product was determined to have a $M_n$ of 37,800 g/mol, a PDI of 1.86, a bromide EW of 2,280 g/mol, and an $F_n$ of 16.6.

Example 11

Constructive Degradation of Butyl Rubber with (3-Bromopropoxy)benzene

Butyl rubber (EXXON™ Butyl 365) was obtained from ExxonMobil Corporation, which was determined by SEC/MALLS to have a number average molecular weight ($M_n$) of 1.908×10$^5$ g/mol and polydispersity index (PDI) of 1.66; and by $^1$H NMR to contain 2.28 mole % of isoprene as a comonomer.

The butyl rubber (2 g) and n-hexane (30 mL) were charged to a one-neck round bottom flask. After the flask was shaken overnight, methylene chloride (20 mL) and a magnetic stir bar were added to the flask. After the resulting solution was equilibrated to −70° C. with stirring for 30 min, (3-bromopropoxy)benzene (1.5 mL, 2.05 g, 9.52 mmol), concentrated sulfuric acid (0.05 mL, 0.092 g, 0.938 mmol), and TiCl$_4$ (2 mL, 3.4 g, 18.2 mmol) were added. After the reaction mixture was stirred at −70° C. for 24 hrs, excess methanol was added to the flask to terminate the reaction.

The polymer product was isolated from the reaction mixture as described in Example 6. $M_n$ and PDI were determined by SEC/MALLS, and bromide EW was determined by $^1$H NMR as described in Example 6. The polymer product was determined to have a $M_n$ of 10,800 g/mol, a PDI of 1.42, a bromide EW of 2,640 g/mol, and an $F_n$ of 4.09.

Example 12

Constructive Degradation of Butyl Rubber with (3-Bromopropoxy)benzene

This experiment was carried out identically to Example 11 with the exception that the amount of (3-bromopropoxy)benzene added was 0.75 mL (1.03 g, 4.76 mmol). The polymer product was determined to have a $M_n$ of 7,850 g/mol, a PDI of 1.44, a bromide EW of 2,650 g/mol, and an $F_n$ of 2.96.

Without being limited by any theory, the results of Examples 11 and 12, considered together, show that a lower (3-bromopropoxy)benzene concentration reduces the rate of backbone or side quenching but does not reduce the rate of chain cleavage. After chain cleavage, quenching of the resulting chain ends is relatively rapid. Therefore, the product of Example 12, produced using a lower (3-bromopropoxy)benzene concentration, has lower molecular weight but nearly the same equivalent molecular weight, compared to the product of Example 11. The product of Example 12 more nearly approximates a difunctional telechelic product compared to the product of Example 11.

Example 13

Constructive Degradation of Butyl Rubber with (3-Bromopropoxy)benzene

This experiment was carried out identically to Example 11 with the exception that the reaction temperature was −40° C. The polymer product was determined to have a $M_n$ of 4,960 g/mol, a PDI of 1.39, a bromide EW of 2,120 g/mol, and an $F_n$ of 2.34.

Without being limited by any theory, the results of Examples 11 and 13, considered together, show that higher reaction temperatures increase the rate of chain cleavage relative to backbone or side quenching.

Example 14

Constructive Degradation of Poly(isobutylene-co-β-pinene) with (3-Bromopropoxy)benzene a. Synthesis of Poly(isobutylene-co-β-pinene)

Poly(isobutylene-co-β-pinene) was synthesized within a N$_2$-atmosphere glove box equipped with a pentane cold bath as follows. Hexane (118 mL) and methyl chloride (80 mL) were chilled to −70° C. and then charged to a 500 mL round-bottom flask equipped with mechanical stirrer. To this mixture were added TMPCl (49.6 mg) in 2 mL hexane (−70° C.), 2,6-lutidine (0.16 mL, 0.15 g, room temperature), β-pinene 3.71 mL, 3.19 g, room temperature), and isobutylene (33 mL, 25 g, −70° C.). After the reaction mixture was equilibrated to −115° C., the polymerization was initiated by addition of TiCl$_4$ (0.27 mL, 0.47 g, room temperature). Shortly after initiation, the reaction mixture began to freeze, and thereafter the reaction progressed as a slurry. Polymerization was allowed to proceed for 3 hrs and then terminated by addition of methanol (100 mL, room temperature). The reactor was removed from the cold bath, and methyl chloride and residual isobutylene were allowed to evaporate in a fume hood. The polymer was isolated by precipitation of the remaining reaction mixture into methanol (200 mL). The polymer was collected and dissolved in hexane (50 mL), and the resulting solution was washed with methanol (3×50 mL) and water (3×100 mL), and then dried over magnesium sulfate ($MgSO_4$). The hexane was removed by vacuum to yield a transparent copolymer (6.31 g).

The copolymer end groups were determined to be predominantly tert-chloride by $^1H$ NMR. Molecular weight ($M_n$) and molecular weight distribution (MWD) of the copolymer were 23,700 g/mol and 2.36, respectively, as determined by SEC/MALLS. The ratio (R) of comonomer units in the copolymer was determined using $^1H$ NMR according to eq. 8, $$R = \frac{2A_{5.3}}{A_{1.4(precursor)}} \qquad (8)$$

where $A_{5.3}$ is the integrated area of the olefinic proton of the β-pinene repeating units observed at 5.3 ppm, and $A_{1.4\ (precursor)}$ is the integrated area of the methylene protons of the isobutylene repeating units of the copolymer observed at 1.4 ppm. From R, the fraction of β-pinene repeating units in the copolymer was calculated to be 5.4 mol % β-pinene.

b. Constructive Degradation

The copolymer (2.0 g) and n-hexane (30 mL) were charged to a one-neck round bottom flask and shaken overnight. Methylene chloride (20 mL) and a magnetic stir bar were added to the flask, and the resulting solution was equilibrated to −70° C. with stirring for 30 min. Reaction was initiated by addition of (3-bromopropoxy)benzene (1.24 mL, 1.69 g, 7.87 mmol), concentrated sulfuric acid (0.01 mL, 0.018, 0.188 mmol), and $TiCl_4$ (1 mL, 1.73 g, 9.12 mmol). The reaction was stirred at −70° C. for 22.5 hrs, at which time the reaction was terminated by addition of excess methanol to the flask. An aliquot of the final solution was isolated as described in Example 6 to produce a polymer product, which was determined to have a $M_n$ of 6,140 g/mol, a PDI of 1.70, a (3-bromopropoxy)phenyl EW of 3,120 g/mol, and an $F_n$ of 1.97.

The EW of the polymer product (mass of polymer per incorporated quencher moiety) was calculated from $^1H$ NMR data (300 MHz, $CDCl_3$, 64 transients, 5 s pulse delay) using eq. 9, $$EW = \frac{A_{1.4(product)}(M_{IB} + RM_{\beta P}) + A_{3.6}M_{3BPP}}{A_{3.6}} \qquad (9)$$

where $A_{1.4\ (product)}$ is the integrated area of the methylene protons of the isobutylene repeating units in the polymer product observed at 1.4 ppm, $A_{3.6}$ is the integrated area of the olefinic proton of the β-pinene repeating units in the polymer product observed at 5.3 ppm, $M_{IB}$ is the molecular weight of isobutylene (56.1 g/mol), $M_{\beta P}$ is the molecular weight of the β-pinene repeat unit (136.23 g/mol), and $M_{3BPP}$ is the molecular weight of the (3-bromopropoxy) phenyl moiety (214 g/mol).

Example 15

Constructive Degradation of Butyl Rubber with (3-Bromopropoxy)benzene

Butyl rubber (EXXON™ Butyl 365) was obtained from ExxonMobil Corporation, which was determined by SEC/MALLS to have a number average molecular weight ($M_n$) of $1.908 \times 10^5$ g/mol and polydispersity index (PDI) of 1.66; and by $^1H$ NMR to contain 2.28 mole % of isoprene as a comonomer.

The butyl rubber (2 g) and n-hexane (30 mL) were charged to a one-neck round bottom flask. After the flask was shaken overnight, methylene chloride (20 mL) and a magnetic stir bar were added to the flask. After the resulting solution was equilibrated to −10° C. with stirring for 30 min, (3-bromopropoxy)benzene (1.5 mL, 2.05 g, 9.52 mmol), concentrated sulfuric acid (0.015 mL, 0.0276 g, 0.281 mmol), and $AlCl_3$ (0.2 g, 15.0 mmol) were added. An aliquot was taken at 30 min. After the reaction mixture was stirred at −10° C. for 24 hrs, excess methanol was added to the flask to terminate the reaction.

The polymer product was isolated from the reaction mixture as described in Example 6. $M_n$ and PDI were determined by SEC/MALLS, and bromide EW was determined by $^1H$ NMR as described in Example 6. The polymer product at 30 min was determined to have a $M_n$ of 5,310 g/mol, a PDI of 1.31, a bromide EW of 2,470 g/mol, and an $F_n$ of 2.15. At 24 hrs, $M_n$, PDI, EW, and $F_n$ of the product were the same as they were at 30 min.

Example 16

Constructive Degradation of Butyl Rubber with (3-Bromopropoxy)benzene

This experiment was carried out identically to Example 15 with the exception that the amount of $AlCl_3$ added was 0.4 g (30.0 mmol). The polymer product at 30 min was determined to have a $M_n$ of 4,910 g/mol, a PDI of 1.31, a bromide EW of 2,020 g/mol, and an $F_n$ of 2.43. At 24 hrs, $M_n$, PDI, EW, and $F_n$ of the product were the same as they were at 30 min.

Example 17

Constructive Degradation of Butyl Rubber with (3-Bromopropoxy)benzene

This experiment was carried out identically to Example 15 with the exception that the amount of $AlCl_3$ added was 0.6 g (45.0 mmol). The polymer product at 30 min was determined to have a $M_n$ of 5,030 g/mol, a PDI of 1.29, a bromide EW of 2,030 g/mol, and an $F_n$ of 2.47. At 24 hrs, $M_n$, PDI, EW, and $F_n$ of the product were the same as they were at 30 min.

Example 18

Constructive Degradation of Butyl Rubber with (3-Bromopropoxy)benzene

Figure 8:
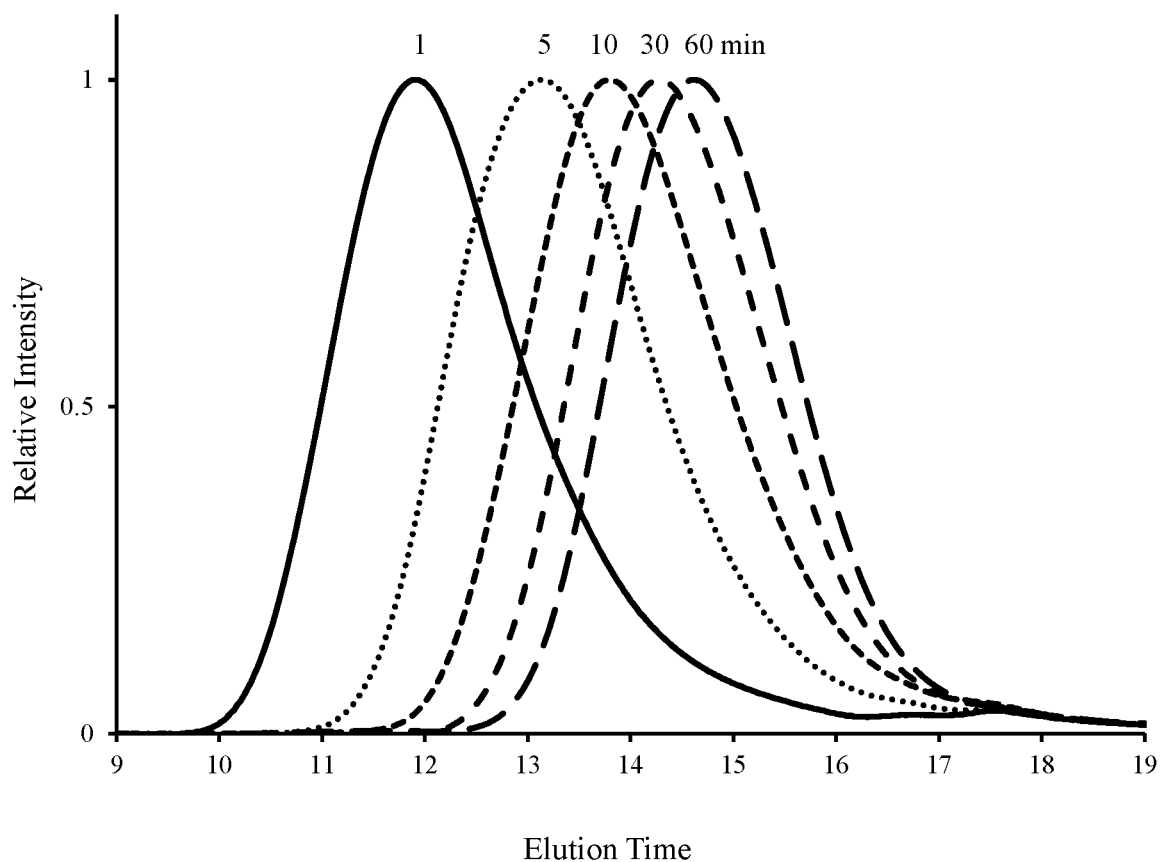
FIG. 8 shows GPC traces of aliquots taken at 1, 5, 10, 30, and 60 min from a reaction mixture of butyl rubber and (3-bromopropoxy)benzene to show the progress of constructive degradation.

This experiment was carried out identically to Example 15 with the exception that the amounts of solvents added were 40 mL hexane and 10 mL methylene chloride. Aliquots were taken at 1, 5, 10, 30, and 60 min. The polymer product at 60 min was determined to have a $M_n$ of 5,370 g/mol, a PDI of 1.33, a bromide EW of 2,500 g/mol, and an $F_n$ of 2.15. GPC traces of each aliquot showing the progress of constructive degradation are shown in FIG. 8.

It is understood that the detailed description and accompanying examples are merely illustrative and are not to be taken as limitations upon the scope of the subject matter. Various changes and modifications to the disclosed embodiments will be apparent to those skilled in the art. Such changes and modifications, including without limitation those relating to the chemical structures, substituents, derivatives, intermediates, synthesis, starting materials, products, and/or reaction conditions may be made without departing from the spirit and scope thereof. Included within the scope of the subject matter described herein are all combinations of the embodiments described herein. All U.S. patents, patent applications, and patent publications referenced herein are incorporated herein by reference in their entireties.

What is claimed:

1. A method for preparing a functionalized polyolefin, comprising reacting an unsaturated polyolefin containing one or more non-aromatic main-chain double bonds with an aromatic compound in the presence of a Lewis acid and protic acid to form the functionalized polyolefin.

2. The method of claim 1, wherein the functionalized polyolefin has a weight average molecular weight or number average molecular weight smaller than that of the unsaturated polyolefin.

3. The method of claim 1, wherein the molar ratio of the aromatic compound relative to the number of non-aromatic main-chain double bonds in the unsaturated polyolefin is ranging from about 1 to about 5.

4. The method of claim 1, wherein the aromatic compound is a substituted benzene.

5. The method of claim 1, wherein the aromatic compound has the structure of Formula XII:

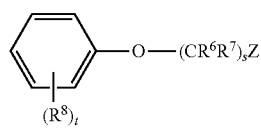

(XII)

wherein:
each $R^6$ and $R^7$ is independently hydrogen or alkyl;
each $R^8$ is independently halo, alkyl, or alkoxy;
Z and s are:
i. s is an integer of 0; and
Z is hydrogen, alkyl, alkenyl, alkynyl, aryl, aralkyl, heteroaryl, heterocyclyl, or -L-SiR$^{Za}$R$^{Zb}$R$^{Zc}$,
ii. s is an integer of 1; and
Z is hydrogen, halo, fluoro, chloro, bromo, iodo, —CN, —NC, —NCO, —OCN, —NCS, —SCN, alkyl, alkenyl, alkynyl, aryl, aralkyl, heteroaryl, heterocyclyl, —C(O)OR$^{2a}$, —C(O)NR$^{2b}$R$^{2c}$, —OR$^{2a}$, alkoxy, —OC(O)R$^{2a}$, or -L-SiR$^{Za}$R$^{Zb}$R$^{Zc}$; or iii. s is an integer of 2, 3, 4, 5, 6, 7, 8, 9, 10, 11, 12, 13, 14, 15, 16, 17, 18, 19, or 20; and
Z is hydrogen, halo, fluoro, chloro, bromo, iodo, —CN, —NC, —NCO, —OCN, —NCS, —SCN, alkyl, alkenyl, alkynyl, aryl, aralkyl, heteroaryl, heterocyclyl, —C(O)OR$^{2a}$, —C(O)NR$^{2b}$R$^{2c}$, —OR$^{2a}$, alkoxy, —OC(O)R$^{2a}$, —NR$^{2b}$R$^{2c}$ or -L-SiR$^{Za}$R$^{Zb}$R$^{Zc}$;

each L is independently a bond or ethynylene (—C≡C—);
each R$^{Za}$, R$^{Zb}$, and R$^{Zc}$ is independently halo, fluoro, chloro, bromo, iodo, alkyl, alkenyl, alkynyl, aryl, aralkyl, heteroaryl, heterocyclyl, —OR$^{2a}$, hydroxyl, alkoxy, or —NR$^{2b}$R$^{2c}$;
t is an integer of 0, 1, 2, 3, 4, or 5; and
each R$^{2a}$, R$^{2b}$, and R$^{2c}$ is independently (i) hydrogen; or (ii) alkyl, alkenyl, alkynyl, cycloalkyl, aryl, aralkyl, heteroaryl, or heterocyclyl; or (iii) R$^{2b}$ and R$^{2c}$ together with the N atom to which they are attached form heteroaryl or heterocyclyl;
wherein each alkyl, alkenyl, alkynyl, aryl, aralkyl, heteroaryl, heterocyclyl, and alkoxy is independently and optionally substituted.

6. The method of claim 1, wherein the aromatic compound is anisole, isopropoxybenzene, 2-bromoethoxybenzene, or 3-bromopropoxybenzene.

7. The method of claim 1, wherein the Lewis acid is a titanium tetrahalide, a boron trihalide, an aluminum trihalide, a tin tetrahalide, a zinc halide, ethyl aluminum dichloride, or a mixture thereof.

8. The method of claim 1, wherein the protic acid is formed in situ.

9. The method of claim 1, wherein the method is performed at a temperature ranging from about −120° C. to about 50° C.

10. The method of claim 1, wherein the method is performed in a solvent.

11. The method of claim 10, wherein the solvent is a hydrocarbon, a halogenated hydrocarbon, or a mixture thereof.

12. The method of claim 1, wherein the unsaturated polyolefin is a copolymer of an olefin and a comonomer.

13. The method of claim 12, wherein the olefin is isobutylene.

14. The method of claim 1, wherein the unsaturated polyolefin has the structure of Formula III:

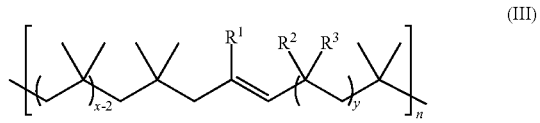

(III)

wherein:
$R^1$, $R^2$, and $R^3$ are each independently hydrogen, alkyl, or aryl;
n is an integer ranging from about 1 to about 2,000;
x is an integer ranging from about 10 to about 200; and
y is an integer of 0 or 1;
wherein each alkyl and aryl is independently and optionally substituted.

15. The method of claim 1, wherein the functionalized polyolefin comprises a compound having the structure of Formula XXI, XXIa, or XXIb:

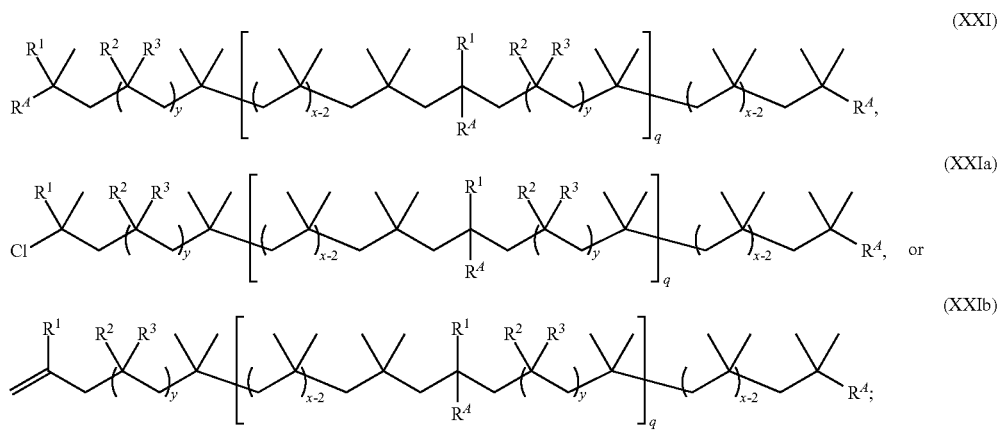

wherein:
  $R^1$, $R^2$, and $R^3$ are each independently hydrogen, alkyl, or aryl, where the alkyl and aryl is independently and optionally substituted;
  each $R^A$ is independently aryl or heteroaryl, each independently and optionally substituted;
  x is an integer ranging from about 10 to about 200;
  y is an integer of 0 or 1; and
  each q is independently an integer of 0, 1, 2, 3, 4, 5, 6, 7, 8, 9, 10, 11, 12, 13, 14, 15, 16, 17, 18, 19, or 20.

16. The method of claim 15, wherein y is an integer of 1.

17. The method of claim 15, wherein $R^1$, $R^2$, and $R^3$ are each independently hydrogen, methyl, or phenyl.

18. The method of claim 1, wherein the unsaturated polyolefin has the structure of Formula XI:

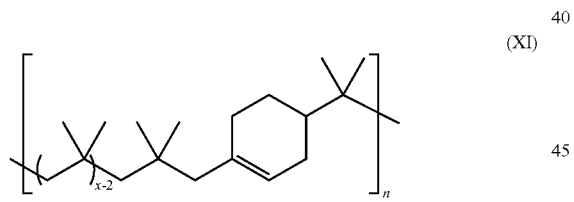

wherein:
  n is an integer ranging from about 1 to about 2,000; and
  each x is independently an integer ranging from about 10 to about 200.

19. The method of claim 1, wherein the functionalized polyolefin comprises a compound having the structure of Formula XXXIII, XXXIIIa, or XXXIIIb:

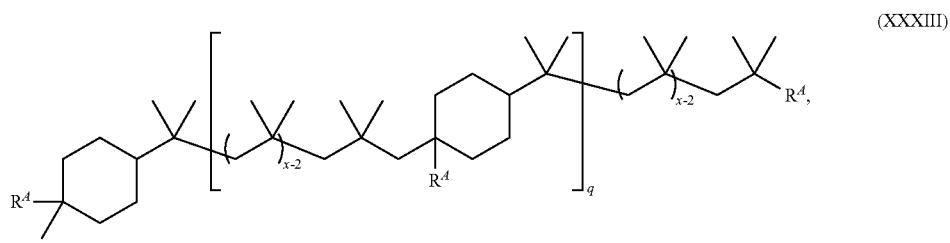

-continued
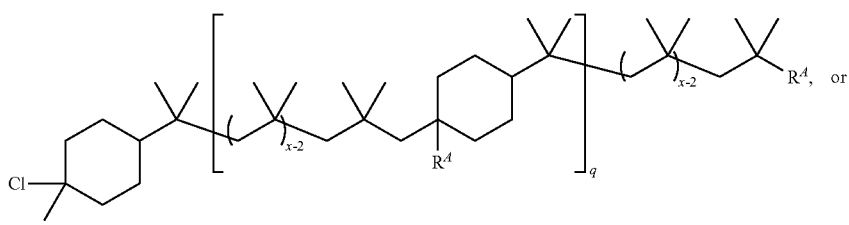
(XXXIIIa)
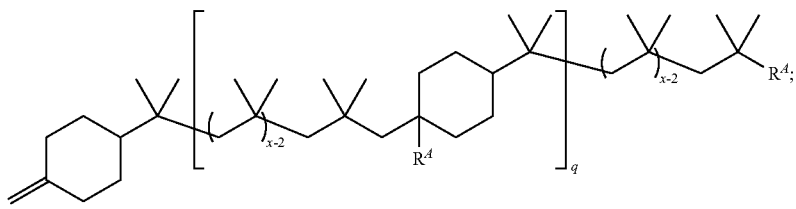
(XXXIIIb)
wherein:
  each $R^A$ is independently aryl or heteroaryl, each independently and optionally substituted;
  each q is independently an integer of 0, 1, 2, 3, 4, 5, 6, 7, 8, 9, 10, 11, 12, 13, 14, 15, 16, 17, 18, 19, or 20; and
  each x is independently an integer ranging from about 10 to about 200.
* * * * *